United States Patent
Harris et al.

(10) Patent No.: US 10,451,315 B2
(45) Date of Patent: Oct. 22, 2019

(54) UNIVERSAL END CLAMP FOR MOUNTING SOLAR PANELS ON STRUCTURAL RAILS

(71) Applicant: Unirac Inc., Albuquerque, NM (US)

(72) Inventors: Stacy Harris, Albuquerque, NM (US); David S. Alvarez, Albuquerque, NM (US); Thomas Young, Albuquerque, NM (US); Todd Ganshaw, Albuquerque, NM (US)

(73) Assignee: Unirac Inc., Albuquerque, NM (US)

( * ) Notice: Subject to any disclaimer, the term of this patent is extended or adjusted under 35 U.S.C. 154(b) by 0 days.

(21) Appl. No.: 15/671,910

(22) Filed: Aug. 8, 2017

(65) Prior Publication Data

US 2019/0049151 A1    Feb. 14, 2019

(51) Int. Cl.
| | | |
|---|---|---|
| *F24S 25/636* | (2018.01) | |
| *H02S 20/00* | (2014.01) | |
| *F16B 2/10* | (2006.01) | |
| *F16B 5/06* | (2006.01) | |
| *F24S 25/00* | (2018.01) | |

(52) U.S. Cl.
CPC .............. *F24S 25/636* (2018.05); *F16B 2/10* (2013.01); *F16B 5/0692* (2013.01); *H02S 20/00* (2013.01); *F24S 2025/801* (2018.05); *F24S 2025/807* (2018.05)

(58) Field of Classification Search
CPC .............. F24S 25/636; F24S 2025/801; F24S 2025/807; F16B 2/10; F16B 5/0692; H02S 20/00
See application file for complete search history.

(56) References Cited

U.S. PATENT DOCUMENTS

| | | | |
|---|---|---|---|
| 5,779,412 A | * | 7/1998 | Nagai ..................... E04B 2/766 411/104 |
| D496,248 S | | 9/2004 | Liebendorfer |
| D496,249 S | | 9/2004 | Liebendorfer |
| 7,260,918 B2 | | 8/2007 | Liebendorfer |
| 7,434,362 B2 | | 10/2008 | Liebendorfer |
| 7,600,349 B2 | | 10/2009 | Liebendorfer |
| 7,748,175 B2 | | 7/2010 | Liebendorfer |
| 7,766,292 B2 | | 8/2010 | Liebendorfer |
| 8,128,044 B2 | | 3/2012 | Liebendorfer |
| 8,376,298 B2 | | 2/2013 | McPheeters |
| 8,585,000 B2 | | 11/2013 | McPheeters |
| 8,640,400 B2 | | 2/2014 | Liebendorfer |
| 8,763,968 B2 | | 7/2014 | Liebendorfer |

(Continued)

OTHER PUBLICATIONS

"All New Solarmount" Sep. 13, 2017 retrieved from <URL:https://vimeo.com/233699014>, entire video., 1 page.

(Continued)

*Primary Examiner* — Anita M King
(74) *Attorney, Agent, or Firm* — Lee & Hayes, P.C.

(57) ABSTRACT

A universal end clamp and method for clamping a solar module to a rail are configured for applying a torque to a clamp body and generating a compressive clamping force between the body and a lower flange of a solar panel module frame so that the lower flange of the module frame is clamped to the rail. The clamp is disposed underneath the solar module, where it cannot be seen. The components of the assembly that can move include threaded bolts, front and rear T-slides, drive blocks, cams, coil springs, leaf springs, and offset drive brackets.

12 Claims, 63 Drawing Sheets

(56) References Cited

U.S. PATENT DOCUMENTS

| | | | |
|---|---|---|---|
| 8,801,349 B2 | 8/2014 | McPheeters | |
| 9,022,021 B2 | 5/2015 | McPheeters | |
| 9,080,792 B2 | 7/2015 | Patton et al. | |
| 9,097,443 B2* | 8/2015 | Liu | H02S 20/23 |
| 9,160,273 B2 | 10/2015 | Schuit et al. | |
| 9,306,490 B2 | 4/2016 | Haddock et al. | |
| 9,341,201 B2 | 5/2016 | McPheeters | |
| 9,397,606 B2 | 7/2016 | Liebendorfer | |
| 9,416,992 B2 | 8/2016 | Braunstein et al. | |
| 9,431,953 B2* | 8/2016 | Stearns | H02S 20/23 |
| 9,528,725 B2 | 12/2016 | McPheeters | |
| 9,531,319 B2 | 12/2016 | Braunstein et al. | |
| 9,628,018 B2 | 4/2017 | Stapleton | |
| 9,671,136 B2 | 6/2017 | Ash et al. | |
| 9,813,015 B1 | 11/2017 | Kapla et al. | |
| 9,893,677 B1 | 2/2018 | Liu | |
| 10,256,768 B2* | 4/2019 | Owen | H02S 20/10 |
| 10,270,383 B2* | 4/2019 | Wildes | H02S 20/23 |
| 2009/0232616 A1* | 9/2009 | Sekreta | F16B 35/06 411/107 |
| 2010/0215429 A1* | 8/2010 | Raye | B60T 7/20 403/408.1 |
| 2012/0298817 A1* | 11/2012 | West | H02S 20/00 248/220.22 |
| 2014/0250825 A1* | 9/2014 | Richardson | E04B 1/4107 52/710 |
| 2015/0244308 A1 | 8/2015 | Patton et al. | |
| 2016/0087576 A1* | 3/2016 | Johansen | H02S 20/23 52/58 |
| 2016/0111999 A1 | 4/2016 | Stapleton | |
| 2016/0261225 A1 | 9/2016 | Paponneau | |
| 2016/0268958 A1 | 9/2016 | Wildes et al. | |
| 2017/0366131 A1* | 12/2017 | Stearns | F24S 25/65 |

OTHER PUBLICATIONS

PCT Search Report for corresponding International Application No. PCT/US2018/039774 dated Nov. 26, 2018, 11 pages.

* cited by examiner

SEC. A-A

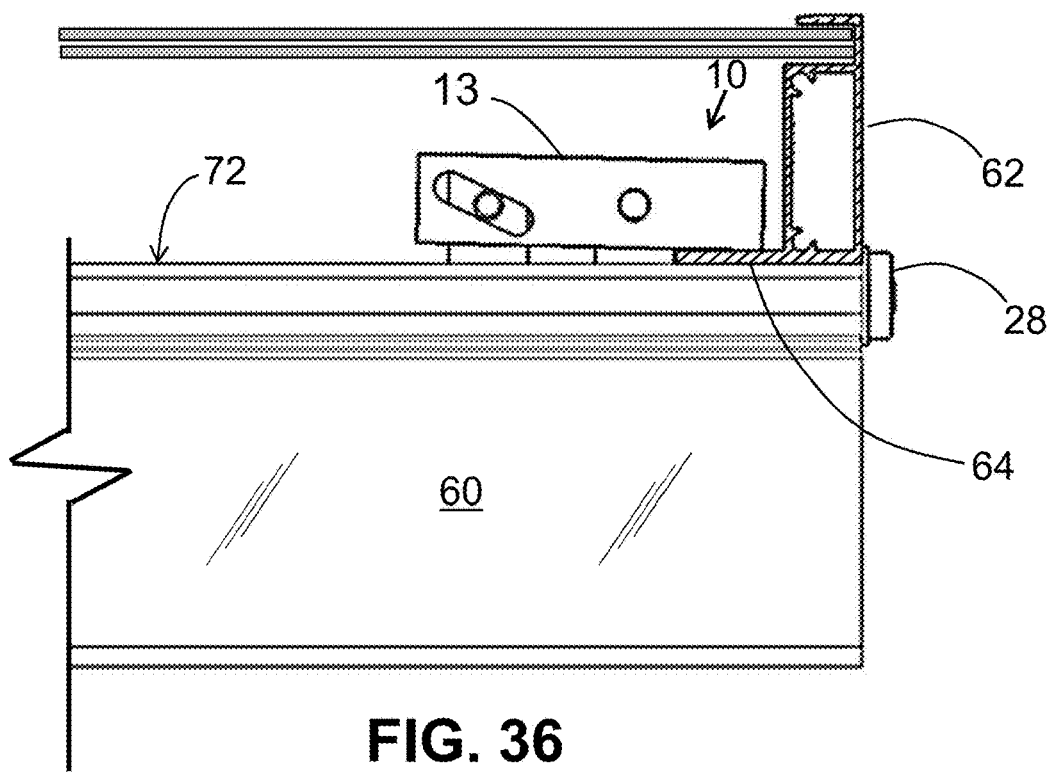
FIG. 36
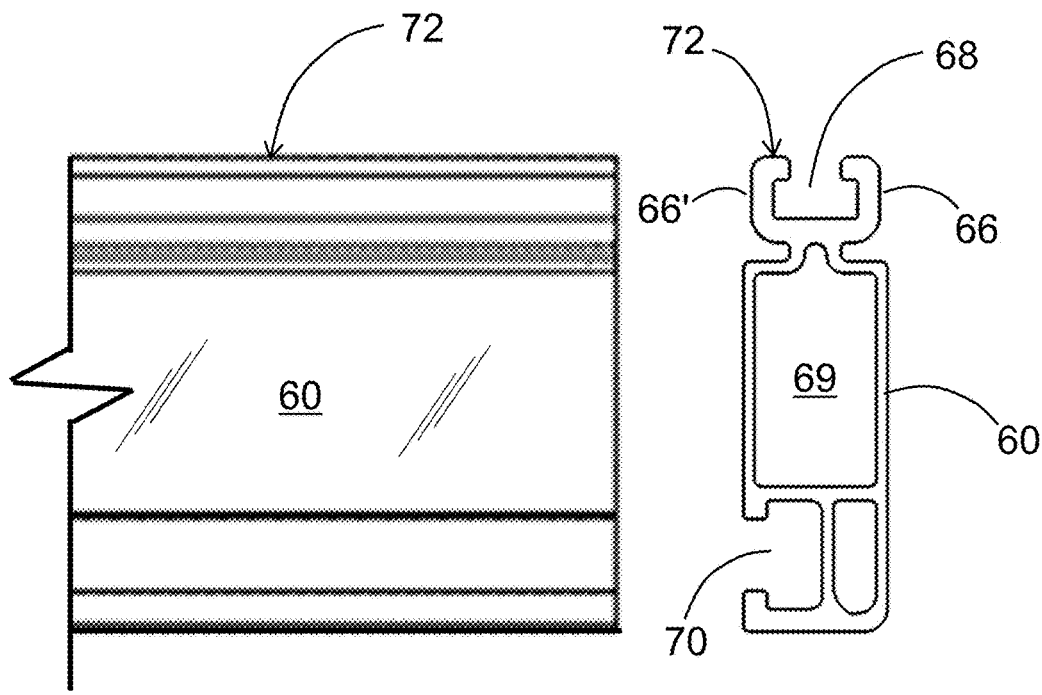
FIG. 37A  FIG. 37B

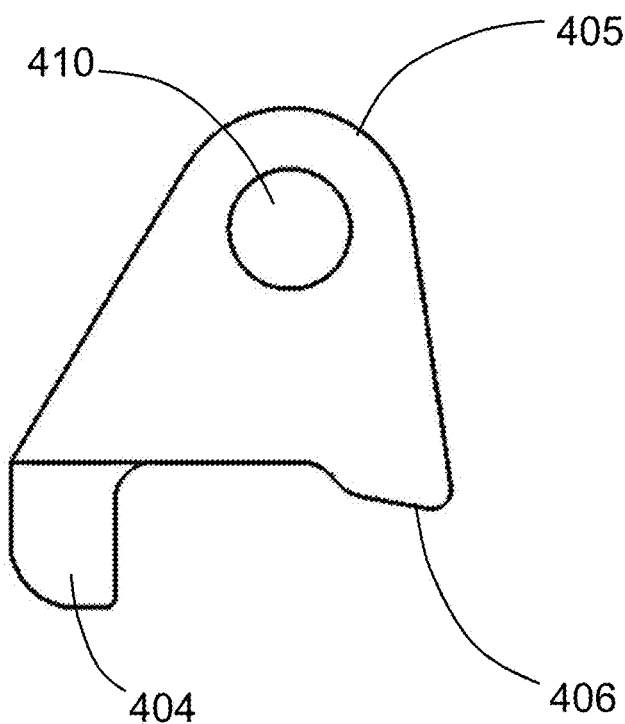
FIG. 65
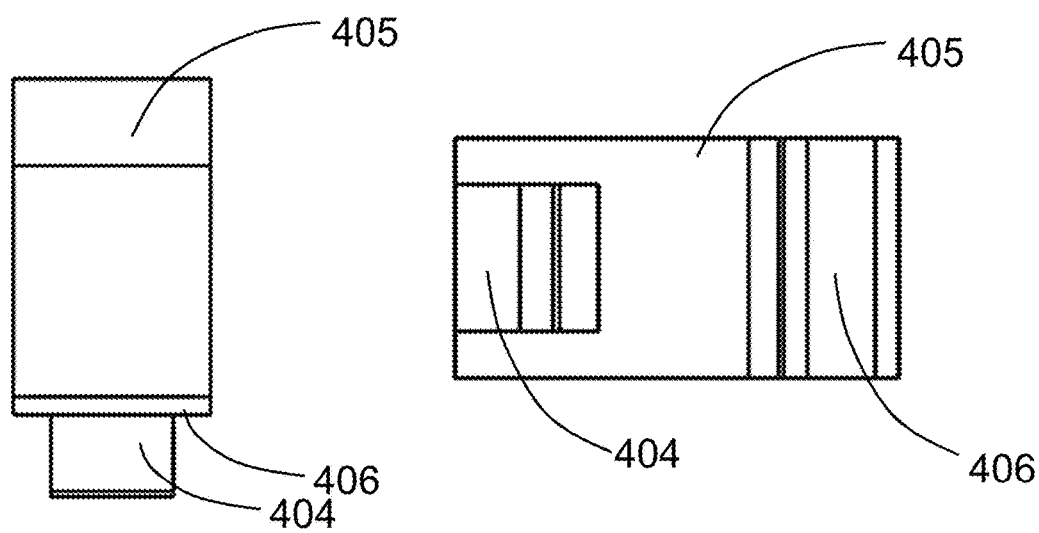
FIG. 66      FIG. 67

500

_US 10,451,315 B2_

UNIVERSAL END CLAMP FOR MOUNTING SOLAR PANELS ON STRUCTURAL RAILS

BACKGROUND OF THE INVENTION

Field of the Invention

This invention pertains to structures and methods for mounting photovoltaic solar panels on roofs using structural rails.

Introduction and Related Art

Traditional solar panel mounting schemes utilize long structural rails, which are attached to the roof with lag screws, upon which the solar panels are mounted. As shown in FIG. 1, T-shaped mounting brackets 3, 3' are used to attach the solar panels 2, 2' to rails 60, 60' in both the mid-clamp and end-clamp locations. However, in traditional designs, these mounting brackets 3, 3', including end clamps located at the ends of a row of solar panels, can be seen from the top of the panels, and, thus, can be an aesthetic distraction to the overall look and appearance of the photovoltaic (PV) system. A preferred mounting system is one that hides the attachment hardware underneath the solar panels, which gives the PV system a clean, uncluttered appearance.

Unirac's traditional rail based racking systems use a standard U-shaped or T-shaped top mounting mid-clamp. The traditional Unirac end clamp requires that a portion of the rail extend beyond the edge of the solar module by about 1.5 inches. Due to a wide variety of module manufacturers, and no industry standard for module cross section dimensions, Unirac's end clamp is produced in multiple sizes (SKU's) to accommodate a range of module frame heights. This increases costs by having to stock multiple size end clamps.

Solar racking customers and installers have indicated a need for a universal, one-size-fits-all, end clamp that also allows the rail to be placed or trimmed flush with the edge of the module. Unirac's new universal end clamp meets this need by clamping the solar module's lower flange to the rail. The new clamp allows the rail to be trimmed flush with the end of the module, and the clamp is completely hidden from view after installation.

U.S. Pat. Nos. 8,585,000; 8,376,298; and 8,801,349 to McPheeters, "Universal End Clamp", describe clamp bodies with wedge channels and bolts. None of the hardware rotates to clamp.

U.S. Pat. No. 9,022,021 to McPheeters, "Racking Assemblies for Solar Panel Installations", describes a C-shaped clamp for mounting a solar panel with a hidden clamp. None of the hardware rotates to clamp.

U.S. Pat. No. 9,160,273 to Schuit, "Universal End Clamp", describes a top-mounted end-clamp that clicks-on to rail flanges. None of the hardware rotates to clamp.

U.S. Pat. No. 9,306,490 to Haddock, "Photovoltaic Module Mounting Assembly", describes a top-mounted end-clamp. None of the hardware rotates to clamp.

U.S. Pat. No. 9,341,201 to McPheeters, "Self-Adjusting End Clamp", describes a top-mounted end-clamp that has an adjustable height. None of the hardware rotates to clamp.

U.S. Pat. No. 9,416,992 to Braunstein et al., "End Clamps for Solar Systems", describes a underside-mounted clamp that is hidden. Braunstein's bolt is oriented transverse to the longitudinal direction of a structural rail, and the bolt cannot be accessed from the end of the rail.

U.S. Pat. No. 9,531,319 to Braunstein et al., "Clamps for Solar Systems", describes a top-mounted end-clamp. None of the hardware rotates to clamp.

U.S. Pat. No. 9,528,725 to McPheeters, "Solar Panel Frame clamps Mounting a Solar Panel Frame to a Purlin", describes a C-shaped clamp for mounting a solar panel with a hidden clamp located underneath the solar panel. None of the hardware rotates to clamp.

U.S. Pat. No. 9,628,018 to Stapleton, "Panel Mounting Bracket with Under-Mounting Clamp and Related Methods", describes a clamp including top and bottom flanges that define a slot. A retaining set screw may be tightened to secure a panel frame lip within the slot.

U.S. Pat. No. 9,671,136 to Ash and Miene, "Clamp for Securing and Electrically Bonding SOlar Panels to a Rail Support", describes a C-shaped, top-mounted clamp for mounting a solar panel to a rail. None of the hardware rotates to clamp Against this background, the present invention was developed.

SUMMARY OF THE INVENTION

A universal end clamp and method for clamping a solar module to a rail, comprise means for applying a torque to a clamp body and generating a compressive clamping force between the body and a lower flange of a solar panel module frame, so that the lower flange of the module frame is clamped to the rail. The clamp is disposed underneath the solar module, where it cannot be seen. The components of the assembly that can move include threaded bolts, front and rear T-slides, drive blocks, cams, coil springs, leaf springs, and offset drive brackets.

BRIEF DESCRIPTION OF THE SEVERAL VIEWS OF THE DRAWING(S)

FIG. 36 shows a side elevation view of a universal end clamp in the clamped position, according to the present invention.

FIG. 37A shows a side elevation view of a dual-track rail, according to the present invention.

FIG. 37B shows a front end elevation view of a dual-track rail, according to the present invention.

FIG. 65 shows a side elevation view of another example of a cam, according to the present invention.

FIG. 66 shows a front elevation view of another example of a cam, according to the present invention.

FIG. 67 shows a bottom plan view of another example of a cam, according to the present invention.

DETAILED DESCRIPTION OF THE INVENTION

In general, embodiments of a universal end clamp assembly for clamping a solar panel to a rail comprise a clamp body and means for applying a torque to the body for generating a compressive clamping force between the body and a lower flange of a solar panel module frame, whereby the lower flange of the module frame is clamped to the rail.

The means for applying a torque can include a threaded bolt, which can be oriented parallel, or substantially parallel, to a longitudinal direction of the rail. Other means for applying a torque can include, but are not limited to, front and/or rear T-slides, drive blocks, cams, coil springs, leaf springs, and offset drive brackets.

We define the "longitudinal" direction as being parallel to the long direction (long axis) of a structural rail 60, and the "transverse" direction as being perpendicular to the longitudinal direction.

Figure 1:
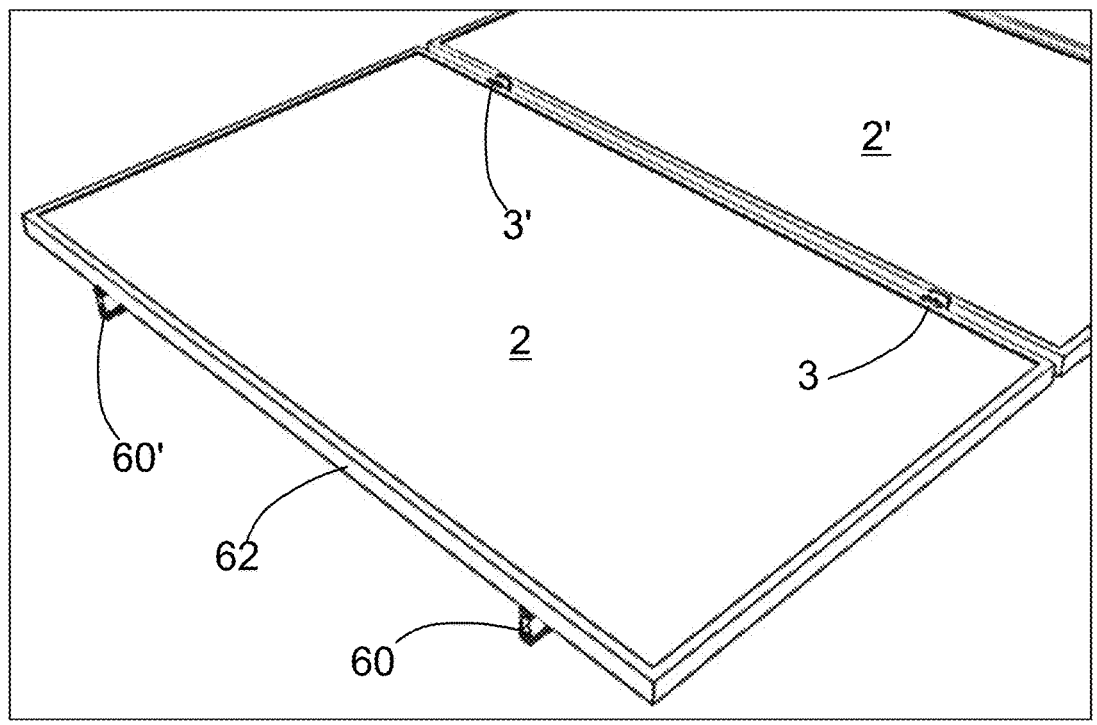
FIG. 1 shows a perspective view of a pair of solar panels mounted on a pair of dual-track rails, according to the present invention.

FIG. 1 shows a perspective view of a pair of solar panels 2, 2' mounted on a pair of dual-track rails 60, 60' with T-clips 3, 3', according to the present invention. In this example, the ends of rails 60, 60' are flush with the outer edge of solar module frame 62.

Figure 2:
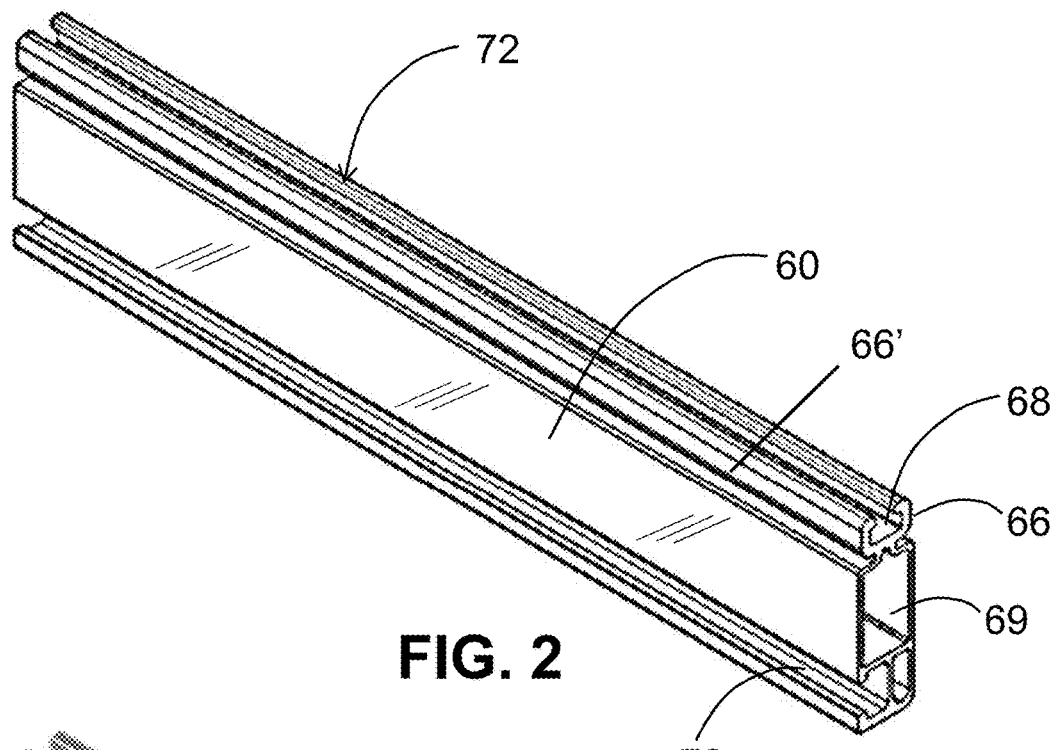
FIG. 2 shows a perspective view of a dual-track rail, according to the present invention.

FIG. 2 shows a perspective view of a dual-track rail, according to the present invention. Dual-track rail 60 is a monolithic, extruded part with a longitudinal axis, a hollow central cavity 69, a recessed, lower first track (C-shaped channel/slot) 70, and a recessed, upper second track (C-shaped channel/slot) 68. Dual-tracks 68 and 70 accept T-shaped bolt heads (not shown) for mounting hardware thereto. Upper track (C-shaped channel/slot) 68 is defined by a pair of sidewalls 66, 66'. More details of dual-track rail 60 can be found in a series of U.S. patents by Liebendorfer: U.S. Pat. Nos. 9,397,606; 8,763,968; 8,640,400; 8,128,044; 7,766,292; 7,748,175; 7,600,349; 7,434,362; 7,260,918; D496,249; and D496,248; which are incorporated herein by reference in their entirety. Rail 60 can be a Unirac Solar-Mount™ dual-track rail. Note: In all embodiments, rail 60 can be a single-track rail, with a single upper track 68 and no lower track 70. Alternatively, in all embodiments, rail 60 can be a triple-track rail. An upper surface 72 of the rail 60 is also indicated in FIG. 2.

Figure 3:
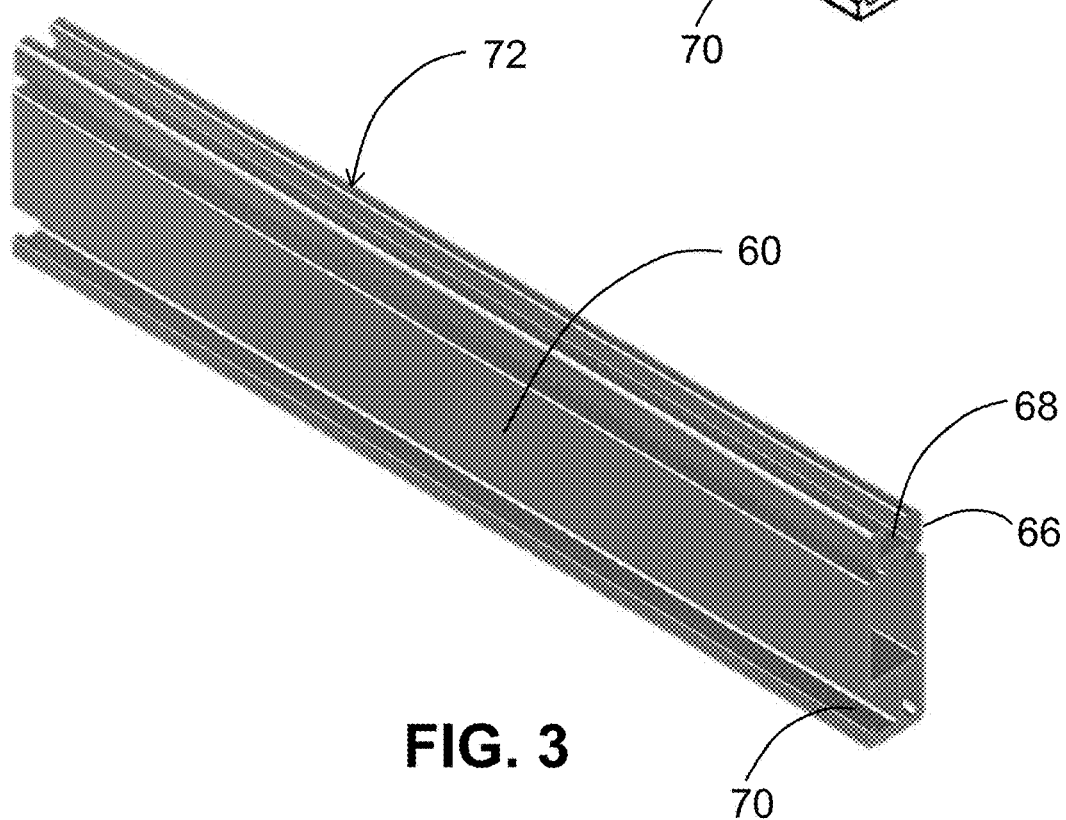
FIG. 3 shows a shaded perspective view of a dual-track rail, according to the present invention.

FIG. 3 shows a shaded perspective view of a dual-track rail 60, according to the present invention. Also indicated in FIG. 3 are one track sidewall 66, the upper second track 68, the lower first track 70, and the upper surface 72 of the rail.

Figure 4:
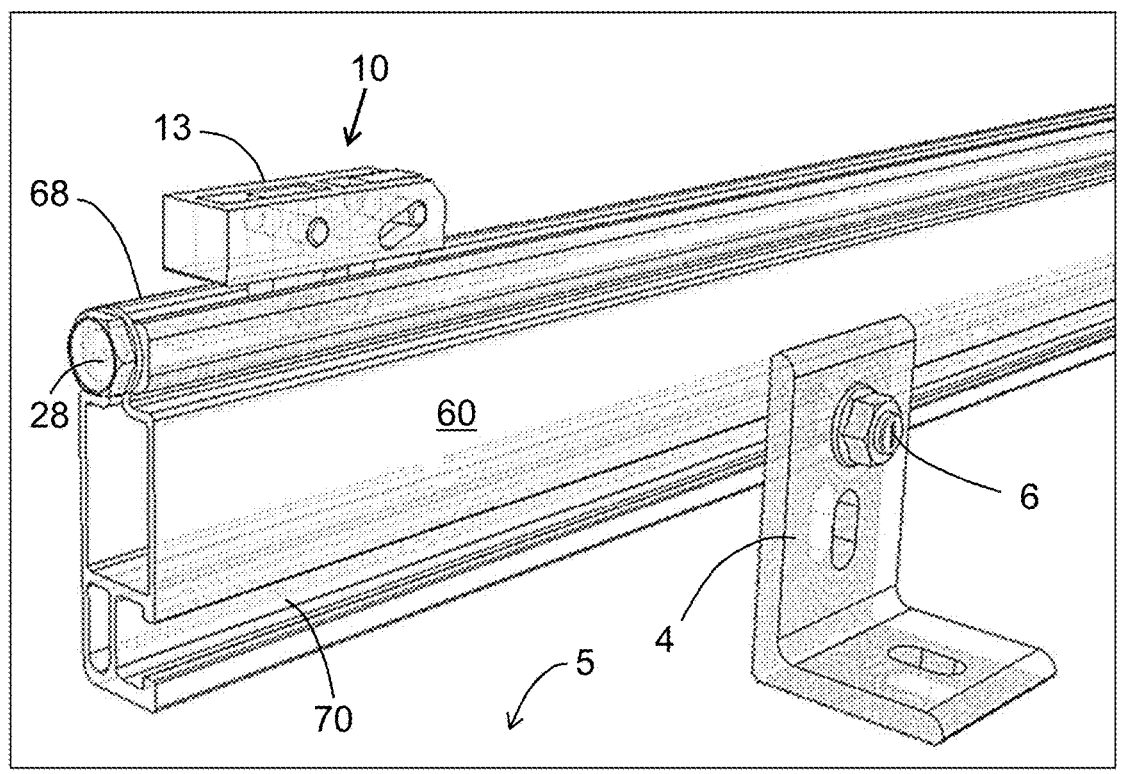
FIG. 4 shows a perspective view of a first example of a universal end clamp mounted on a dual-track rail that is attached to a roof with an L-foot mount, according to the present invention.

FIG. 4 shows a perspective view of a first example of a universal end clamp assembly 10, having a clamp body 13, mounted on a dual-track rail 60 that is attached to a roof 5 with an L-foot mount 4 using T-bolt 6 that slots into the lower track 70 of rail 60, according to the present invention. An end clamp bolt having a head 28 is inserted into the upper track 68, which is shown in more detail in subsequent Figures.

Figure 5:
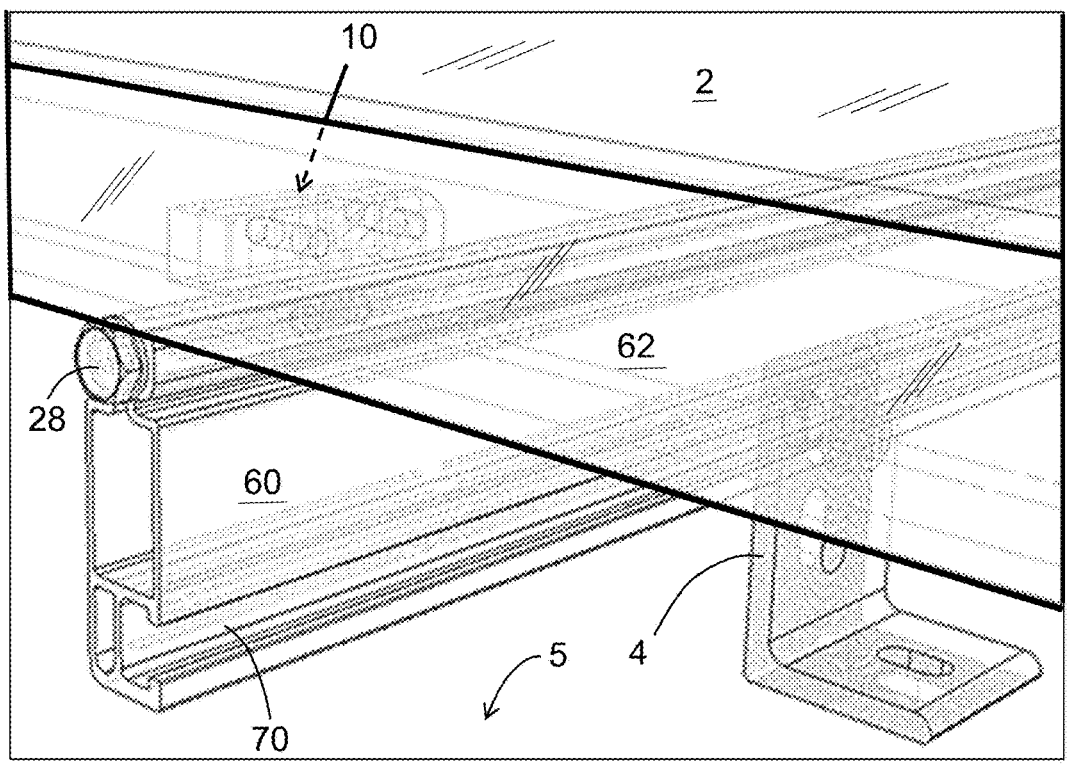
FIG. 5 shows a perspective view of a solar panel mounted to a universal end clamp mounted on a dual-track rail that is attached to a roof with an L-foot mount, according to the present invention.

FIG. 5 shows a perspective view of a solar panel 2 with a module frame 62 that is mounted to a universal end clamp 10 mounted on a dual-track rail 60 that is attached to a roof 5 with an L-foot mount 4 according to the present invention. The clamp bolt 28 and the lower track 70 are also identified in FIG. 5.

Figure 6:
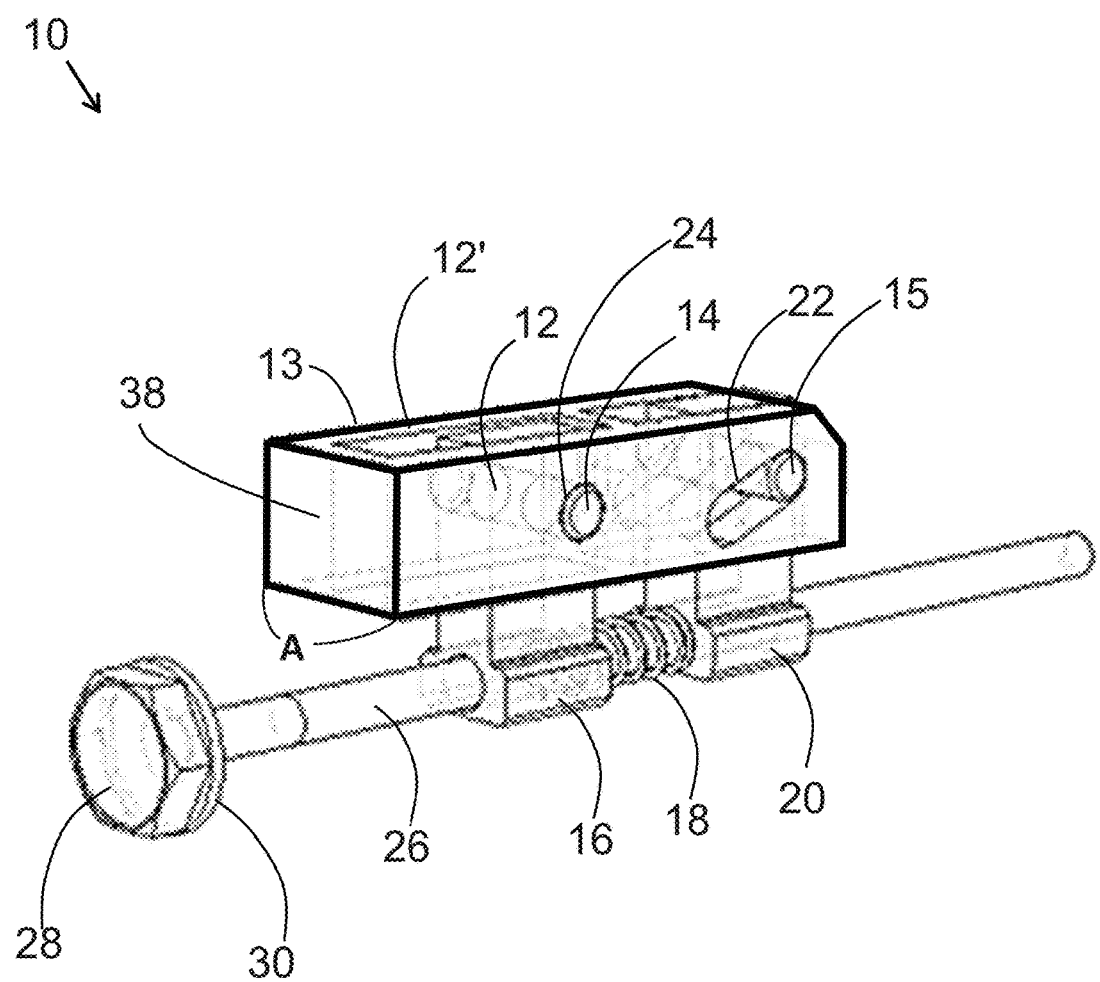
FIG. 6 shows a perspective view of a universal end clamp, according to the present invention.

FIG. 6 shows a perspective view of a universal end clamp assembly 10, according to the present invention. Clamp 10 comprises: a clamp body 13; a contact point "A" located at the front end of clamp body 13; front pivot pin 14, a rear drive pin 15, inclined slots/ramps 22, a front T-slide 16 with a longitudinal through-hole 56 (FIG. 7) at a lower portion; a rear T-slide 20 with a longitudinal threaded hole 50 (FIG. 7) at a lower portion; a coil spring 18 disposed in-between front T-slide 16 and rear T-slide 20; a threaded drive bolt 26 disposed through the holes 50 and 56 in T-slides 16 and 20; and a bolt head 28 with flat washer 30. Front T-slide 16 is pivotally linked to clamp body 13 via front pivot pin 14 and a transverse through-hole disposed in an upper portion of T-slide 16; and the rear T-slide is pivotally linked to clamp body 13 via rear drive pin 15 and a transverse through-hole disposed in a upper portion of T-slide 20. Clamp body 13 is a monolithic structural body comprising a front plate 12 and a rear plate 12'; a front plate 38 that bridges across front and rear plates 12 and 12'; through holes, one of which is indicated by reference number 24, for receiving front pivot pin 14; and a pair of inclined slots, one of which is indicated by reference number 22, for receiving rear drive pin 15. Front T-slide 16 serves as a pivot block (where the pivot point is inside of the block), and rear T-slide 20 serves as a drive block (which pushes on clamp body 13 with drive pin 15). The lower portion of the front T-slide 16 comprises a first pair of chamfered shoulders (see FIG. 31) that define a "T"-shaped cross-section; and the lower portion of the rear T-slide 20 comprises a second pair of chamfered shoulders (see FIG. 26) that define a "T"-shaped cross-section. Inclined slots, including the slot 22 mentioned, can be inclined at an angle to the horizontal that ranges from, for example, 20°-45°, with a preferred angle of 25.6°.

Figure 7:
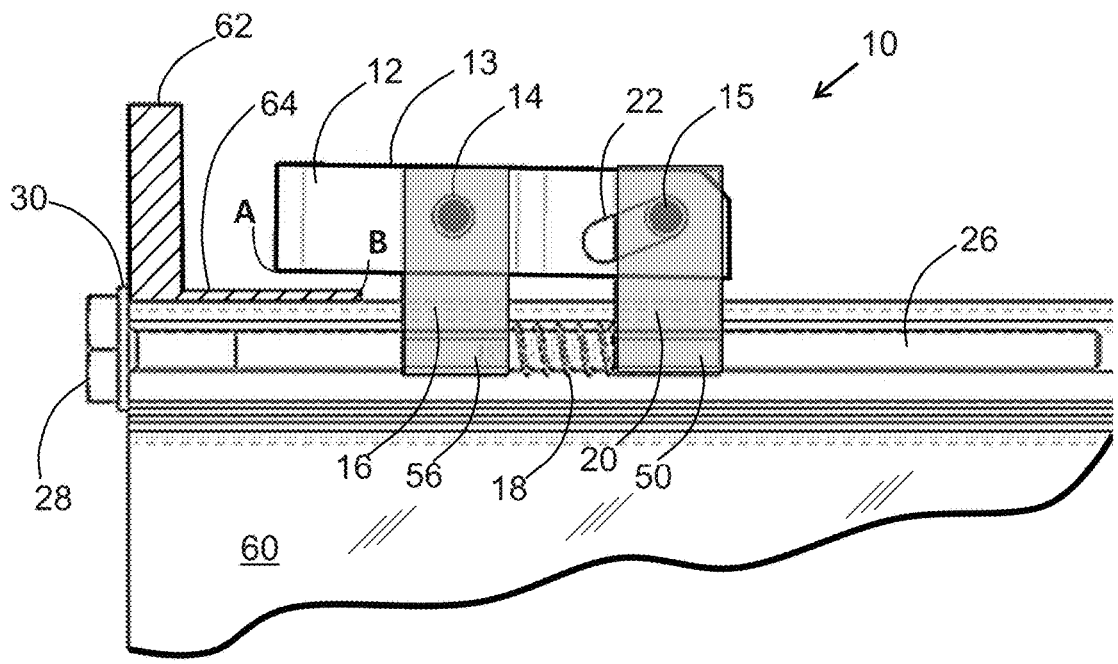
FIG. 7 shows a side elevation view of a universal end clamp in the unclamped (open) position, according to the present invention.
Figure 8:
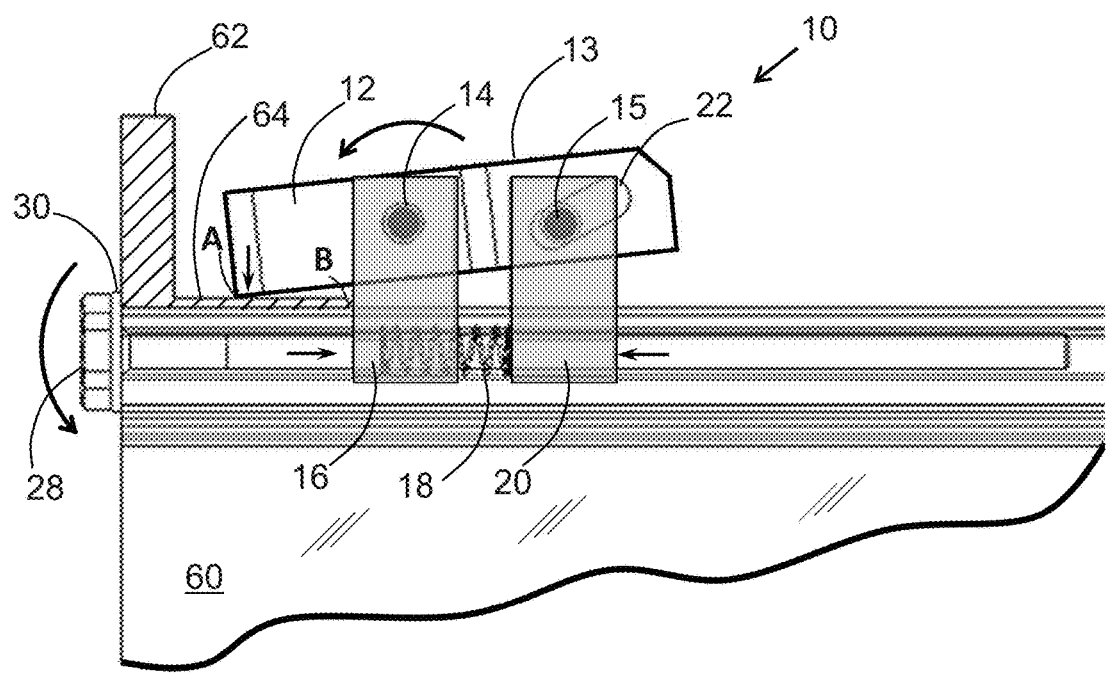
FIG. 8 shows a side elevation view of a universal end clamp in the clamped (locked) position, according to the present invention.

FIG. 7 shows a side elevation view of a universal end clamp assembly 10 in the unclamped (open) position, according to the present invention. In this configuration, front and rear plates 12, 12' of clamp body 13 are positioned horizontally and parallel, or slightly tipped upwards, relative to the horizontal longitudinal axis of rail 60. Module frame 62 is positioned with its lower left corner abutting against the flat washer 30 next to bolt head 28 of drive bolt 26. Contact corner points "A" on plates 12, 12' do not make contact with lower flange 64 of module 62 in this view (which permits an installer to place module frame 62 onto the upper surface 72 of rail 60). Spring 18 pushes the two T-slides 16 and 20 apart from one another, which forces the rear drive pin 15 to rest in the upper right-hand corner of inclined slot 22; this configuration keeps the clamp 10 in an open position. The front pivot pin 14, hidden and thus shown in phantom in FIG. 7, is additionally indicated FIG. 8 shows a side elevation view of a universal end clamp assembly 10 in the clamped (locked) position, according to the present invention. After placing module frame 62 in position (see FIG. 7), where the lower end of module frame 62 butts up against flat washer 30 next to bolt head 28, the clamping process comprises the following two steps. In step #1, bolt 26 is turned a sufficient number of turns (rotations) so that both the front T-slide 16 (with through hole 56 indicated in FIG. 7) and the rear T-slide 20 (with threaded hole 50 indicated in FIG. 7) are pulled together acting as a single unit towards the distal edge "B" of lower flange 64 (because spring 18 pushes on the front T-slide 16 (which slides along bolt 26 best shown in FIG. 6) as the rear T-slide 20 is driven towards bolt head 28 by the engagement of threaded hole 50 (FIG. 7) in rear T-slide 20 with rotation of bolt head 28. In other words, bolt threads of the bolt 26 that are engaged with rear T-slide 20 internal threads 50 (See FIGS. 26 and 27) draw clamp assembly 10 towards module flange (return leg) 64 when rotated. Eventually, the leading edge of front T-slide 16 makes contact at point "B" with the distal edge of module flange 64 and stops translation. In step #2, after making contact with module frame 64, increasing torque on the drive bolt 26 overcomes the spring resistance and causes rear T-slide 20 to draw closer to (now-fixed) front T-slide 16, which decreases the distance between the front and rear T-slides 16 and 20, respectively (also, thereby compressing spring 18). As the distance between front and rear T-slides 16 and 20 decreases, drive pin 15 slides (traverses) inside inclined slot (ramp) 22, which generates a force that causes clamp body 13 to rotate about its front pivot pin 14. This causes the two side plates 12 and 12' (FIG. 6) of clamp body 13 to tip (tilt) downwards at a relatively small angle (which can range, for example, from 2°-10°, with a preferred tilt angle of 5°), relative to the horizontal longitudinal axis of rail 60. Corner point "A" on plates 12 and 12' then make contact with lower flange 64 of module 62, which clamps and locks module 62 into place on rail 60 by generating a large, vertical downwards force on lower flange 64. Both bearing forces and friction forces at contact point "A" between plates 12 and 12' and flange 64 prevents the flange 64 from sliding when the parts are clamped. In the event that the contact surface of the clamp plates 12, 12' is not absolutely parallel to the module flange 64, then point loading can also occur to help prevent the module flange 64 from sliding.

Note that where a coil spring 18 is shown in the examples illustrated in FIGS. 6-15, it is to be understood that any means for urging can be used in place of a coil spring, for example (but not limited to), a coil spring, a leaf spring, stacked Bellevue washers, angled tabs, or any elastic, spring-like material or structure (e.g., a polymeric elastomer cylinder, or porous, compressible, elastic material). Taper 76 (FIG. 9) can also be minimized in the configuration provided there is a physical stop to the threaded head and sufficient mechanical advantage is achieved in the threads.

Figure 9:
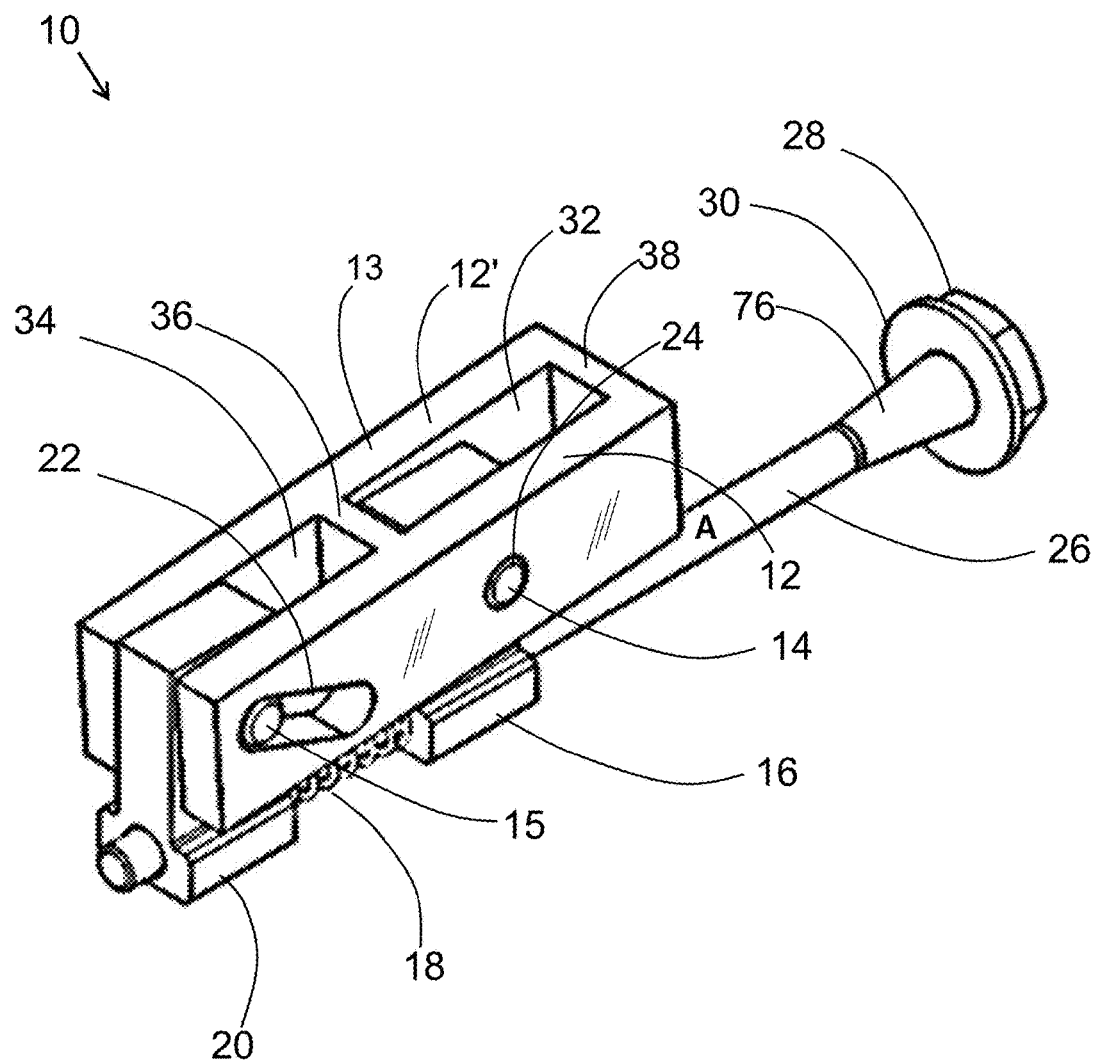
FIG. 9 shows a perspective view of a universal end clamp, according to the present invention.

FIG. 9 shows a perspective view of a universal end clamp assembly or clamp 10, according to the present invention. Clamp 10 comprises: a clamp body 13; a contact point "A" located at the front end of clamp body 13; front pivot pin 14, a rear drive pin 15, inclined slot 22, a front T-slide 16 with a through hole 56 (FIG. 7) at the bottom; a rear T-slide 20 with a threaded hole 50 (FIG. 7) at the bottom; a coil spring 18 disposed in-between front T-slide 16 and rear T-slide 20; a threaded drive bolt 26 disposed through the holes 50 and 56 in T-slides 16 and 20; and a bolt head 28 with flat washer 30. Front T-slide 16 is pivotally linked to clamp body 13 via front pivot pin 14; and rear T-slide 20 is pivotally linked to clamp body 13 via rear drive pin 15. Clamp body 13 is a monolithic structural body comprising a front plate 12 and a rear plate 12'; a front plate 38 that bridges across front and rear plates 12 and 12'; through hole 24 for receiving front pivot pin 14; and a pair of inclined slots 22 (only one shown) for receiving rear drive pin 15. Clamp body 13 further comprises a web section 36 that is disposed across front plate 12 and rear plate 12', which provides structural support and resistance to twisting. The open cavities in-between plates 12 and 12' are indicated by reference numbers 32 on the front end and by number 34 on the rear end of clamp body 13. Cavity 32 is closed on four sides and open top and bottom, while cavity 34 is closed on three sides (one side is open) and open top and bottom. Tapered end 76 of bolt 26 is used to improve manufacturability. The taper is intended to provide a "backstop" supporting feature, where the head 28 and its flange 30 (as a single piece or separate pieces) could locate and bear load that would stop rotational movement of the nut, thereby transferring that turning motion into the threaded-rod, 26, by means of the tapered backstop 76 and allowing the 2- (or 3-) piece pseudo-bolt to operate as a single unit on the rear T-slide 20. This feature basically turns a threaded-rod into a standard machine screw, via the 2 or 3 pieces, and helps transfer turning motion and load throughout. Alternatively, taper 76 can be a plastic sleeve/shroud that is forced into the open end of track 68 and holds bolt 26 in place during installation via friction.

Figure 10A:
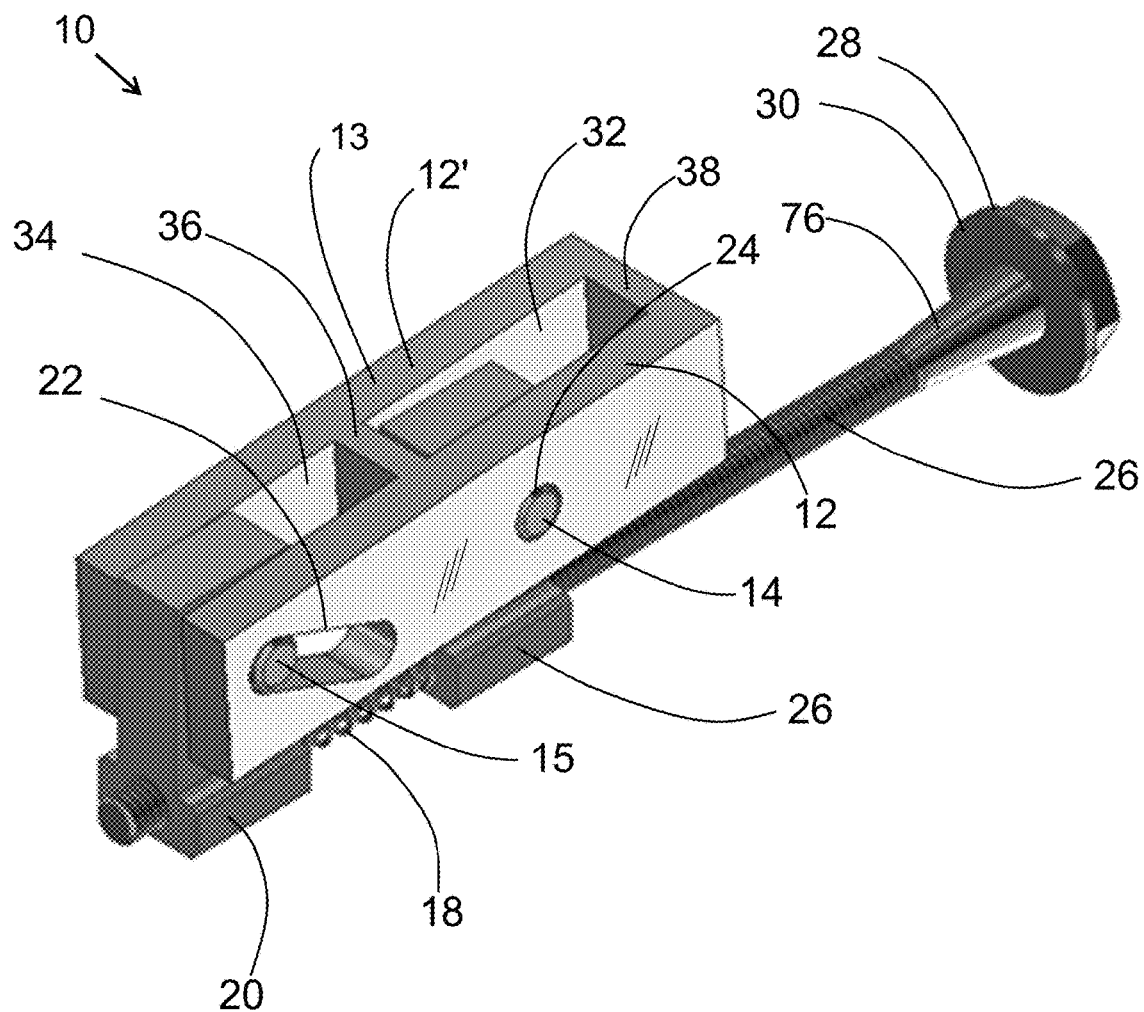
FIG. 10A shows a shaded perspective view of a universal end clamp, according to the present invention.

FIG. 10A shows a shaded perspective view of a universal end clamp assembly 10, according to the present invention. The description is the same as that for FIG. 9.

Figure 10B:
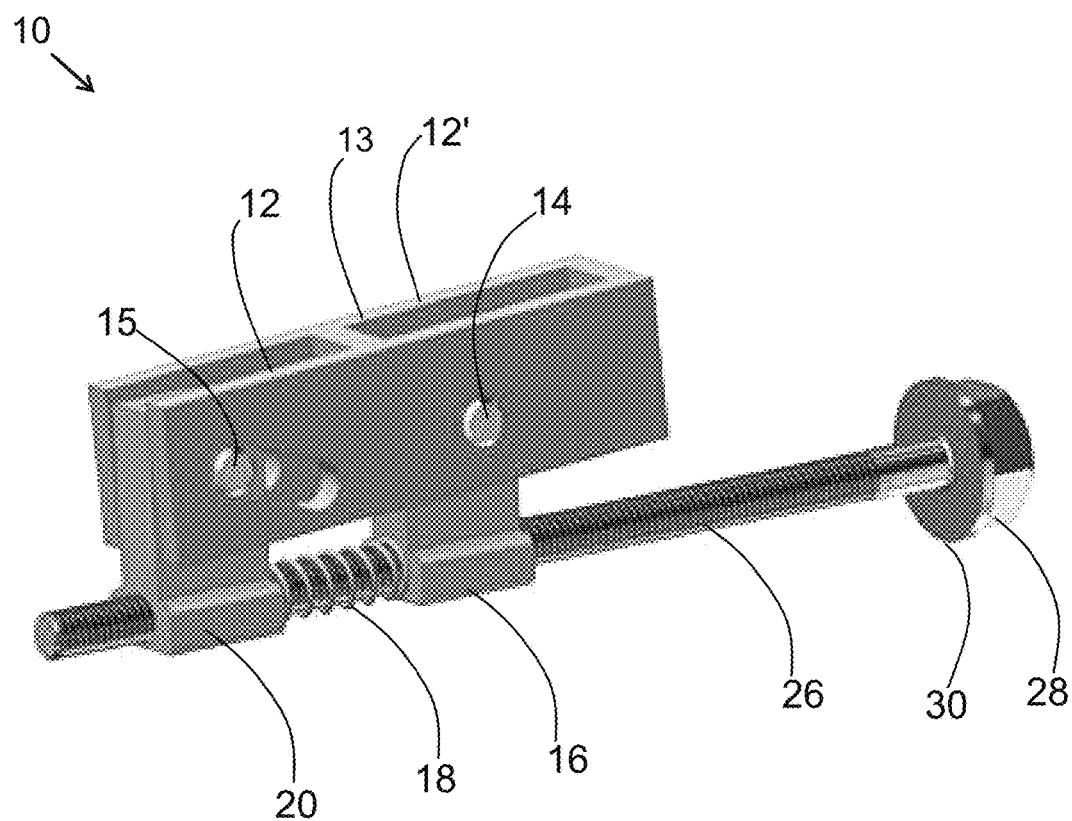
FIG. 10B shows a shaded perspective view of a universal end clamp, according to the present invention.

FIG. 10B shows a shaded perspective view of a universal end clamp assembly 10, according to the present invention. The description is the same as that for FIG. 9.

Figure 11:
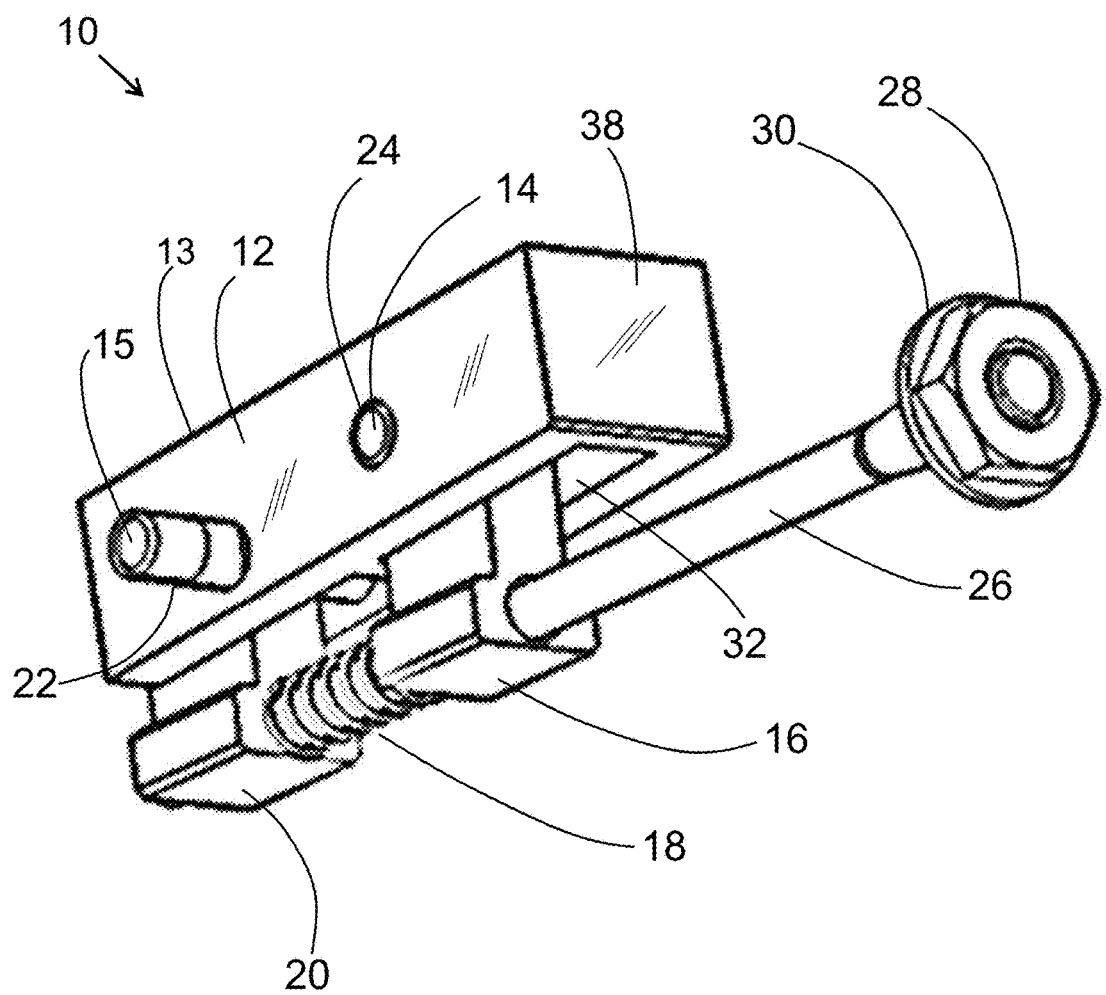
FIG. 11 shows a perspective view of a universal end clamp, according to the present invention.

FIG. 11 shows a perspective view of a universal end clamp assembly 10, according to the present invention. The description is the same as that for FIG. 9.

Figure 12:
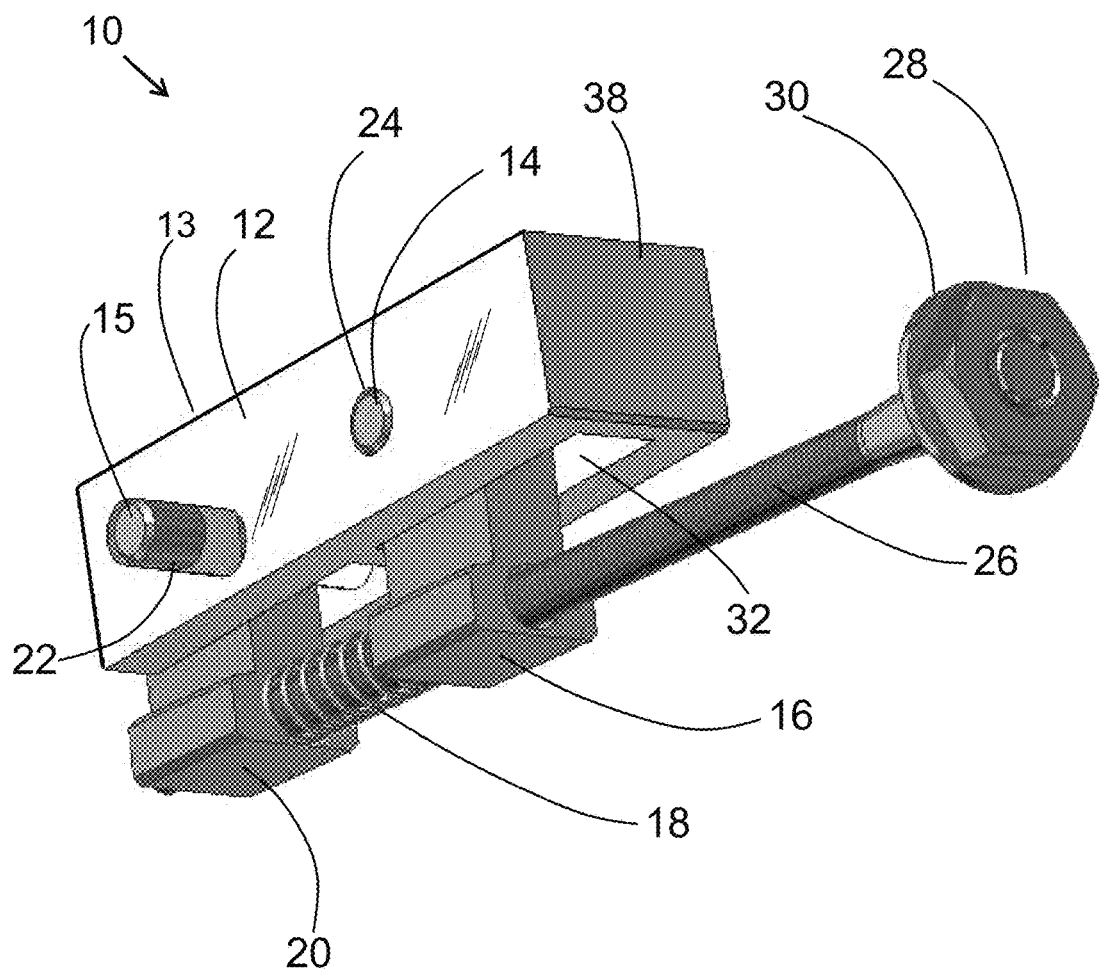
FIG. 12 shows a shaded perspective view of a universal end clamp, according to the present invention.

FIG. 12 shows a shaded perspective view of a universal end clamp assembly 10, according to the present invention. The description is the same as that for FIG. 9.

Figure 13:
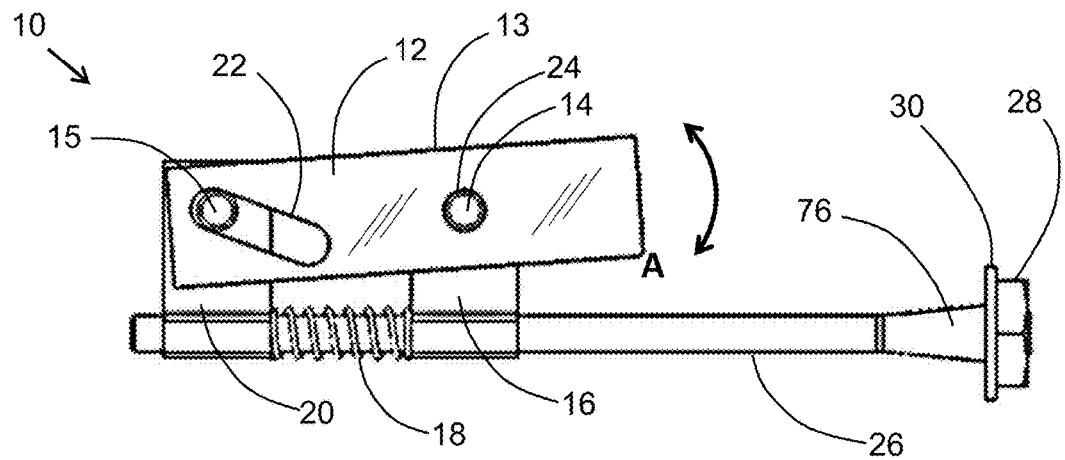
FIG. 13 shows a side elevation view of a universal end clamp in the unclamped (open) position, according to the present invention.

FIG. 13 shows a side elevation view of a universal end clamp assembly 10 in the unclamped (open) position, according to the present invention. The description is the same as that for FIG. 9.

Figure 14:
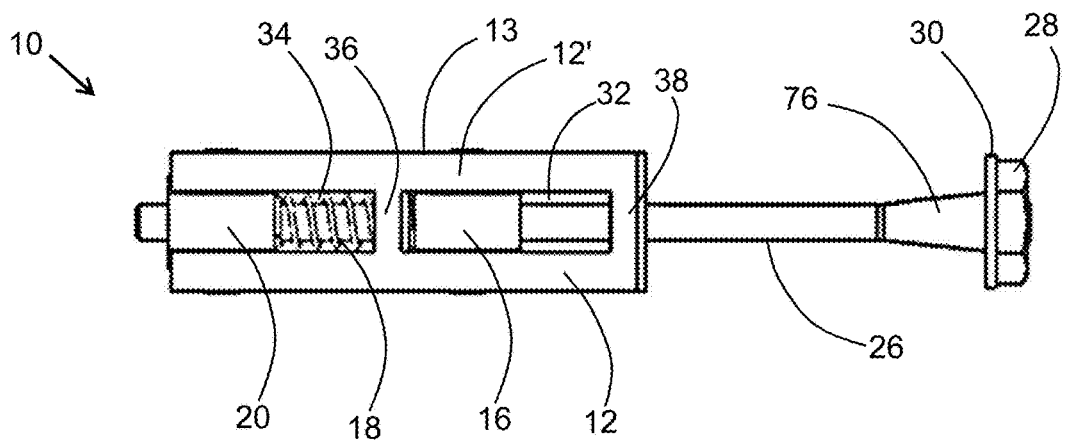
FIG. 14 shows a top plan view of a universal end clamp in the unclamped (open) position, according to the present invention.

FIG. 14 shows a top plan view of a universal end clamp assembly 10 in the unclamped (open) position, according to the present invention. The description is the same as that for FIG. 9.

Figure 15:
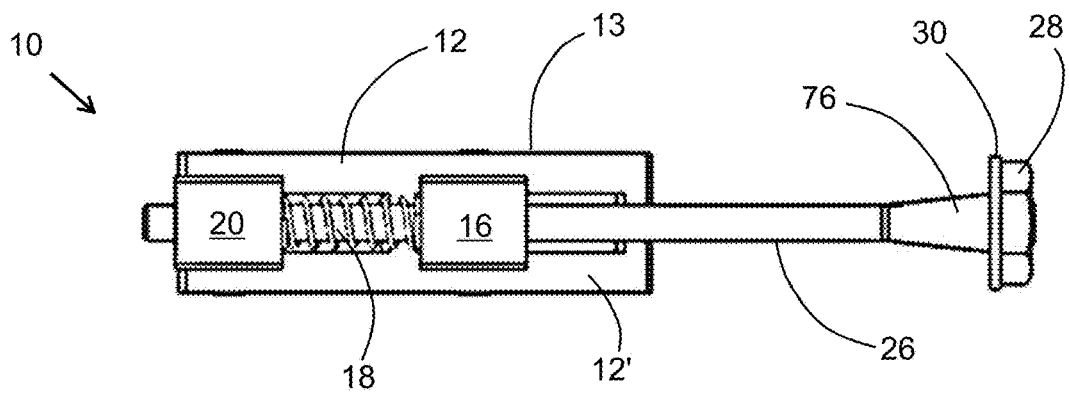
FIG. 15 shows a bottom plan view of a universal end clamp in the unclamped (open) position, according to the present invention.

FIG. 15 shows a bottom plan view of a universal end clamp assembly 10 in the unclamped (open) position, according to the present invention. The description is the same as that for FIG. 9.

Figure 16:
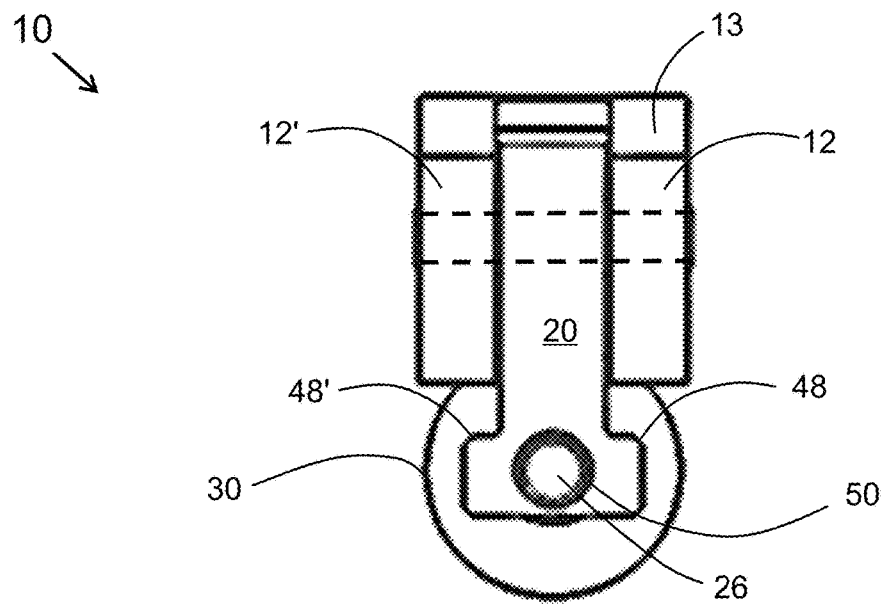
FIG. 16 shows a rear elevation view of a universal end clamp in the unclamped (open) position, according to the present invention.

FIG. 16 shows a rear elevation view of a universal end clamp assembly 10 in the unclamped (open) position, according to the present invention. The description is the same as that for FIG. 9. A pair of shoulders 48 and 48' on the "T" part of rear T-slide 20 can be seen. The "T"-shape of shoulders 48 and 48' is designed to closely match the complementary shape 66, 66' of T-shaped track 68 in rail 60 (see FIG. 37B). The threaded hole 50 mentioned in connection with FIGS. 7-8 is also indicated.

Figure 17:
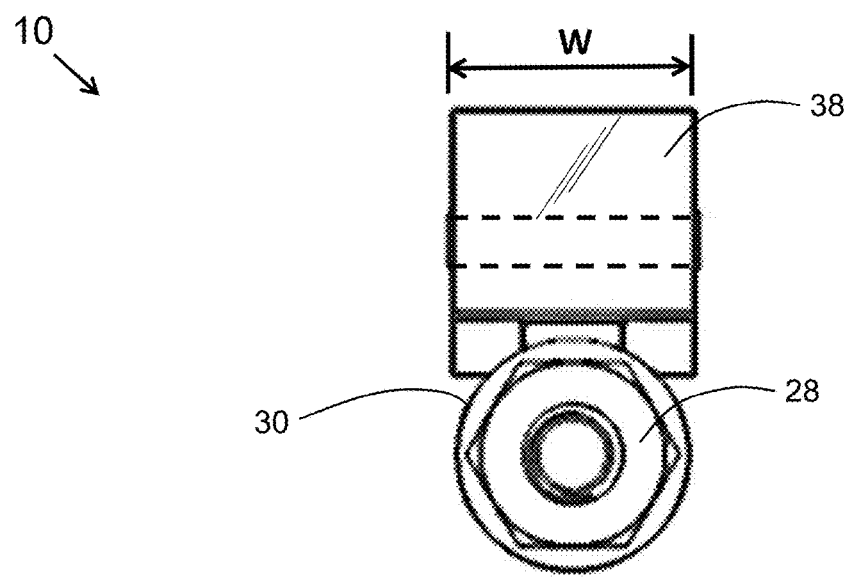
FIG. 17 shows a front elevation view of a universal end clamp in the unclamped (open) position, according to the present invention.

FIG. 17 shows a front elevation view of a universal end clamp assembly 10 in the unc lamped (open) position, according to the present invention. The description is the same as that for FIG. 9. In this example, the width of front plate 38 can be approximately the same as the outer diameter of flat washer 30.

Figure 18:
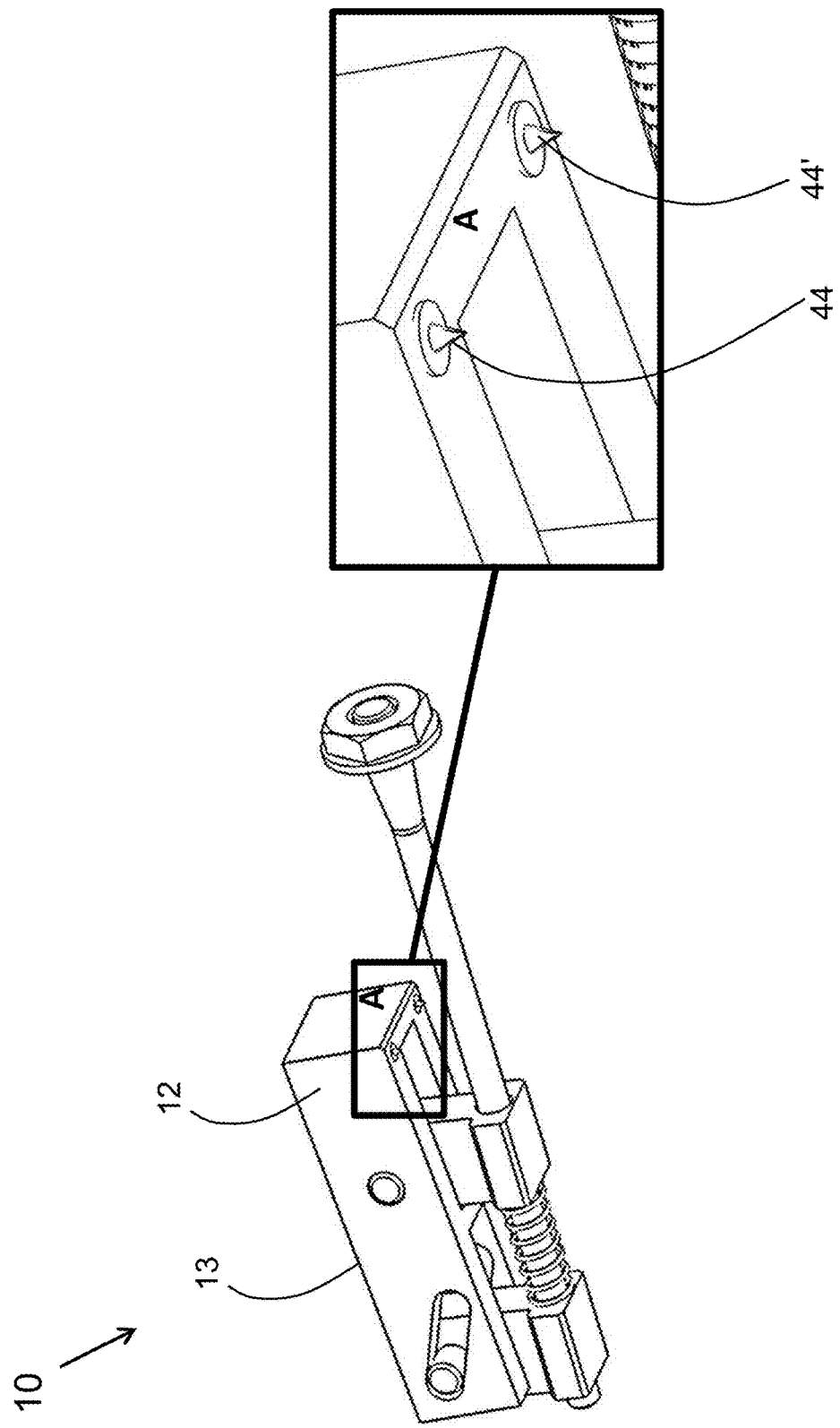
FIG. 18 shows a perspective view of a universal end clamp, according to the present invention.

FIG. 18 shows a perspective view of a universal end clamp assembly 10, according to the present invention. Disposed on the underside of side plates 12 and 12' can be a pair of sharp points (pins) 44 and 44', respectively. These sharp points can be made of high yield strength steel, and are sufficiently sharp so as to penetrate the anodized coating (not shown) of an aluminum module frame flange 64 and provide electrical conduction between the clamp 10 and the solar panel module frame 62.

Figure 19A:
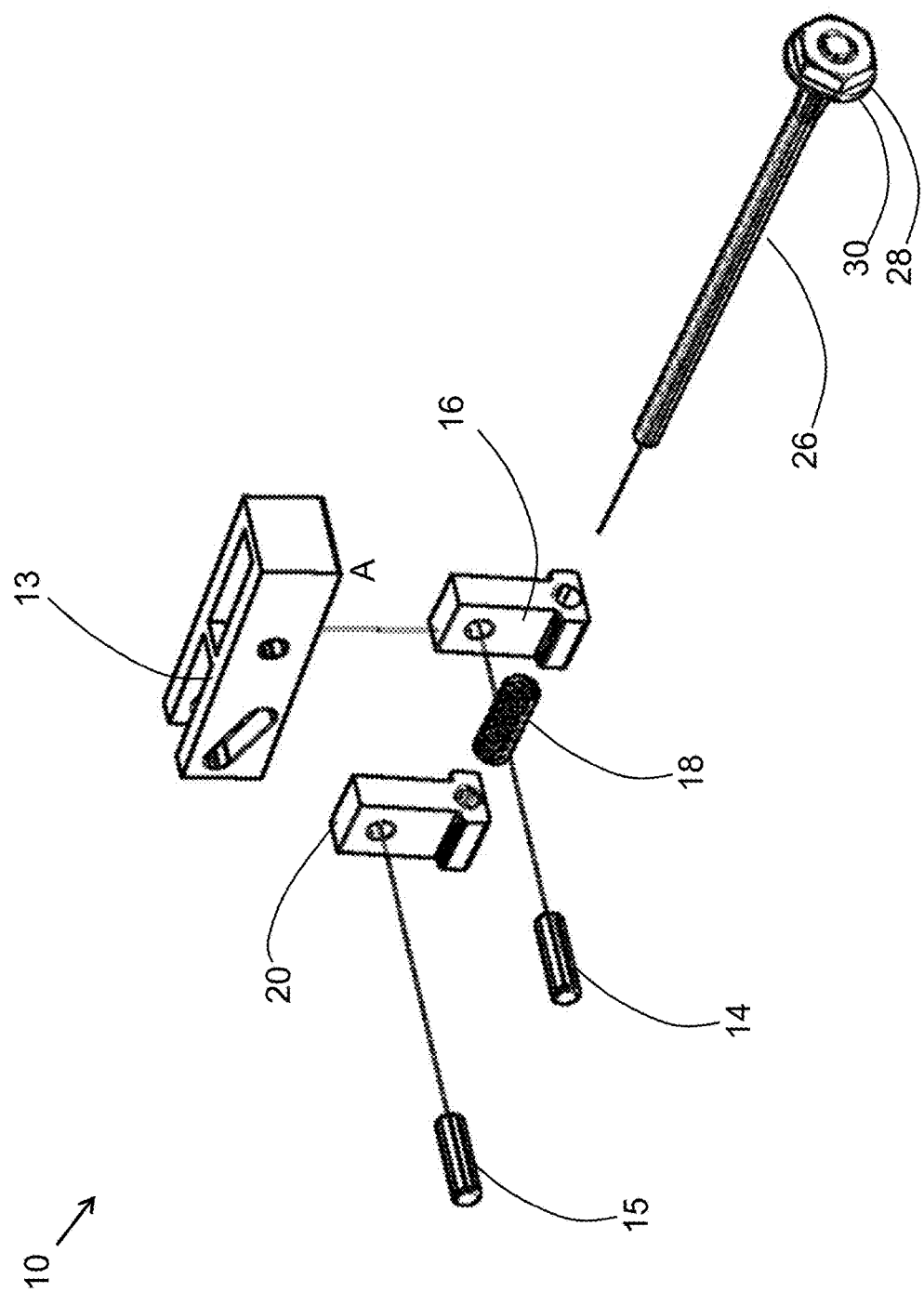
FIG. 19A shows an exploded perspective view of a universal end clamp, according to the present invention.

FIG. 19A shows an exploded perspective view of a universal end clamp assembly 10, according to the present invention. Pivot pins 14 and 15 can be press-fit (interference fit) into their respective holes or attached by some other method (such as brazing, or screw thread attachment, Cotter pin, nut and bolt, etc.). The clamp body 13, the front T-slide 16, the coil spring 18, the rear T-slide 20, the drive bolt 26, the end clamp bolt 28, and the flat washer 30 are also indicated.

Figure 19B:
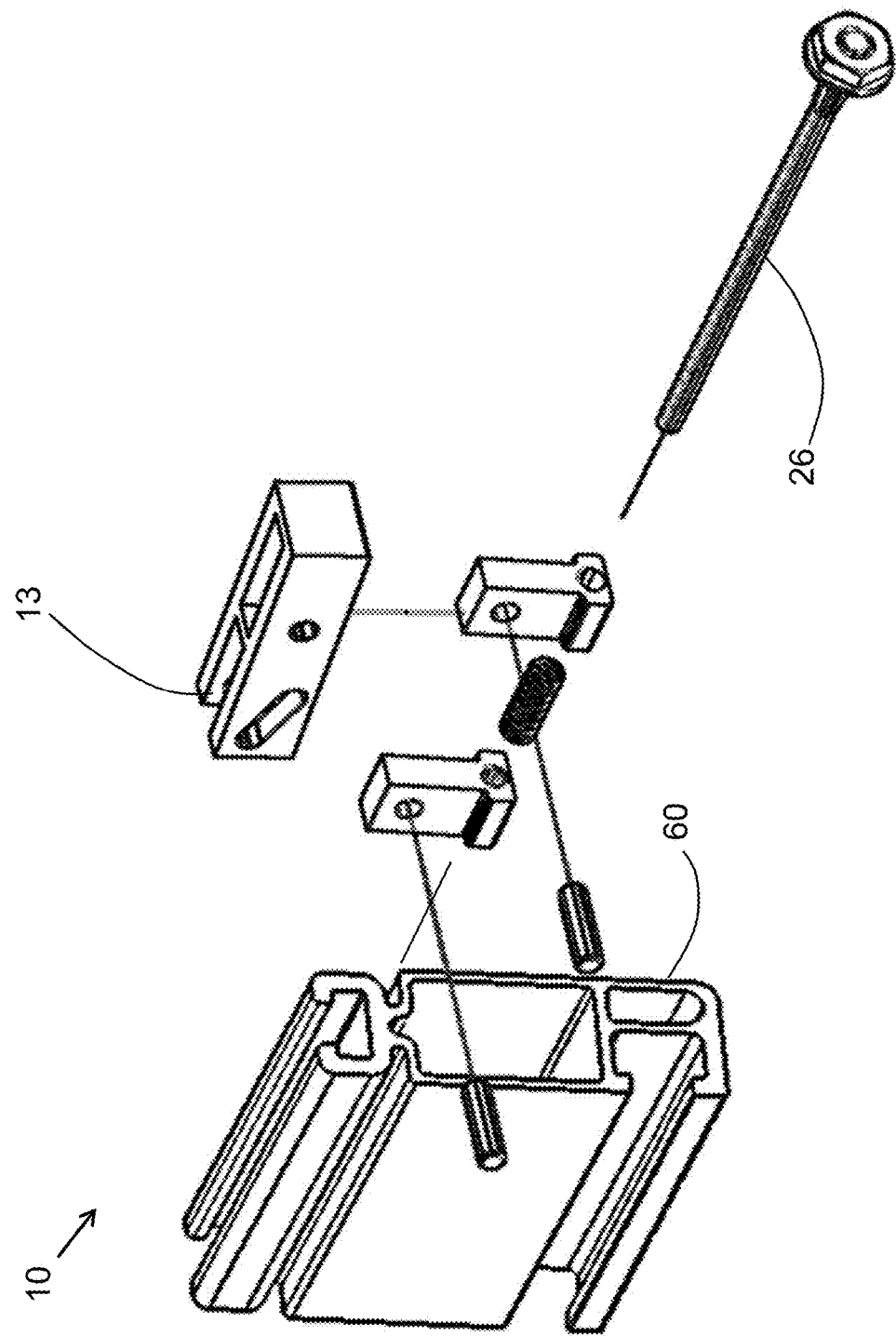
FIG. 19B shows an exploded perspective view of a universal end clamp, according to the present invention.

FIG. 19B shows an exploded perspective view of a universal end clamp assembly 10 with rail 60, according to the present invention. The clamp body 13 and the drive bolt 26 are also indicated.

Figure 20:
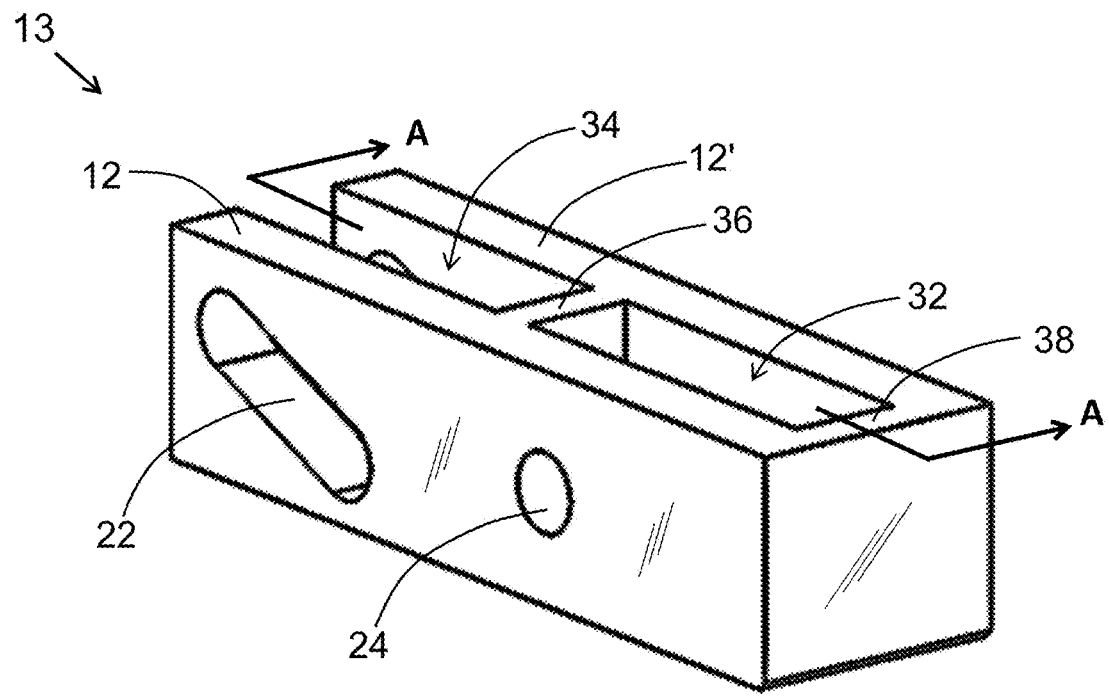
FIG. 20 shows a perspective view of a clamp body clamp, according to the present invention.

FIG. 20 shows a perspective view of a clamp body 13, according to the present invention. Clamp body 13 is a monolithic structural body comprising a front plate 12 and a rear plate 12'; a web section 36; a front plate 38 that bridges across front and rear plates 12 and 12'; through holes 24, 24' for receiving front pivot pin 14; a pair of inclined slots 22, 22' (FIG. 21) for receiving rear drive pin 15; and open cavities 32 and 34. Inclined slot 22, 22' can be inclined at an angle to the horizontal that ranges from, for example, 20°-30°, with a preferred angle of 25.6°. The aspect ratio (width:height) of plate 12 can be, for example, 4:1. Clamp body 13 can be made of steel or aluminum alloy, and can be made by extrusion, machining, wire electro-discharge machining (EDM), or 3-D additive printing. Alternatively, if plates 12 and 12' are made a little longer than what is shown in FIG. 7, for example, then rear cavity 34 can be closed on four sides and open on the top and bottom (similar to front cavity 32). It should be noted that the pivot hole 24 and the inclined slot 22 of clamp 13 can be positioned and oriented in different ways such as to achieve multiple angles of operation, clamp forces, and locations positions, etc., and they are not limited to the respective location and size as given in the example Figures. The same can be said about the press-fit pin hole 46 (FIG. 26) of the front and rear T-slides; however, the three elements should be properly coordinated.

Figure 21:
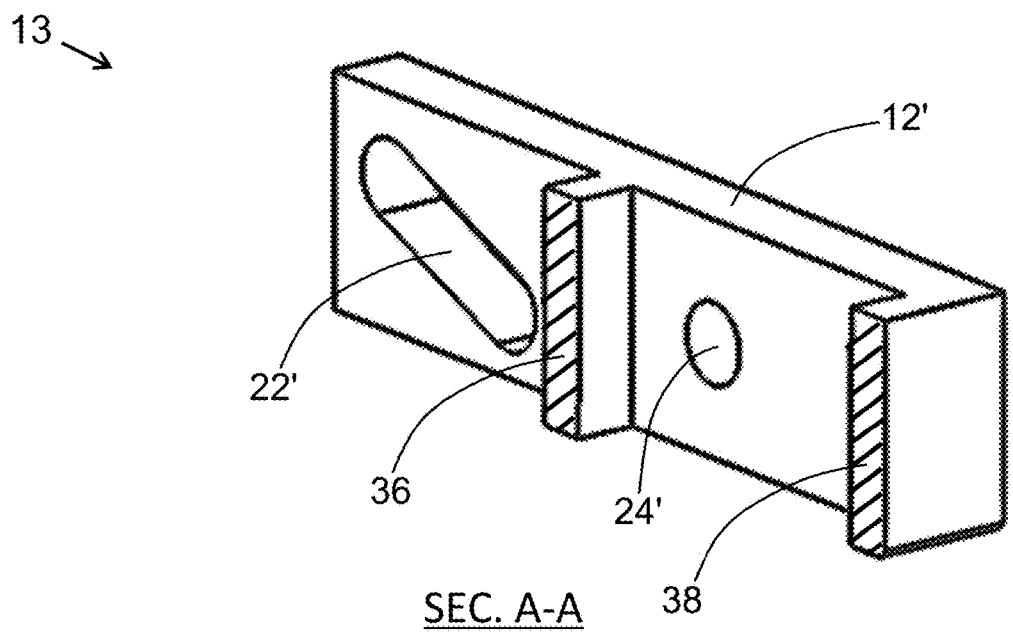
FIG. 21 shows a perspective cross-section (SEC. A-A) view of a clamp body, according to the present invention.

FIG. 21 shows a perspective cross-section (SEC. A-A) view of a clamp body 13, according to the present invention. Web section 36 can be located in the middle (½-way across) of front plate 12 and 12'. Other elements indicated in FIG. 21 are discussed previously in connection with FIG. 20.

Figure 22:
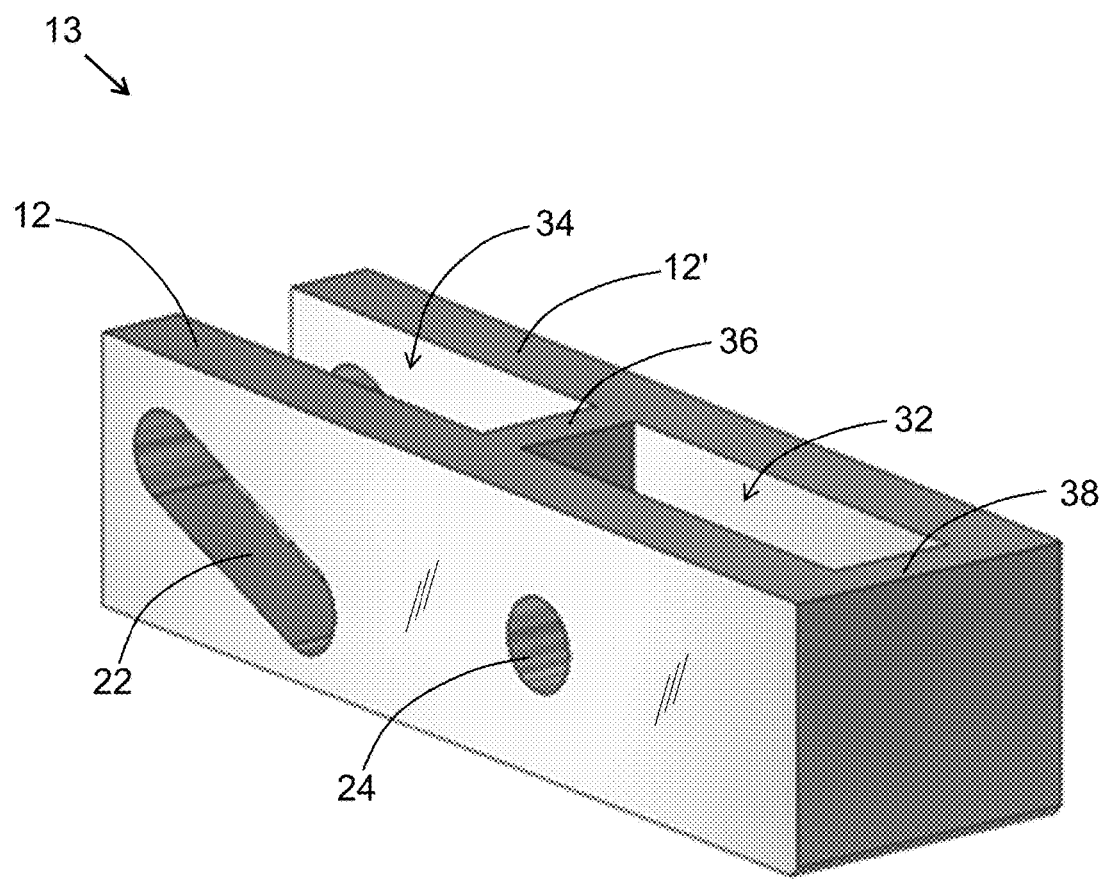
FIG. 22 shows a shaded perspective view of a clamp body, according to the present invention.

FIG. 22 shows a shaded perspective view of a clamp body 13, according to the present invention. The description is the same as that for FIG. 20.

Figure 23:
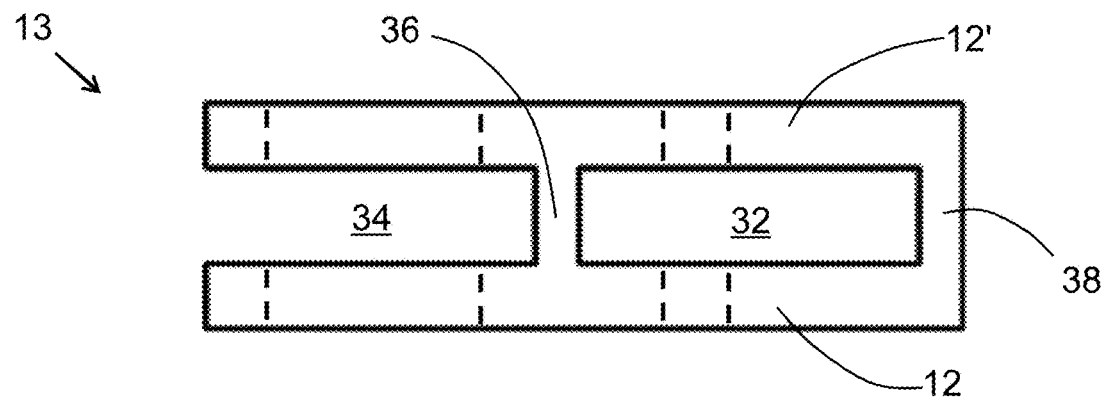
FIG. 23 shows a top plan view of a clamp body, according to the present invention.

FIG. 23 shows a top plan view of a clamp body 13, according to the present invention. Elements indicated in FIG. 23 are described previously in connection with FIG. 20.

Figure 24:
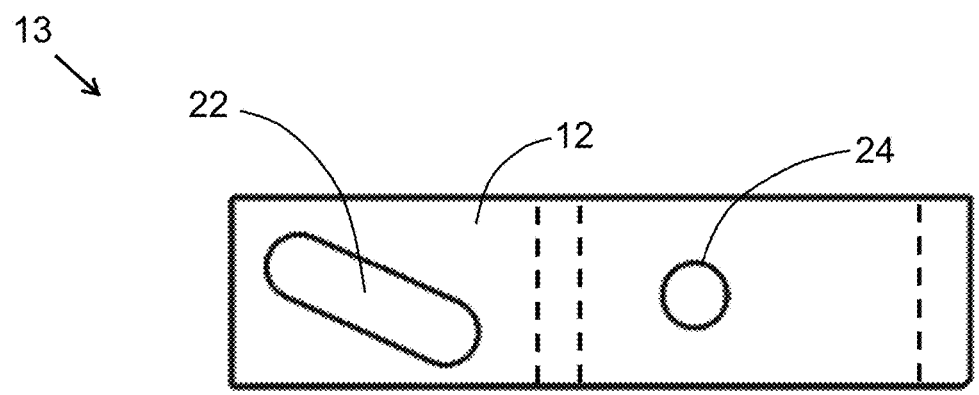
FIG. 24 shows a side elevation view of a clamp body, according to the present invention.

FIG. 24 shows a side elevation view of a clamp body 13, according to the present invention. Elements indicated in FIG. 24 are described previously in connection with FIG. 20.

Figure 25:
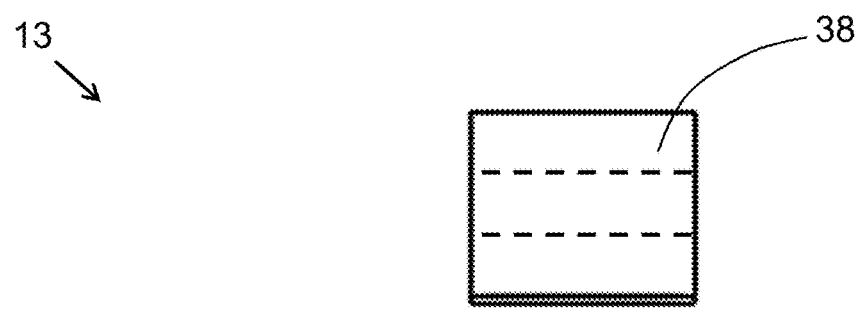
FIG. 25 shows a front end elevation view of a clamp body, according to the present invention.

FIG. 25 shows a front end elevation view of a clamp body 13, according to the present invention, with the front plate 38 being indicated.

Figure 26:
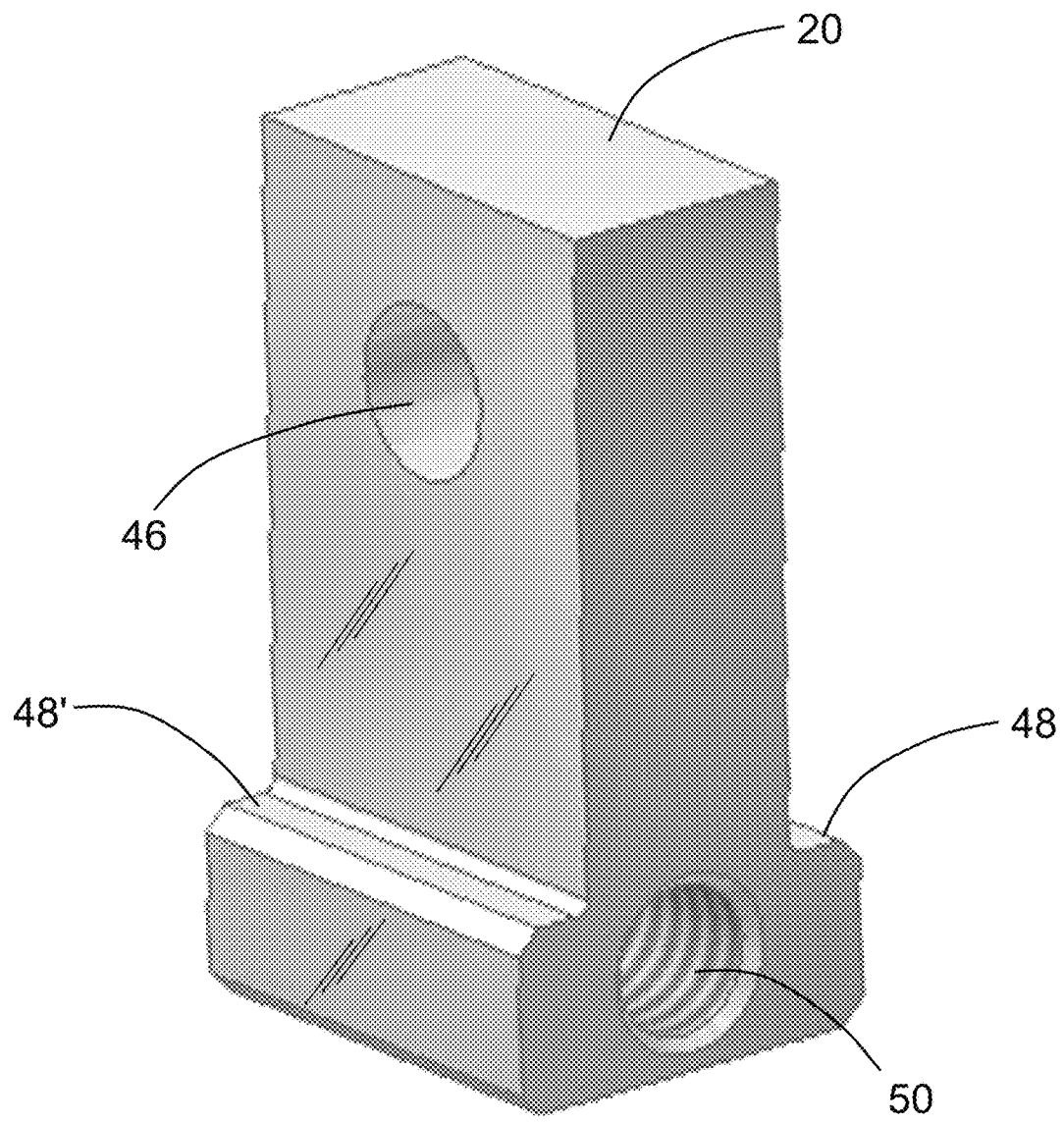
FIG. 26 shows a shaded perspective view of a rear T-slide, according to the present invention.

FIG. 26 shows a shaded perspective view of a rear T-slide 20, according to the present invention. Rear T-slide 20 is a monolithic, extrusion (part with parallel sides) part that can be extruded or machined from a plate, with a transverse through-hole 46 in the upper portion (e.g., upper ½) of the part, and a longitudinal, threaded-hole including internal threads 50 in the lower portion (e.g., bottom ¼) of the part. The lower portion of T-slide 20 comprising the "T"-section has a pair of chamfered shoulders 48 and 48' that define a "T"-shaped cross-section.

Figure 27:
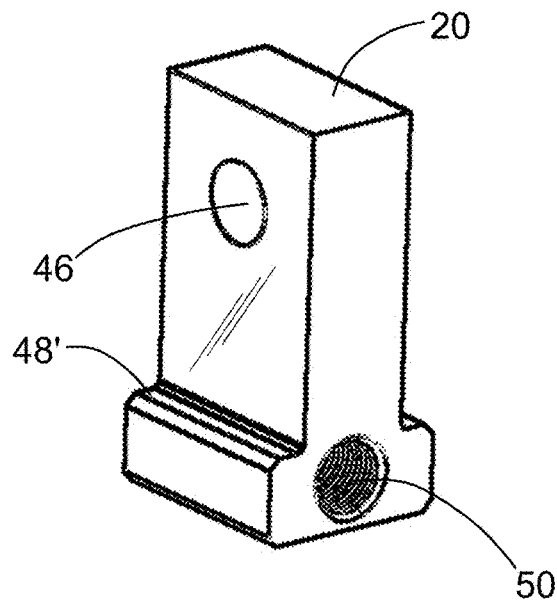
FIG. 27 shows a perspective view of a rear T-slide, according to the present invention.

FIG. 27 shows a perspective view of a rear T-slide 20, according to the present invention, with the transverse through-hole 46, one shoulder 48', and threads 50 indicated.

Figure 28:
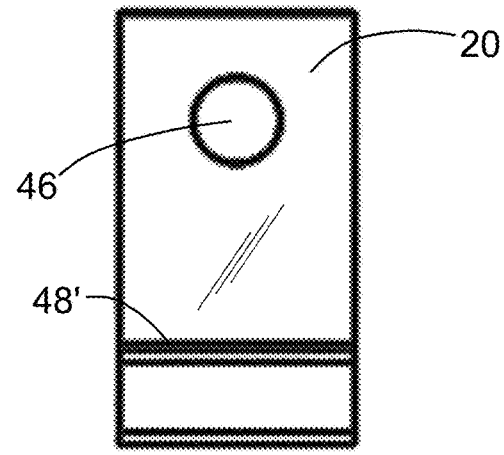
FIG. 28 shows a side elevation view of a rear T-slide, according to the present invention.

FIG. 28 shows a side elevation view of a rear T-slide 20, according to the present invention, with the transverse through-hole 46 and one shoulder 48' indicated.

Figure 29:
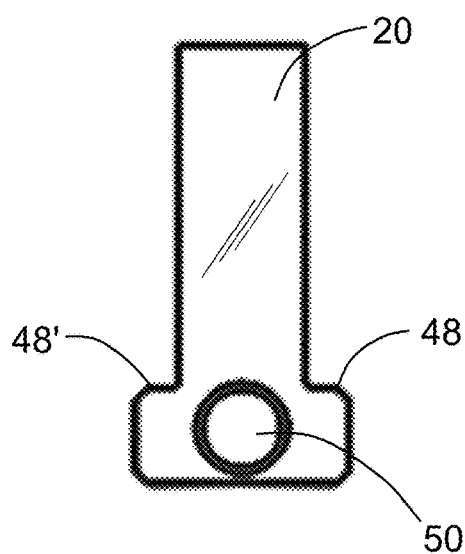
FIG. 29 shows a front elevation view of a rear T-slide, according to the present invention.

FIG. 29 shows a front elevation view of a rear T-slide 20, according to the present invention, with the shoulders 48, 48' and the internal threads 50 indicated.

Figure 30:
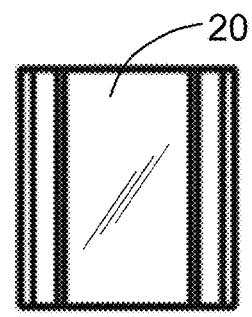
FIG. 30 shows a top plan view of a rear T-slide, according to the present invention.

FIG. 30 shows a top plan view of a rear T-slide 20, according to the present invention.

Figure 31:
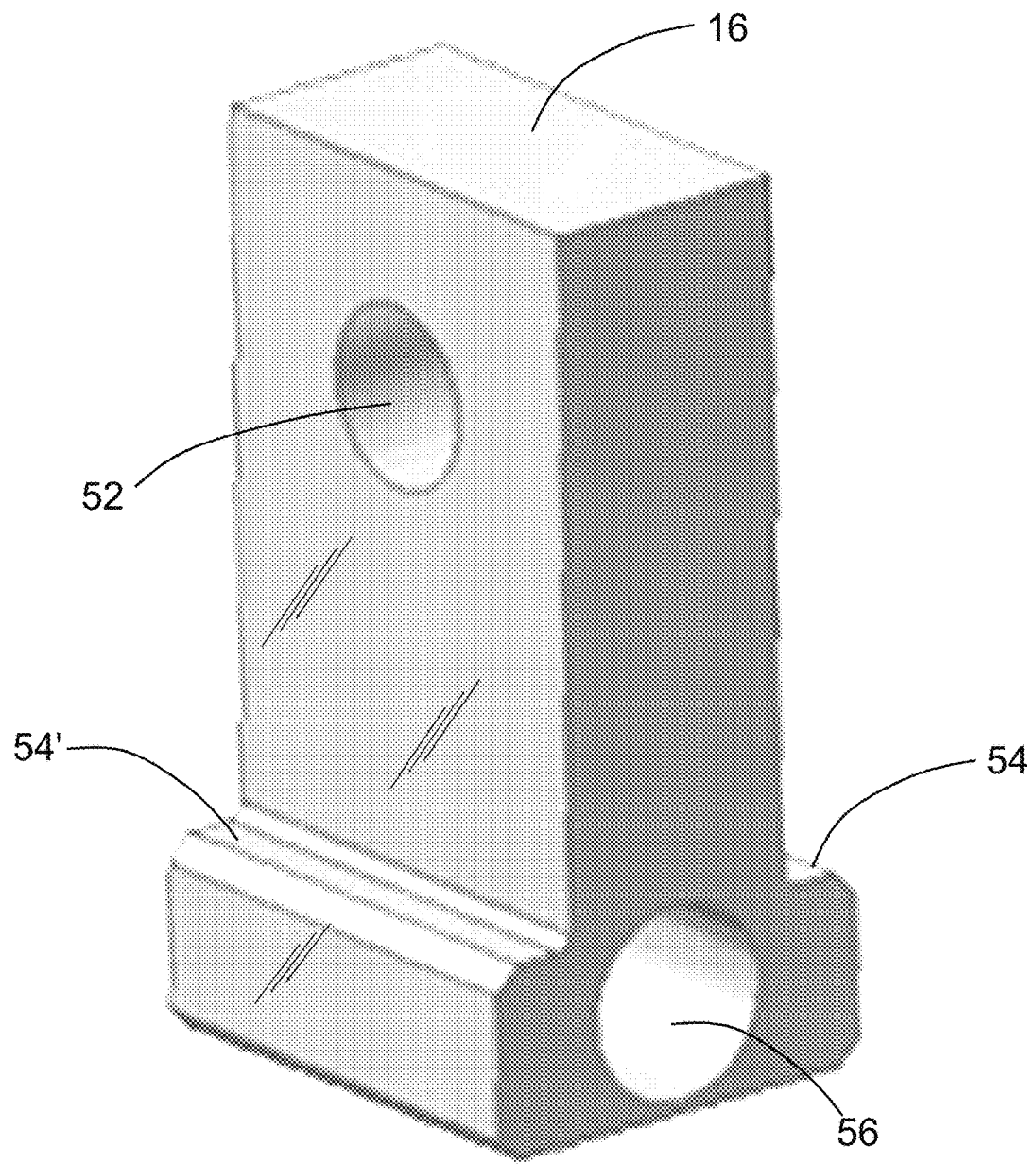
FIG. 31 shows a shaded perspective front of a rear T-slide, according to the present invention.

FIG. 31 shows a shaded perspective front of a front T-slide 16, according to the present invention. Front T-slide 16 is a monolithic, extrusion (part with parallel sides) part that can be extruded or machined from a plate, with a transverse through-hole 52 in the upper portion (e.g., upper ½) of the part, and a longitudinal, through-hole 56 in the bottom portion (e.g., bottom ¼) of the part. The lower portion of T-slide 16 comprising the "T"-section has a pair of chamfered shoulders 54 and 54' that define a "T"-shaped cross-section. Note: T-slide 16 has the same shape and outline as T-slide 20. The only difference is the threaded longitudinal hole 50 vs the unthreaded hole 56.

Figure 32:
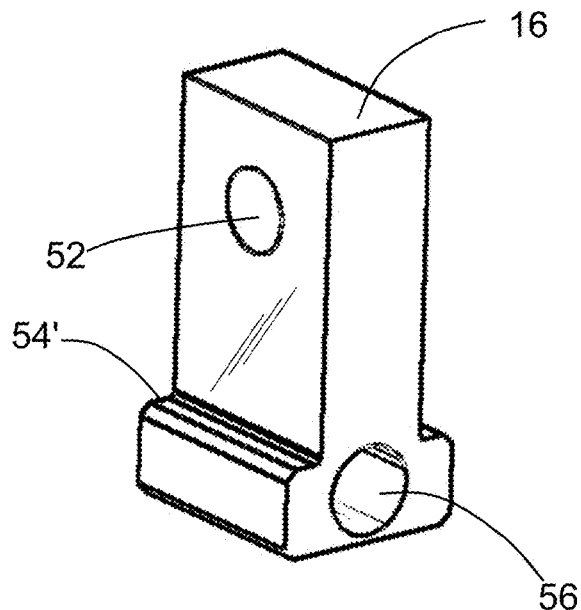
FIG. 32 shows a perspective view of a front T-slide, according to the present invention.

FIG. 32 shows a perspective view of a front T-slide 16, according to the present invention. Elements of the front T-slide indicated in this view are described above.

Figure 33:
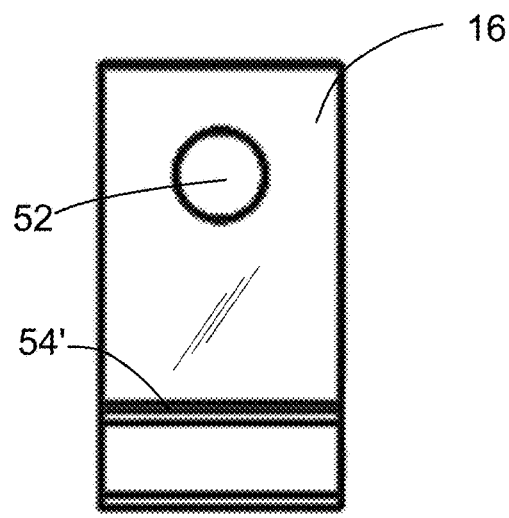
FIG. 33 shows a side elevation view of a front T-slide, according to the present invention.

FIG. 33 shows a side elevation view of a front T-slide 16, according to the present invention. Elements of the front T-slide indicated in this view are described above.

Figure 34:
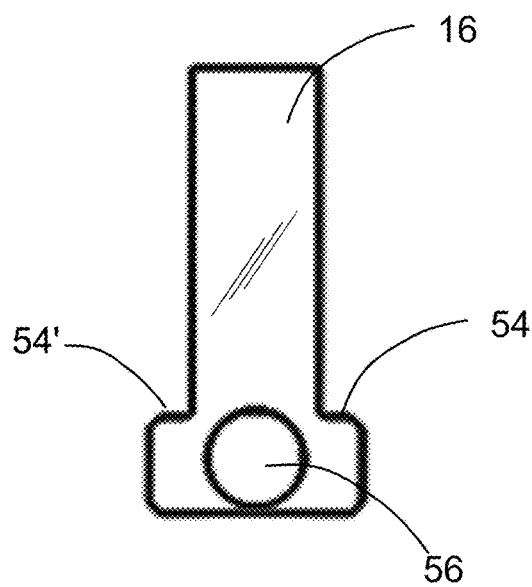
FIG. 34 shows a front elevation view of a front T-slide, according to the present invention.

FIG. 34 shows a front elevation view of a front T-slide 16, according to the present invention. Elements of the front T-slide indicated in this view are described above.

Figure 35:
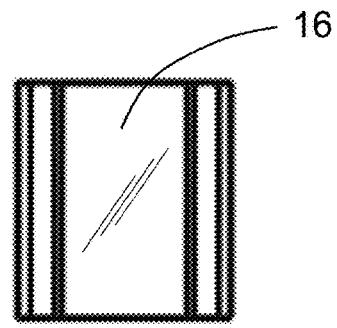
FIG. 35 shows a top plan view of a front T-slide, according to the present invention.

FIG. 35 shows a top plan view of a front T-slide 16, according to the present invention.

FIG. 36 shows a side elevation view of a universal end clamp 10 in the clamped position, according to the present invention. This example shows a universal end clamp 10 clamping the lower flange 64 of solar module frame 62 onto the upper surface 72 of rail 60. The clamp body 13 and the bolt head 28 are also indicated.

FIG. 37A shows a side elevation view of an example of a dual-track rail 60, according to the present invention. The upper surface 72 is indicated.

FIG. 37B shows a front end elevation view of an example of a dual-track rail 60, according to the present invention. The upper track 68 receives the drive bolt 26 and the "T"-section shoulders of front and rear T-Slides 16 and 20, respectively. Sidewalls 66, 66', the lower first track 70, the hollow central cavity 69, and the upper surface 72 are indicated.

Figure 38A:
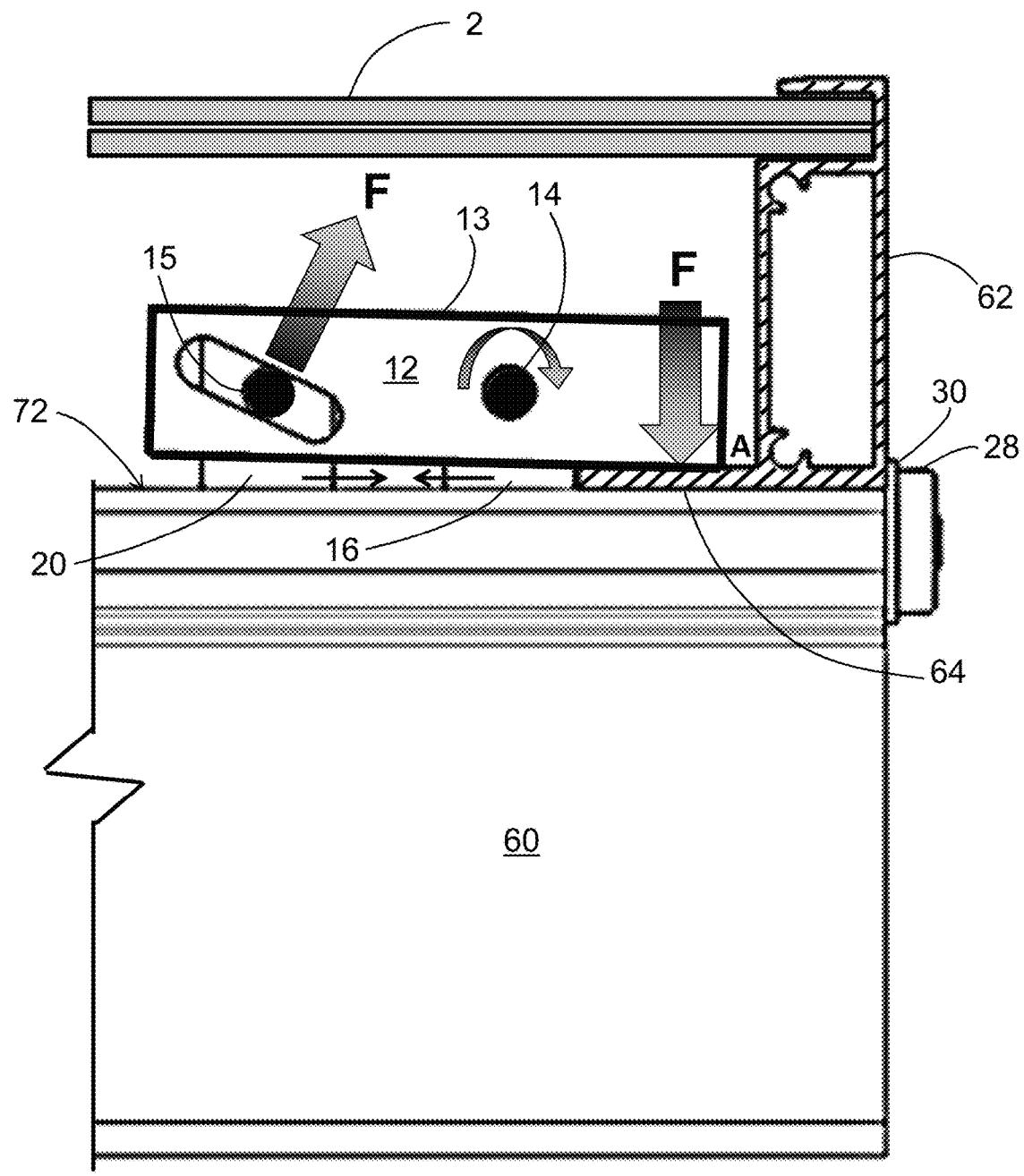
FIG. 38A shows a side elevation view of a universal end clamp in the clamped position, according to the present invention.

FIG. 38A shows a side elevation view of a universal end clamp in the clamped position, according to the present invention. This is an enlarged view of the example shown previously in FIG. 36. This view illustrates the forces, F, that act on the front plate 12 by drive pin 15 and the lower flange 64 at contact point "A", as plate 12 rotates about pivot pin 14 when T-slides 20 and 16 are drawn towards each other when bolt head 28 (and bolt 26) is rotated. T-slide 16 is physically stopped and bears against the module frame return leg 64 as the whole assembly moves toward clamping. As T-slide 20 is being driven by the bolt 26, the spring force of the compression spring 18 ensures the T-slide 16 makes contact and is stopped. A solar panel 2, the washer 30, the upper body 13, a rail 60, the frame 62, and the upper surface 72 are also indicated.

Figure 38B:
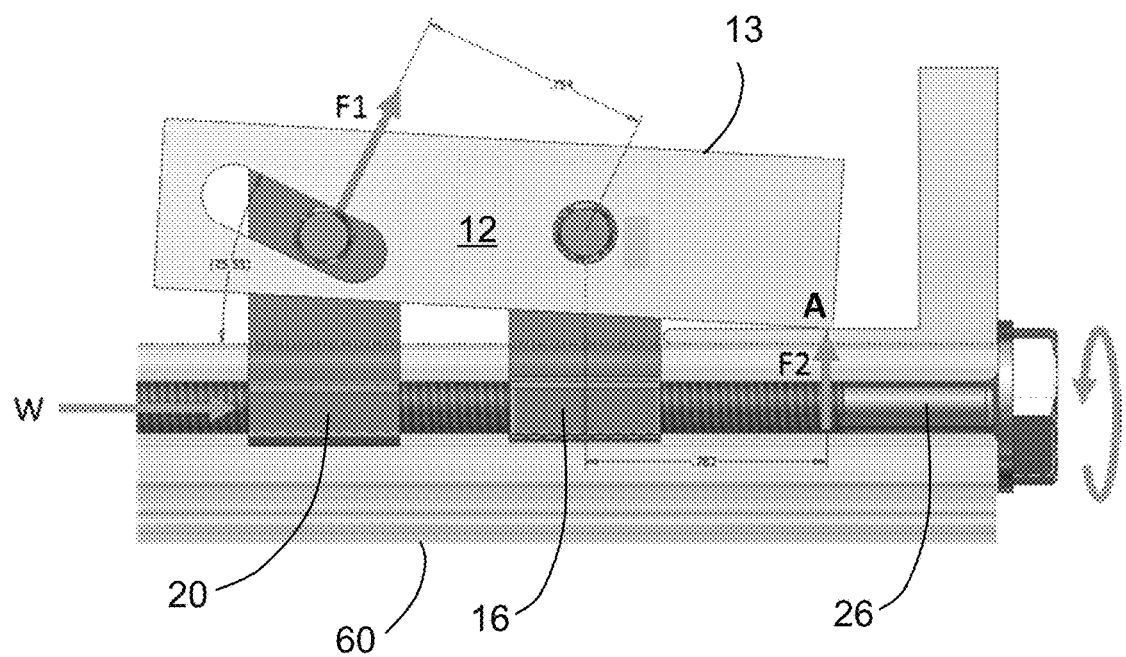
FIG. 38B shows a side elevation view of a universal end clamp in the clamped position, according to the present invention.

FIG. 38B shows a side elevation view of a universal end clamp in the clamped position, according to the present invention. Note that the spacing of the pivot/drive pins, location of the slot, and the angle of the inclined slot, are designed in such a way as to create a large mechanical advantage that results in a clamp force on the module that is more than double the bolt clamp force. For example, application of 3 ft-lbs. of torque on bolt 26 results in a bolt load of 311 lbs., and a clamping force, $F_2$, of 683 lbs. on the module, which is more than sufficient to withstand wind uplift pressures. Other elements of the clamp, mentioned earlier, are also indicated.

Figure 39A:
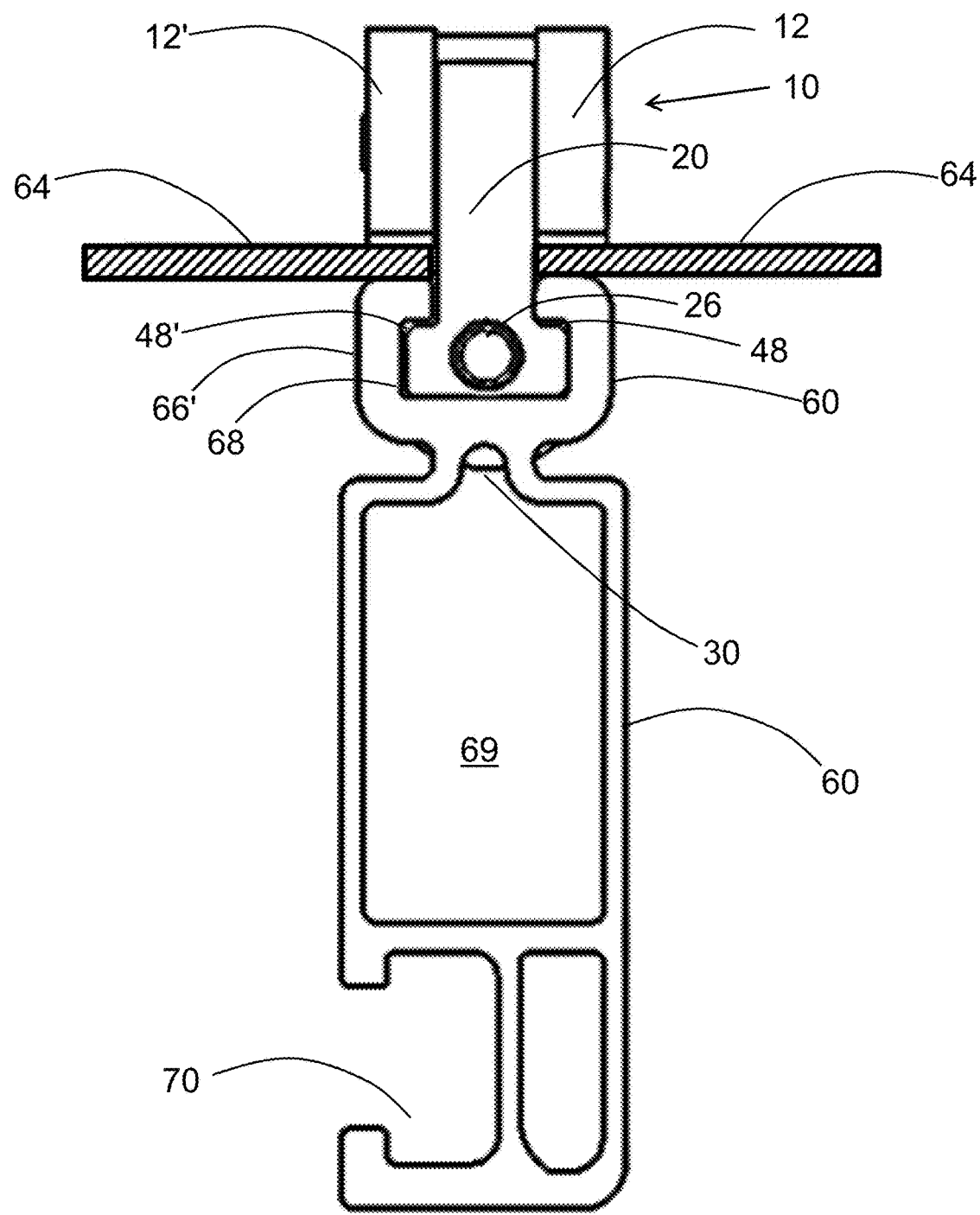
FIG. 39A shows a rear end elevation view of a dual-track rail with a universal end clamp, according to the present invention.

FIG. 39A shows a rear end elevation view of a dual-track rail 60 with a universal end clamp 10 inserted into the upper track 68 of rail 60, according to the present invention. Other elements of the combined arrangement, mentioned earlier, are also indicated.

Figure 39B:
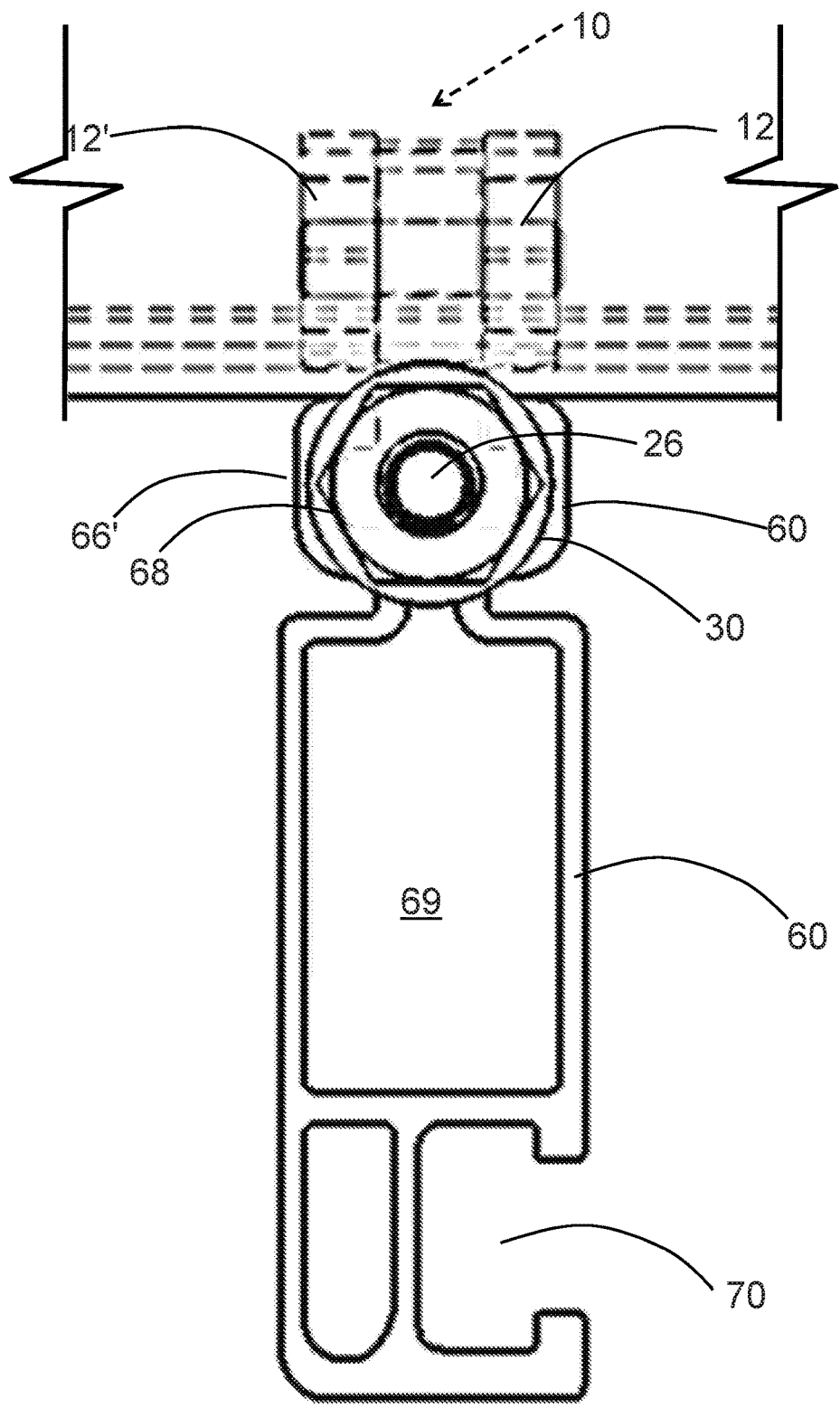
FIG. 39B shows a front end elevation view of a dual-track rail with a universal end clamp, according to the present invention.

FIG. 39B shows a front end elevation view of a dual-track rail 60 with a universal end clamp 10 inserted into the upper track 68 of rail 60, according to the present invention. Other elements of the combined arrangement, mentioned earlier, are also indicated.

Figure 40:
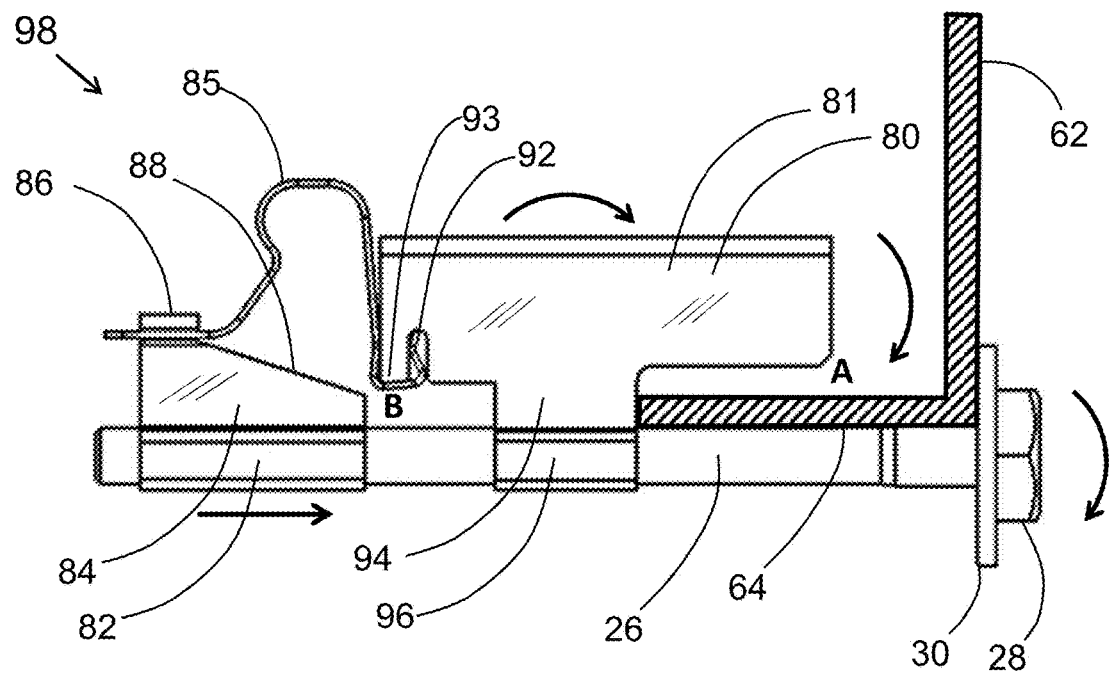
FIG. 40 shows a side elevation view of another example of a universal end clamp, according to the present invention.

FIG. 40 shows a side elevation view of another example of a universal end clamp 98, according to the present invention. Clamp 98 comprises: a clamp body 80; a contact point "A" located at the front end of clamp body 80; front pivot section 94 connected to a front T-slide 96 with a through hole at the bottom; a rear T-slide (ramp drive block) 82 with a threaded hole at the bottom, an upper section 84, and a inclined ramp 88 (which can be inclined at 30° to the horizontal, for example); a U-shaped leaf spring 85, secured by a protrusion 86 to the rear T-slide, disposed in-between rear T-slide 82 and the rear of clamp body 80; a threaded drive bolt 26 disposed through the holes in T-slides 96 and 82; and a bolt head 28 with flat washer 30. Front T-slide 96 is pivotally linked to clamp body 80 via front pivot section 94; and forward motion of rear T-slide 82 toward front T-slide 96 causes rotation of clamp body 80 when angled ramp 88 contacts the lower left hand corner 93 of clamp body 80 at contact point "B". Ramp 88 can be angled at, for example, 30° to the horizontal. Clamp body 80 is a monolithic structural body comprising a front plate 81; and a front pivot section 94 connected to a front T-slide 96 with a through hole at the bottom. Front T-slide 96 and rear T-slide (ramp block) 82 are drawn towards each other when front T-slide 96 contacts lower flange plate 64 of the module frame 62 and bolt 26 is rotated (and when the two T-slides are inserted into the upper track 68 of rail 60 (FIGS. 39A-39B)). No compression spring is needed on bolt 26 because U-shaped leaf spring element 85 serves the same purpose. A distal end of leaf spring 85 clips into a slotted recess 92 in clamp body 80.

Figure 41:
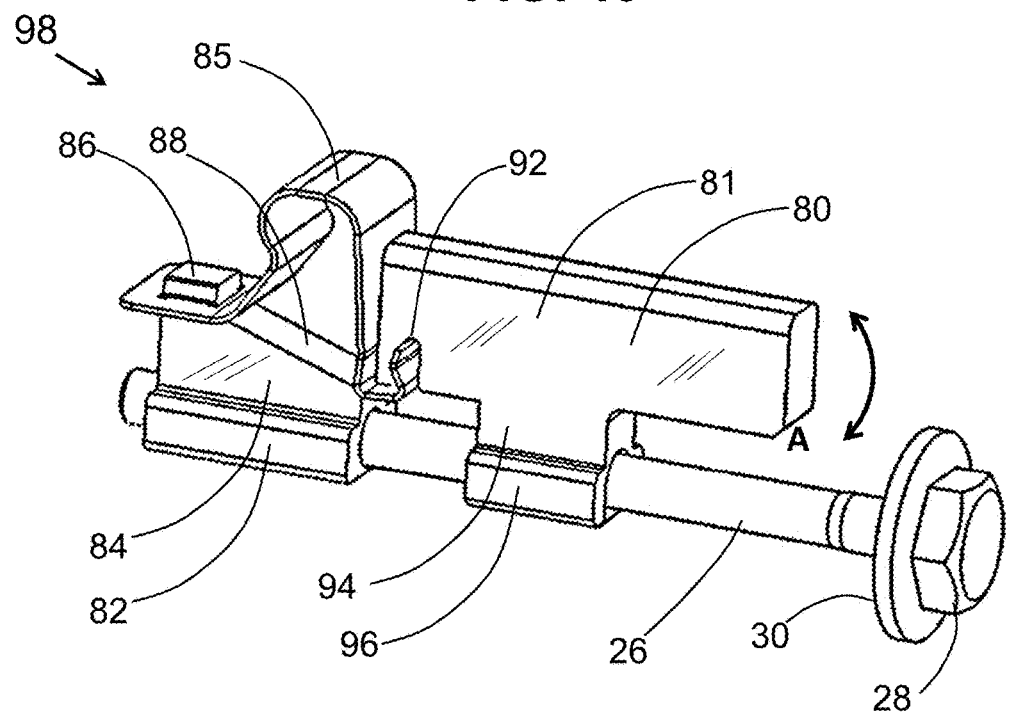
FIG. 41 shows a perspective view of another example of a universal end clamp, according to the present invention.

FIG. 41 shows a perspective view of another example of a universal end clamp 98, according to the present invention. Elements identified by reference number included in FIG. 41 are discussed in connection with FIG. 40, and a repeated discussion is not supplied here.

Figure 42:
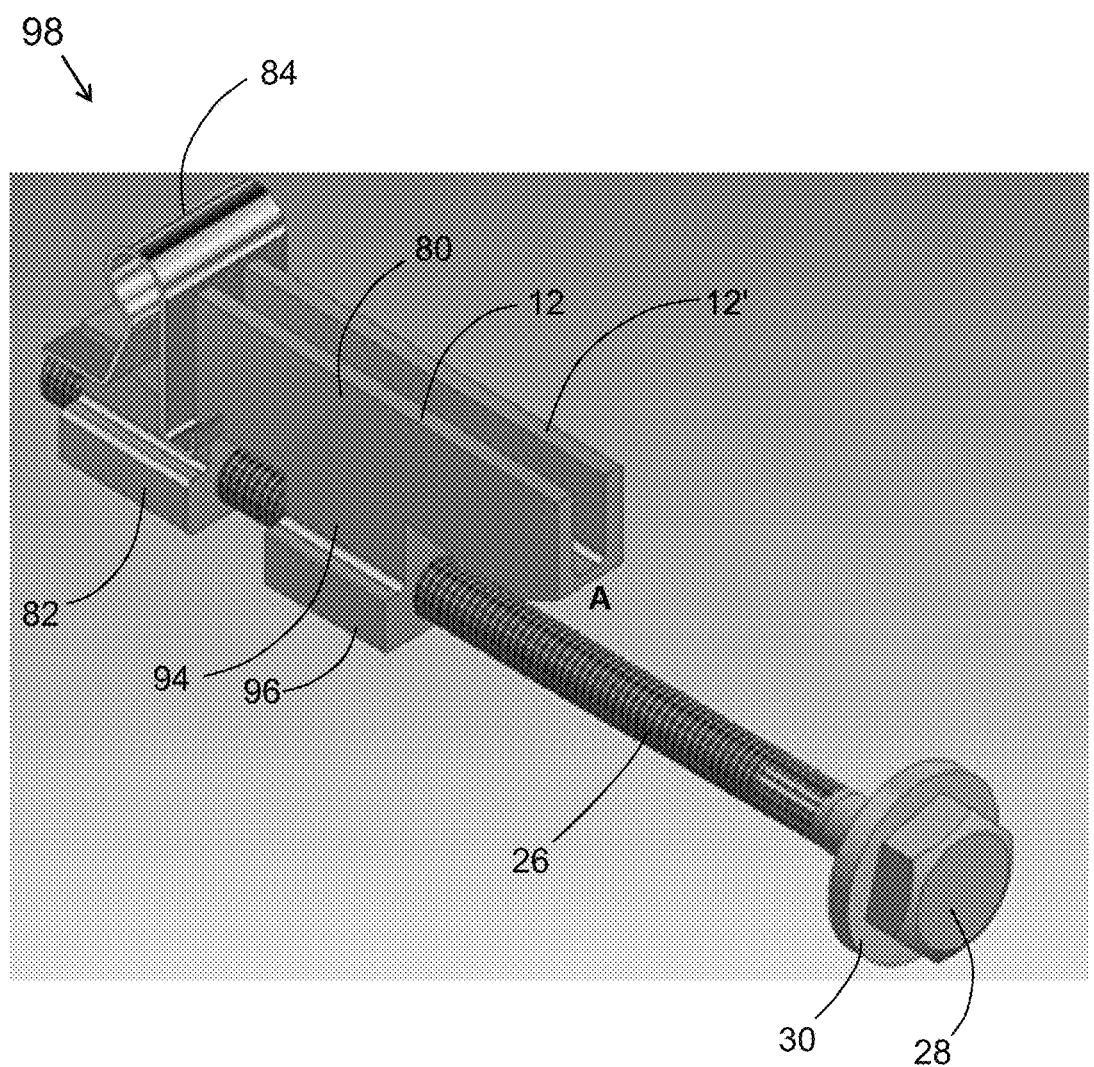
FIG. 42 shows a shaded perspective view of another example of a universal end clamp, according to the present invention.

FIG. 42 shows a shaded perspective view of another example of a universal end clamp, according to the present invention. In this example, clamp body 80 comprises a pair of parallel, spaced apart plates 12 and 12' (similar to the example shown in FIGS. 6-15), which are both joined at their bottom to front pivot section 94. Other elements identified by reference numbers included in FIG. 42 are discussed above, and a repeated discussion is not supplied here.

Figure 43:
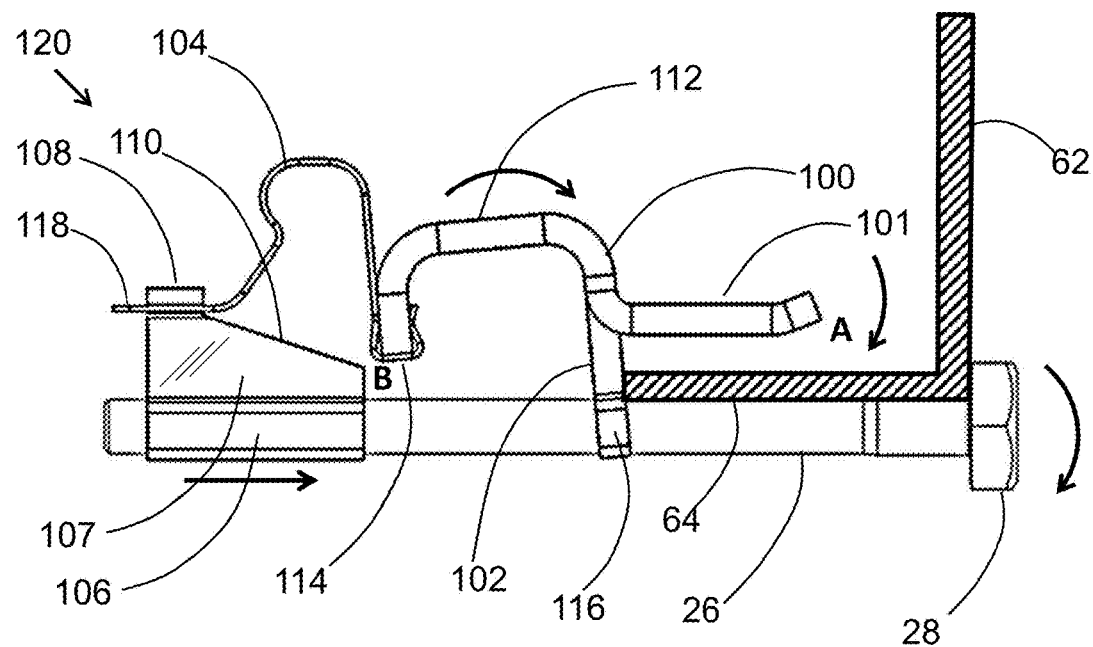
FIG. 43 shows a side elevation view of another example of a universal end clamp, according to the present invention.

FIG. 43 shows a side elevation view of another example of a universal end clamp 120, according to the present invention. Clamp 120 comprises: a clamp body 100; a contact point "A" located at the front end of clamp body 100; a pair of front clamp arms (forks) 101, 101' (FIG. 44) connected to front pivot section 102 connected to a front T-slide 116 with a through-hole at the lower portion 102 of clamp body 100; a rear T-slide 106 with an upper section 107 and a threaded hole at the bottom and a inclined ramp 110; a U-shaped leaf spring 104 disposed in-between rear T-slide 106 and the rear arm 112 of clamp body 100; a threaded drive bolt 26 disposed through the holes in T-slides 116 and 106; and a bolt head 28 with flat washer 30 (not illustrated in FIG. 43, but shown in FIG. 45). Front T-slide 116 is pivotally linked to clamp body 100 via front pivot section 102; and forward motion of rear T-slide 106 toward front T-slide 116 causes rotation of clamp body 100 when ramp 110 contacts the lower left hand corner of rear clamp arm 112 at contact point "B". Clamp body 100 is a monolithic structural body (which can be a stamped sheet metal part) comprising a pair of front clamp arms 101, 101'; a front pivot section 102 connected to a front T-slide 116 with a through hole at the bottom; and a rear clamp arm 112 that is U-shaped. Front T-slide 116 and rear T-slide 106 are drawn towards each other when front T-slide 116 contacts lower flange plate 64 and bolt 26 is rotated (and when the two T-slides are inserted into the upper track 68 of rail 60). No compression spring is needed on bolt 26 because U-shaped leaf spring element 104 serves the same purpose. A distal end 114 of leaf spring 104 clips onto the lower end of rear arm 112, while a proximal end 118 of the leaf spring is mounted to a protrusion 108 from the upper section of the rear T-slide.

Figure 44:
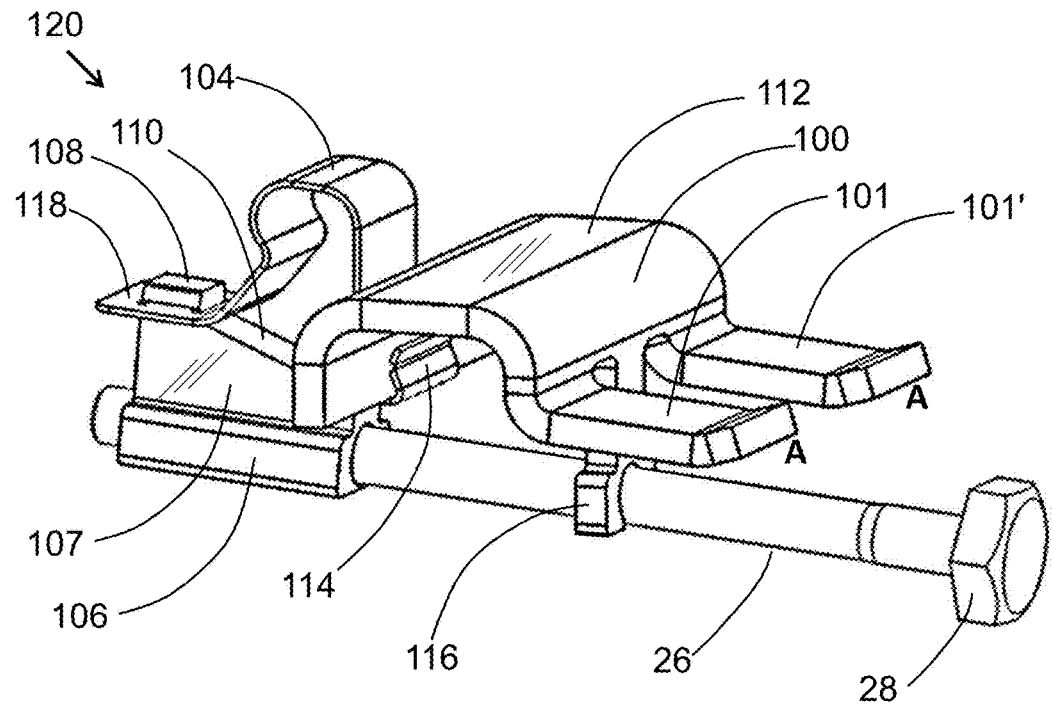
FIG. 44 shows a perspective view of another example of a universal end clamp, according to the present invention.

FIG. 44 shows a perspective view of another example of a universal end clamp 120, according to the present invention. Elements of the clamp illustrated in FIG. 44 are discussed in connection with FIG. 43, and a repeated discussion is not supplied here.

Figure 45:
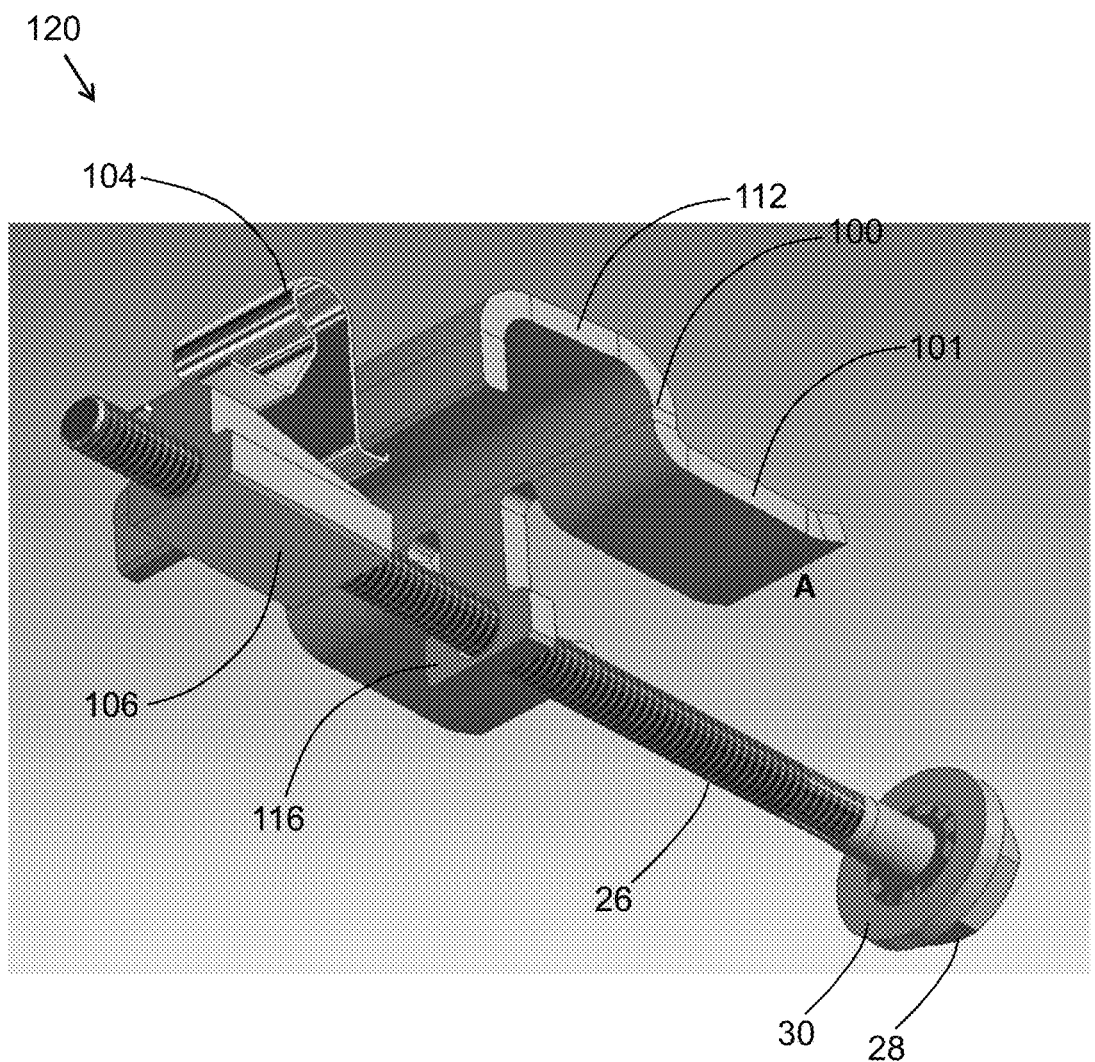
FIG. 45 shows a shaded perspective view of another example of a universal end clamp, according to the present invention.

FIG. 45 shows a perspective view of another example of a universal end clamp 120, according to the present invention. Other elements identified by reference numbers included in FIG. 45 are discussed above, and a repeated discussion is not supplied here.

Figure 46:
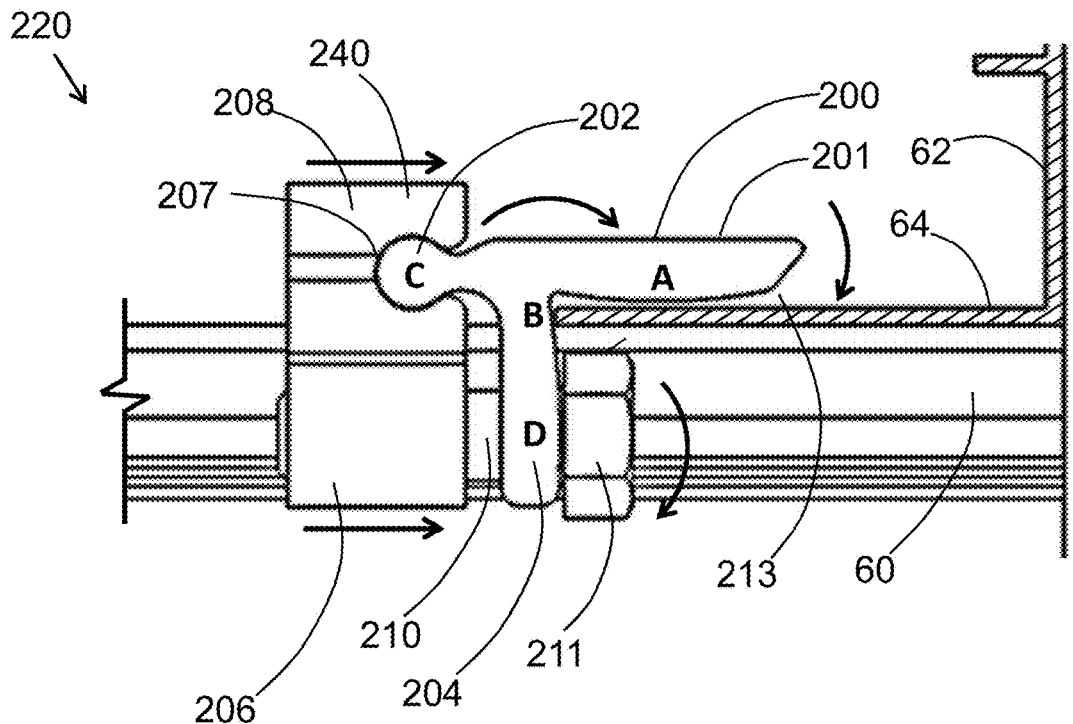
FIG. 46 shows a side elevation view of another example of a universal end clamp, according to the present invention.

FIG. 46 shows a side elevation view of another example of a universal end clamp 220, according to the present invention. Clamp 220 comprises: a clamp body 200; a contact point "A" located at the front end of clamp body 200; a front clamp arm 201 with rounded/chamfered/slanted front end 213, connected to vertical pivot section 204 with a through hole at the bottom, and a rear circular/cylindrical knob 202; an offset drive bracket 240 with a lower portion 206 and an upper portion 208 and a threaded hole (not numbered) at the bottom and a circular recess/socket 207 that has a diameter matching the diameter of circular/cylindrical knob 202; a threaded drive bolt 210 disposed through the hole in lower portion 206; and a bolt head 211. Clamp body 200 is pivotally linked at first pivot point "C" to upper section 208 via circular/cylindrical knob 202; and forward motion of lower portion 206 toward vertical pivot section 204 causes rotation of clamp body 200 when bolt 210 is tightened. Clamp body 200 is also pivotally linked to bolt 210 through through-hole 205 (FIG. 48) at second pivot point "D". Clamp body 200 is a monolithic structural body (which can be a extruded or machined metal part) comprising a front clamp arm 201 connected to vertical pivot section 204 with a through hole 205 at the bottom of pivot section 204, and a circular/cylindrical knob 202. Vertical pivot section 204 and lower portion 206 are drawn towards each other when the upper portion "B" of vertical pivot section 204 contacts lower flange plate 64 and bolt 210 is rotated, which results in clamp body 200 rotating clockwise as the lower portion 206 moves forward, which results in front clamp arm 201 applying a downwards force at contact point "A" on lower flange 64 of module 62. Clamp body 200 also rotates about a third pivot point at contact point "B" when bolt 210 is rotated. No compression spring is needed on bolt 210. Note: bolt 210 is not located inside of track 68 of rail 60, it is located offset from, and to the side of, track 68. Note: rear circular/cylindrical knob 202 (at pivot point "C") is located inside of offset drive bracket 240. Note that circular recess/socket 207 should be a slip-to-loose fit with circular/cylindrical knob 202, otherwise the clamp will be difficult to operate. Lower portion 206 is dimensioned to provide clearance for a socket drive to operate on the bolt head 211. Also, note that the entire clamp 220 can be made as a left-handed or right-handed version simply by manufacturing the dimensions as a mirror image of each other.

Figure 47A:
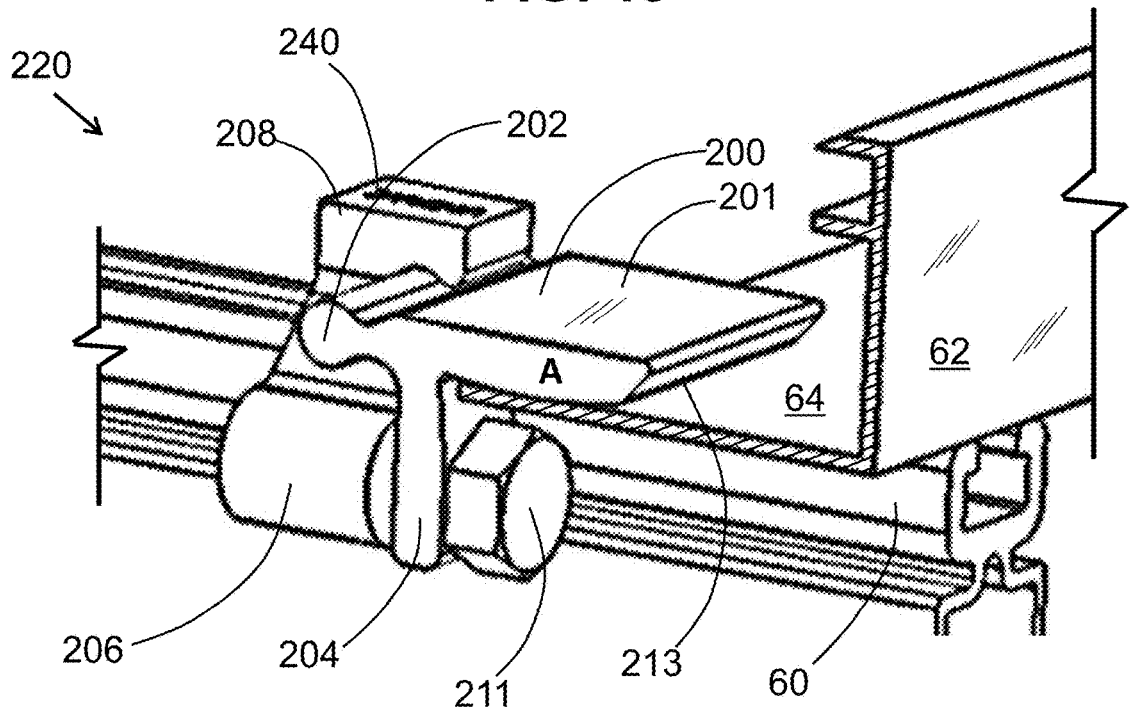
FIG. 47A shows a perspective view of another example of a universal end clamp, according to the present invention.

FIG. 47A shows a perspective view of another example of a universal end clamp 220, according to the present invention. Elements of the clamp identified by reference numbers in FIG. 47A are discussed in connection with FIG. 46, and a repeated discussion is not supplied here.

Figure 47B:
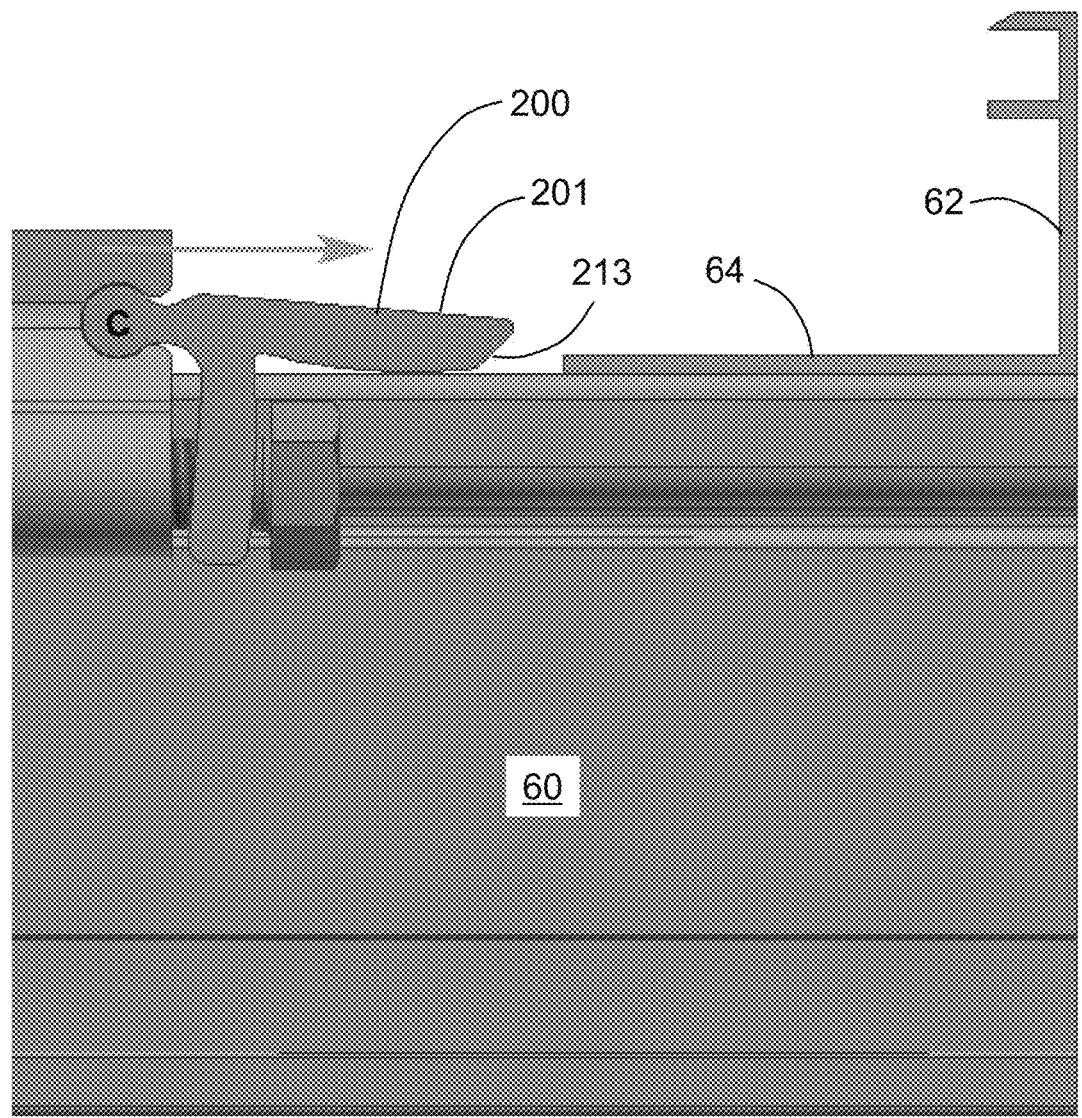
FIG. 47B shows a side elevation view of another example of a universal end clamp, according to the present invention.

FIG. 47B shows a side elevation view of another example of a universal end clamp including a clamp body 200, according to the present invention. In this view, end clamp body 200 is installed in rail 60 and clamp body 200 is being moved into position. At this position, end clamp body 200 is free to rotate about pivot point "C". Other elements of the end clamp shown in FIG. 47B are discussed above, and a repeated discussion is not supplied here.

Figure 47C:
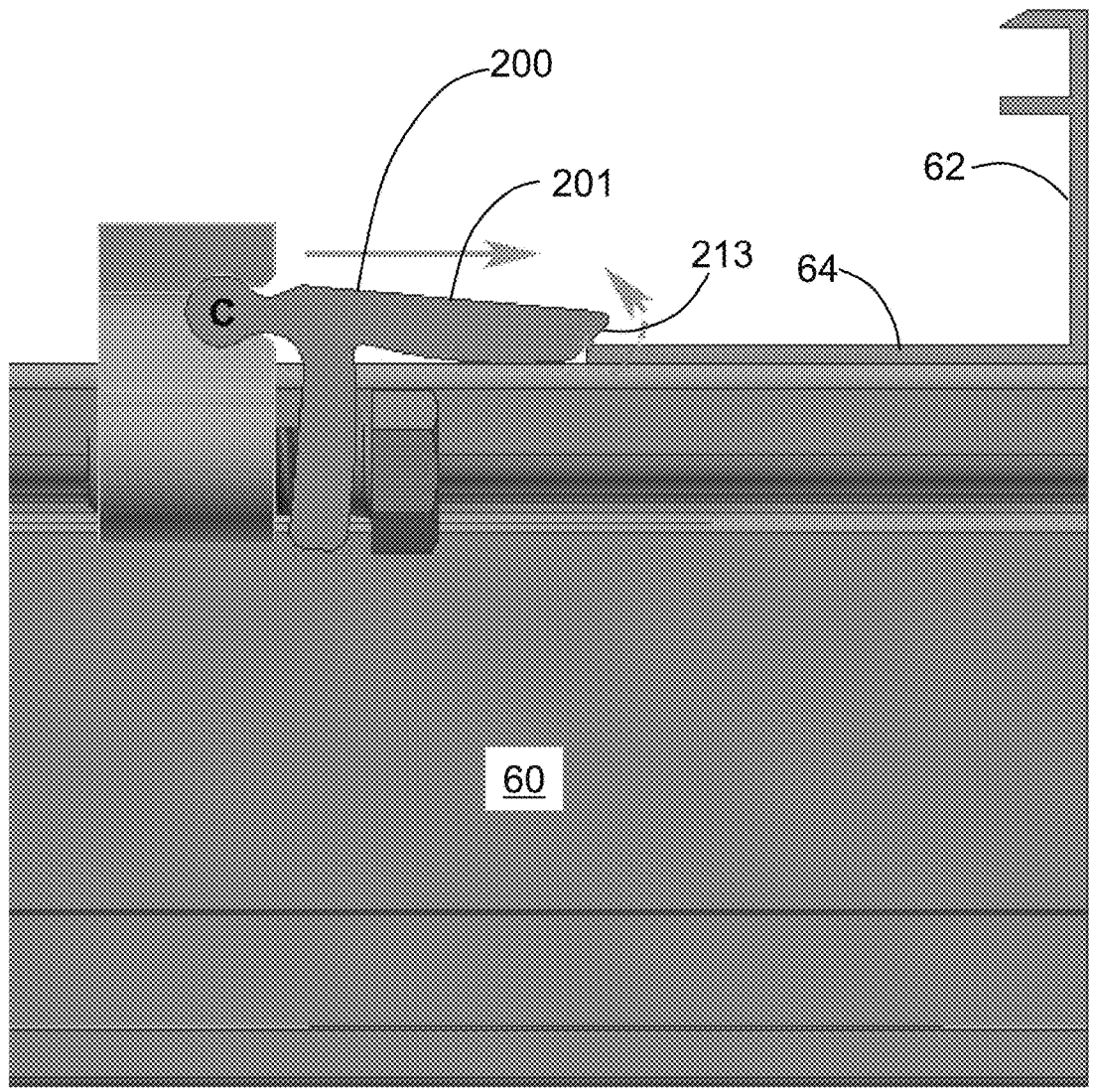
FIG. 47C shows a side elevation view of another example of a universal end clamp, according to the present invention.

FIG. 47C shows a side elevation view of another example of a universal end clamp including a clamp body 200, according to the present invention. In this view, the chamfered (ramped) end feature 213 of front end 201 of end clamp body 200 makes contact with the leading edge of return leg module flange 64 of module frame 62, which causes the front end 201 to rotate upwards as the end clamp is drawn to the right. In this way, the clamp is automatically self-adjusting during the installation process.

Figure 47D:
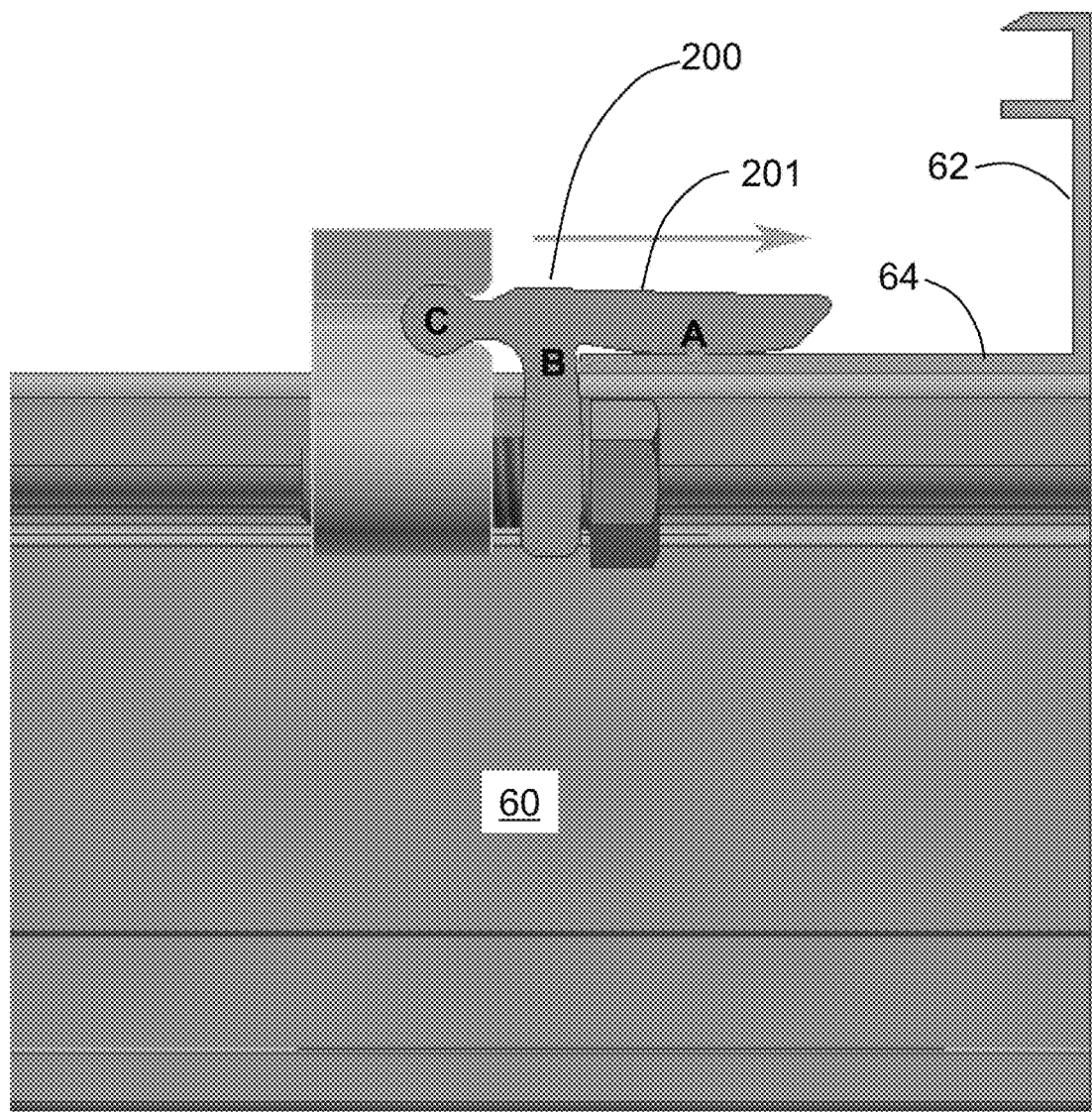
FIG. 47D shows a side elevation view of another example of a universal end clamp, according to the present invention.

FIG. 47D shows a side elevation view of another example of a universal end clamp including a clamp body 200, according to the present invention. In this view, end clamp body 200 changes position to seat the front end 201 and the pivot section on the return leg 64 of module frame 62, at contact points "A" and "B".

Figure 48:
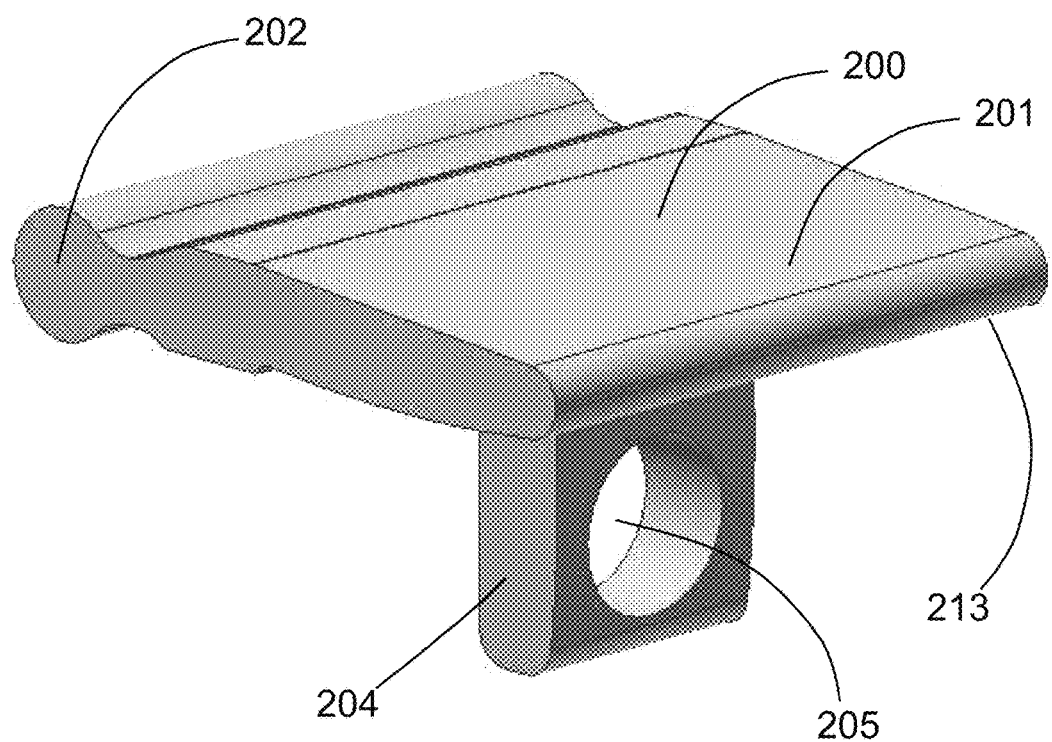
FIG. 48 shows a perspective view of another example of a clamp body, according to the present invention.

FIG. 48 shows a perspective view of another example of a clamp body 200, according to the present invention. Clamp body 200 is a "T"-shaped monolithic structural body (which can be a extruded or machined metal part) comprising a front clamp arm 201 connected to vertical pivot section 204 with a through hole 205 at the bottom of pivot section 204, and a rear circular/cylindrical knob 202 that serves as a pivot point. Hole 205 is oversized (compared to bolt 210) to permit rotation of clamp body 200 during the clamping process.

Figure 49:
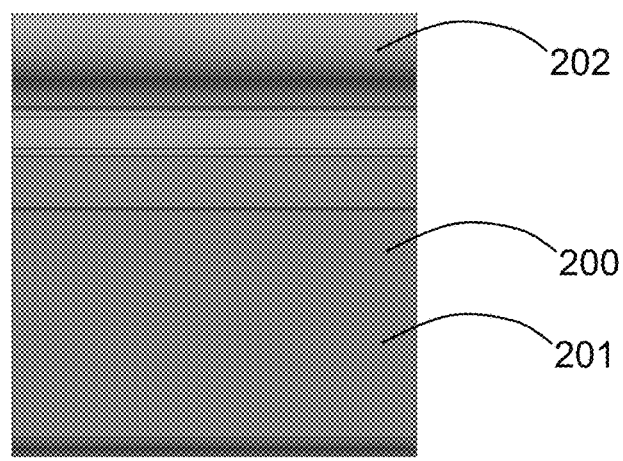
FIG. 49 shows a top plan view of another example of a clamp body, according to the present invention.

FIG. 49 shows a top plan view of another example of a clamp body 200, according to the present invention. Elements indicated by reference numbers in FIG. 49 are discussed above.

Figure 50:
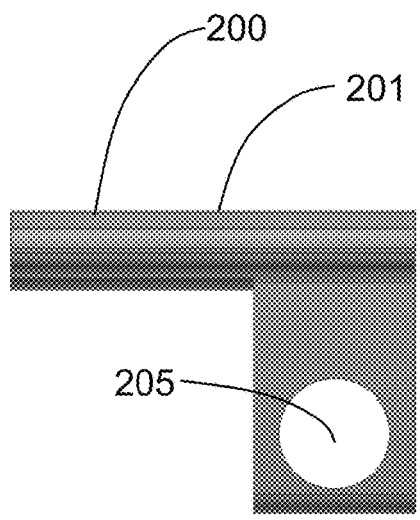
FIG. 50 shows a front elevation view of another example of a clamp body, according to the present invention.

FIG. 50 shows a front elevation view of another example of a clamp body 200, according to the present invention. Through hole 205 is offset to one side from the middle of clamp plate 201.

Figure 51:
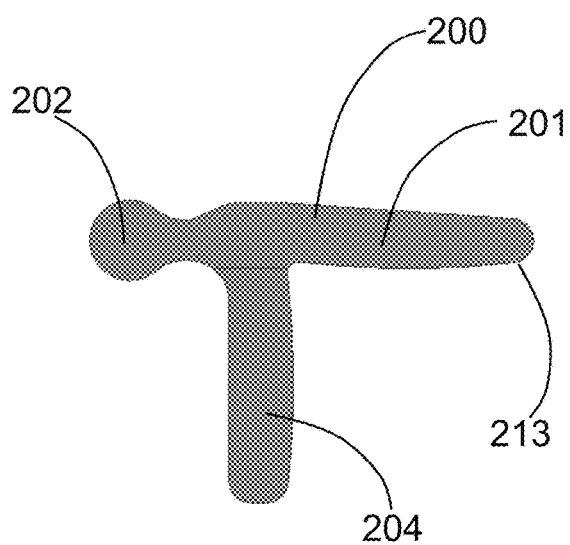
FIG. 51 shows a side elevation view of another example of a clamp body, according to the present invention.

FIG. 51 shows a side elevation view of another example of a clamp body 200, according to the present invention. Elements indicated by reference numbers in FIG. 51 are discussed above.

Figure 52:
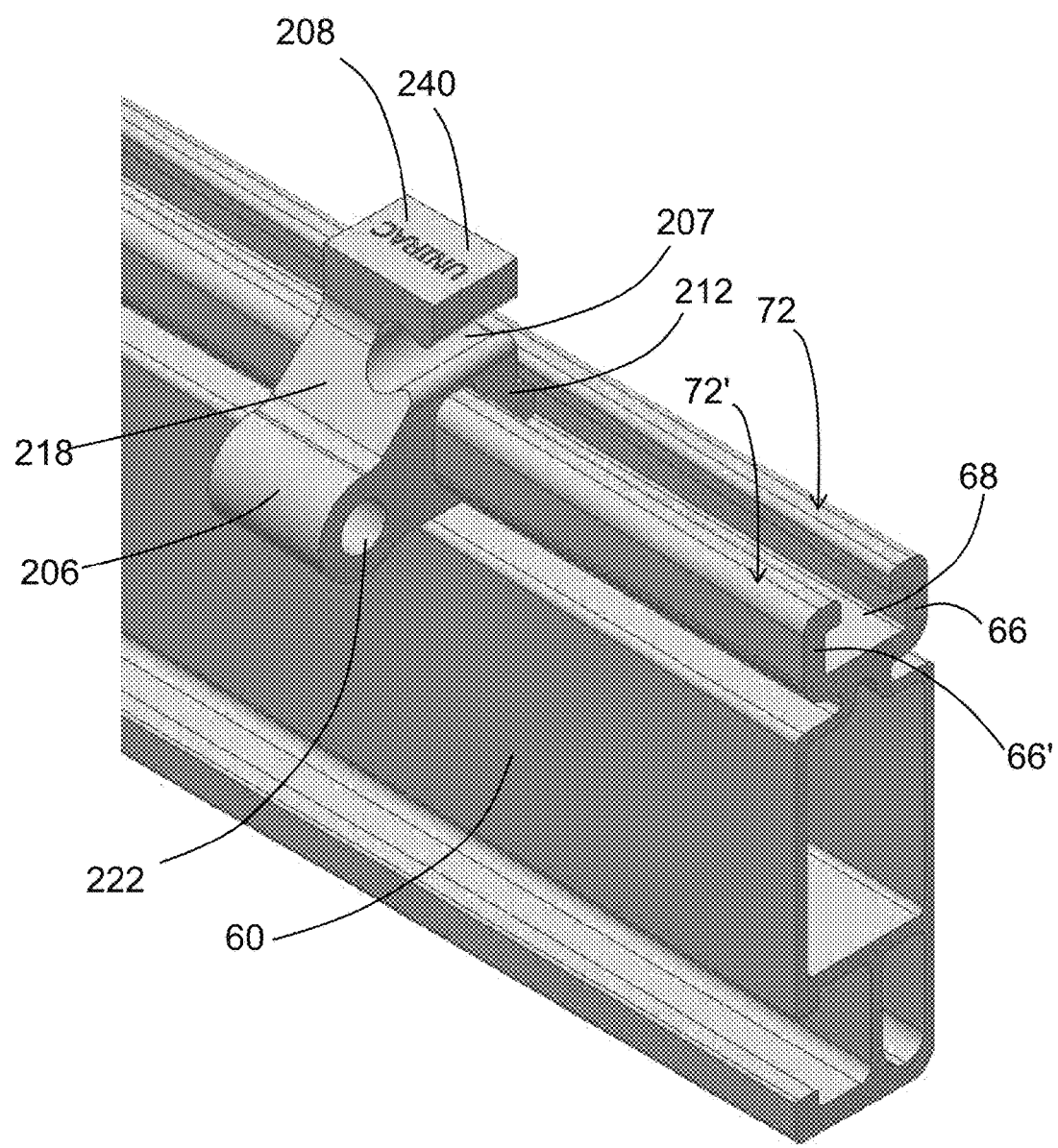
FIG. 52 shows a shaded perspective view of another example of an offset drive bracket, according to the present invention.

FIG. 52 shows a shaded perspective view of another example of an offset drive bracket 240, according to the present invention. Offset bracket 240 has a T-shaped T-slide 212 that slides inside of, and slides along the length of, recessed track 68 of rail 60. Offset bracket 240 comprises a monolithic body comprising an upper portion 208, a middle portion 218, and a lower portion 206 that comprises a threaded hole 222 running parallel to the long axis of rail 60, and receives bolt 210 (FIG. 46). Transverse cylindrical recess/cutout/socket 207 is disposed in the upper portion 208 and receives cylindrical knob 202 of clamping plate 201 (not shown). Also identified in FIG. 52 are the track sidewalls 66, 66' and upper surfaces 72, 72'.

Figure 53:
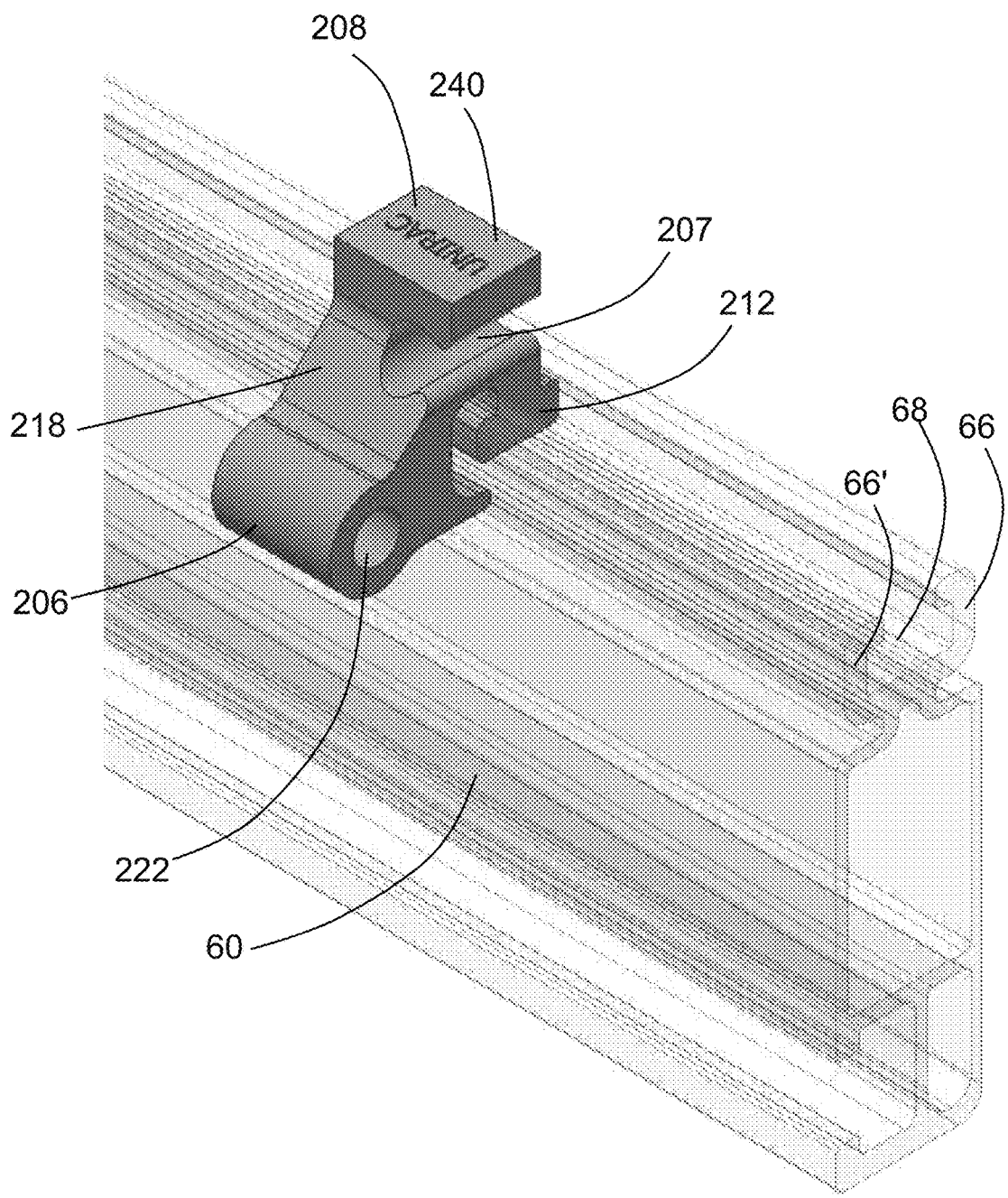
FIG. 53 shows a shaded perspective view of another example of an offset drive bracket, according to the present invention.

FIG. 53 shows a shaded perspective view of another example of an offset drive bracket 240, according to the present invention. The description is the same as for FIG. 52.

Figure 54:
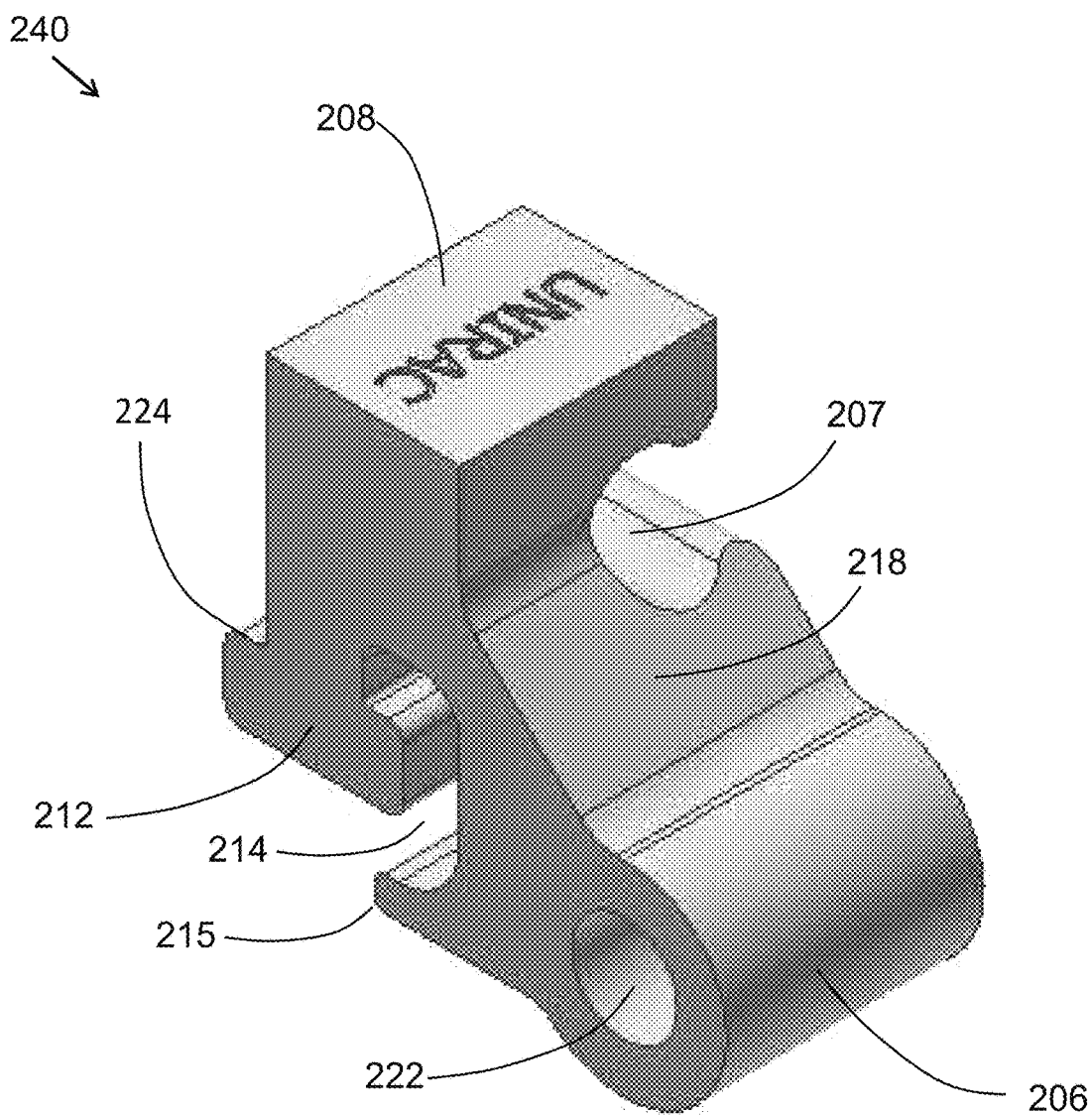
FIG. 54 shows a shaded perspective view of another example of an offset drive bracket, according to the present invention.

FIG. 54 shows a shaded perspective view of another example of an offset drive bracket 240, according to the present invention. The description is the same as for FIG. 52. T-slide 212 comprises a pair of shoulders 224. Additionally, curved slot 214 is disposed in middle portion 218 of bracket 240 between one of the shoulders 224 and a tab/finger feature 215 mentioned below, and curved slot 214 receives a sidewall 66' of rail 60 (See FIG. 49).

Figure 55:
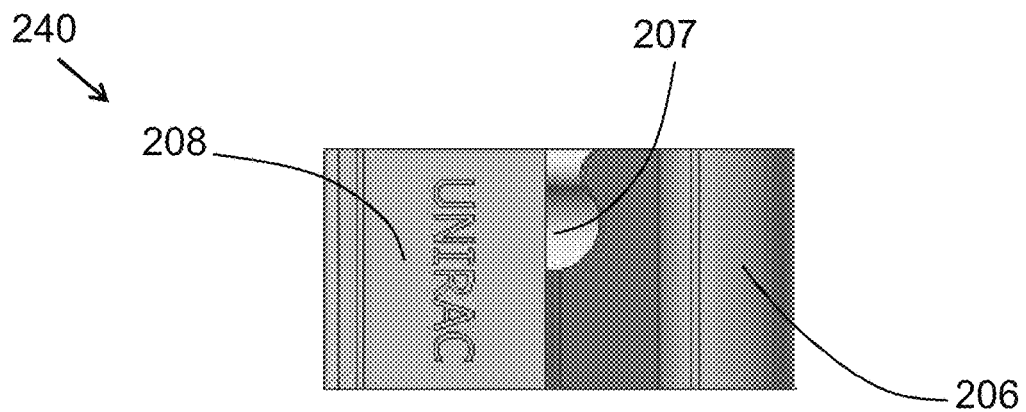
FIG. 55 shows a shaded top plan view of another example of an offset drive bracket, according to the present invention.

FIG. 55 shows a shaded top plan view of another example of a universal end clamp drive bracket 240, according to the present invention. The description is the same as for FIG. 52. Referring to all of FIGS. 52-55, drive bracket 240 has the tab/finger feature 215 located below the receiving threaded longitudinal hole 222 that performs two functions: (a) this feature 215 keeps the drive bracket 240 aligned longitudinally when installed in track 68 of rail 60; the clearance necessary for the T-feature of track 68 in rail 60 allows the drive bracket to slightly rotate when actuated by the bolt 26 (which is undesirable); and (b) when the T-feature of track 68 achieves clamp force pre-load, this same feature 215 provides additional strength and support.

Figure 56:
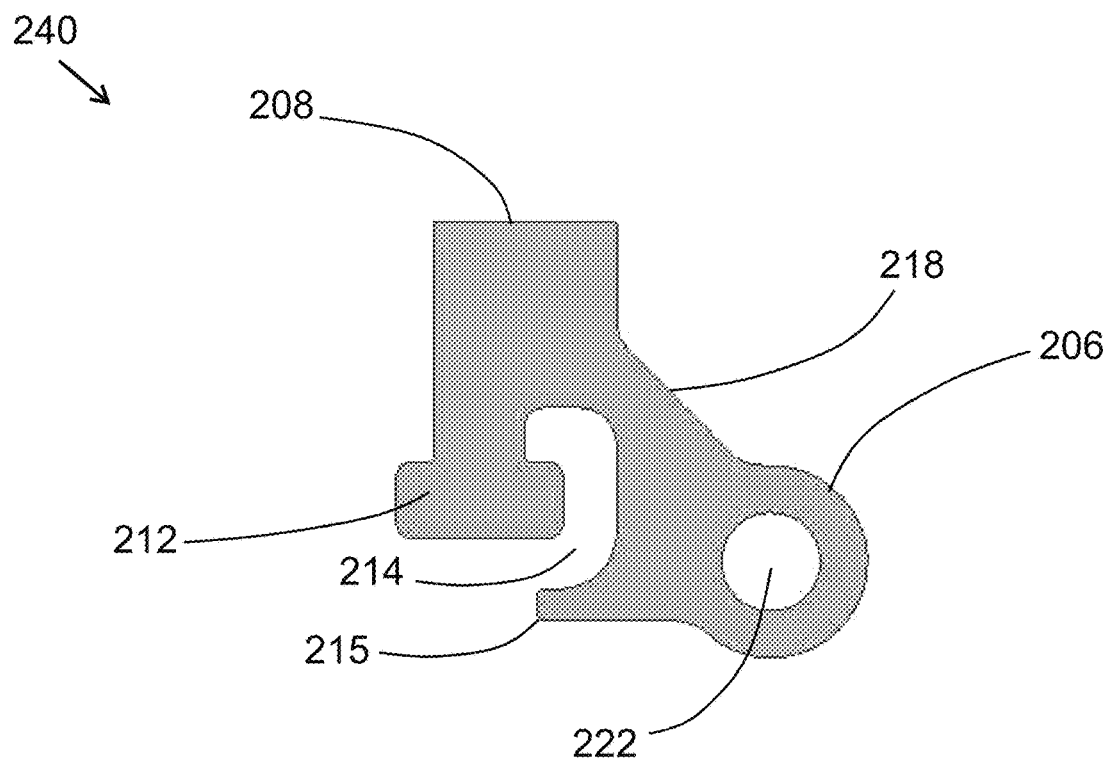
FIG. 56 shows a shaded side elevation view of another example of an offset drive bracket, according to the present invention.

FIG. 56 shows a shaded side elevation view of another example of an offset drive bracket 240, according to the present invention. The description is the same as for FIGS. 52 and 54.

Figure 57:
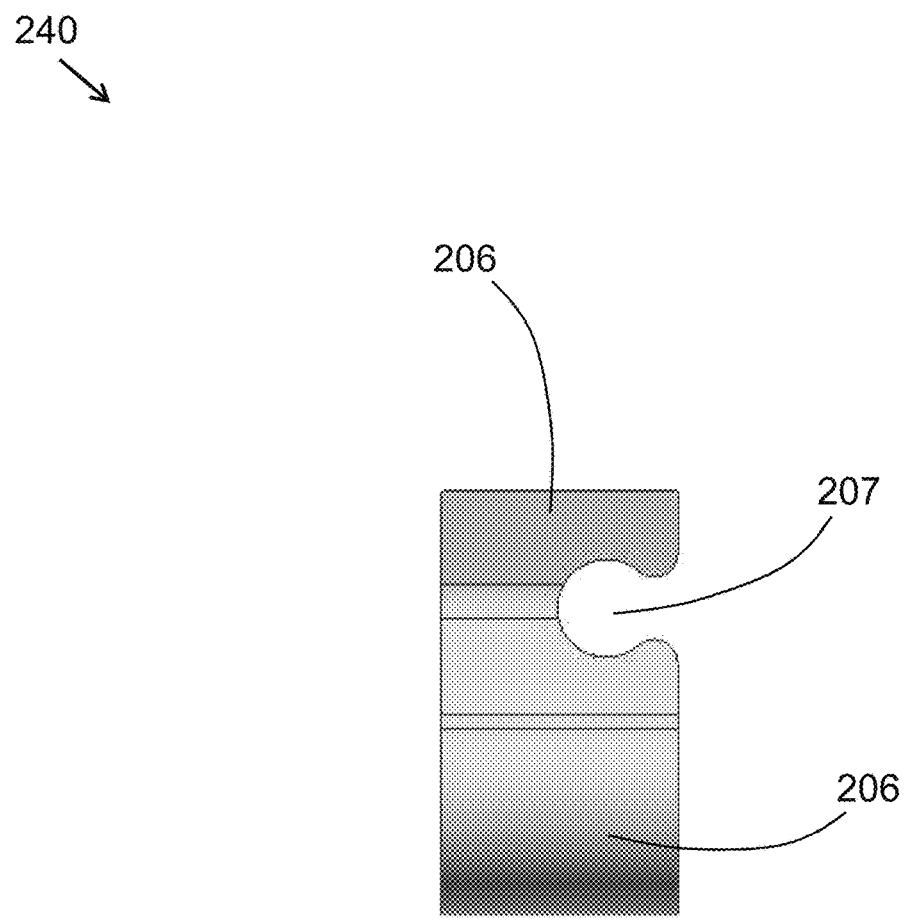
FIG. 57 shows a shaded front elevation view of another example of an offset drive bracket, according to the present invention.

FIG. 57 shows a shaded front elevation view of another example of an offset drive bracket 240, according to the present invention. The description is the same as for FIG. 52.

Figure 58:
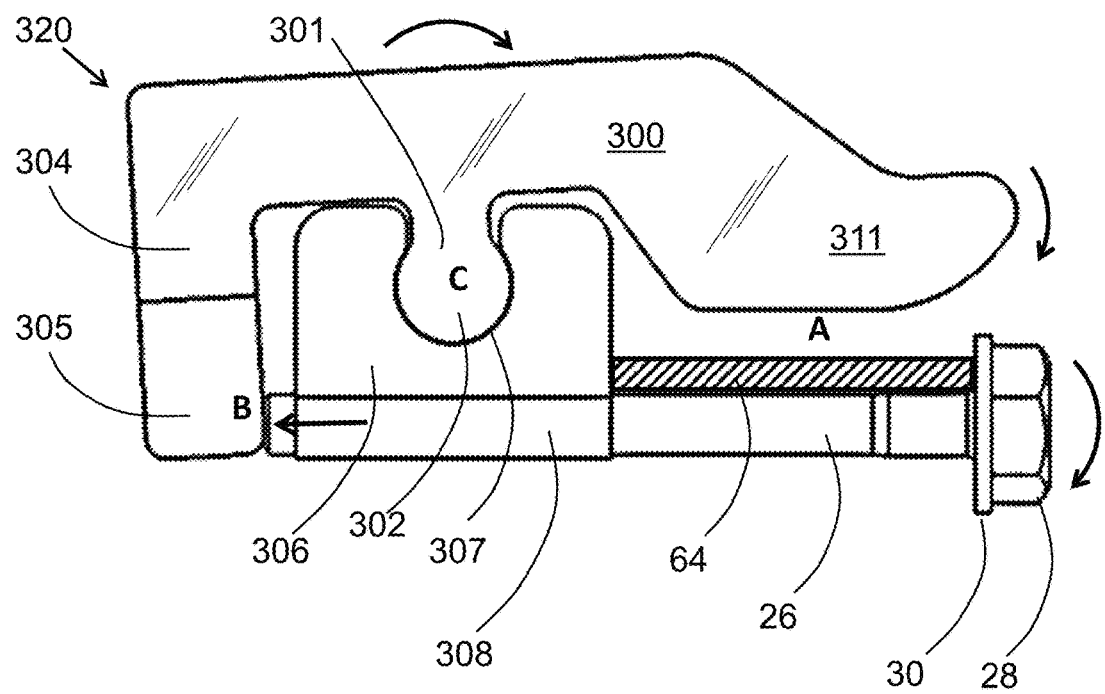
FIG. 58 shows a side elevation view of another example of a universal end clamp, according to the present invention.

FIG. 58 shows a side elevation view of another example of a universal end clamp assembly 320, according to the present invention. Clamp 320 comprises: an "F"-shaped clamp body 300; a first contact point "A" located near the front end of clamp body 300; a front clamp arm 311 connected to vertical pivot section 301 with a circular/cylindrical knob 302, and a rear vertical extension 305; a front T-slide 308 with an upper section 306 and a longitudinal threaded-hole at the bottom, and a circular/cylindrical transverse recessed socket 307 that has a diameter matching the diameter of the circular/cylindrical knob (pivot) 302; a threaded drive bolt 26 disposed through the longitudinal hole in T-slide 308; a bolt head 28 and a washer 30; a second contact point "B" located at the distal end of bolt 26, and a pivot point "C" located inside of pivot drive block 306. Clamp body 300 is pivotally linked to rear front T-slide 308 via circular/cylindrical knob (pivot) 302; and rearward motion of bolt 26 pushes backward on vertical extension 305 of clamp body 300, causing rotation of clamp body 300 about its pivot point (which is circular knob 302), which results in front clamp arm 311 applying a downwards clamping force at contact point "A" on lower flange 64 of the module. Clamp body 300 is a monolithic structural body (which can be a extruded or machined metal part) comprising a front clamp arm 311 connected to vertical pivot section 304 with a rear circular knob 302; and a narrow, rear vertical extension 305. The width of rear vertical extension 305 is sufficiently narrow so as to be able to slip down into the upper track 68 of rail 60, where it contacts the distal end of bolt 26 at contact point "B". No compression spring is needed on bolt 26. Note: circular/cylindrical knob 302 (at pivot point "C") is located inside of pivot drive block 306. Note that circular recess/socket 307 should be a slip-to-loose fit with circular/cylindrical knob 302, otherwise the clamp will be difficult to operate. The clamping front end 301 has a more-rounded front feature to optimize positioning and clamping forces.

Figure 59:
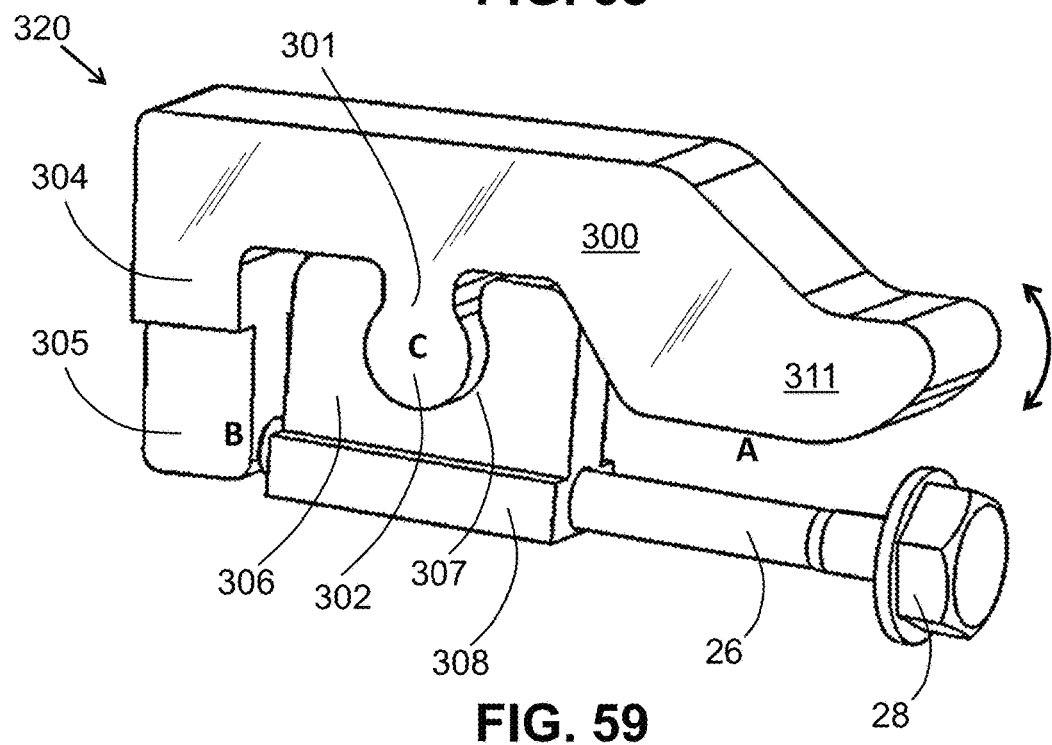
FIG. 59 shows a perspective view of another example of a universal end clamp, according to the present invention.

FIG. 59 shows a perspective view of another example of a universal end clamp 320, according to the present invention. The description is the same as for FIG. 58.

Figure 60:
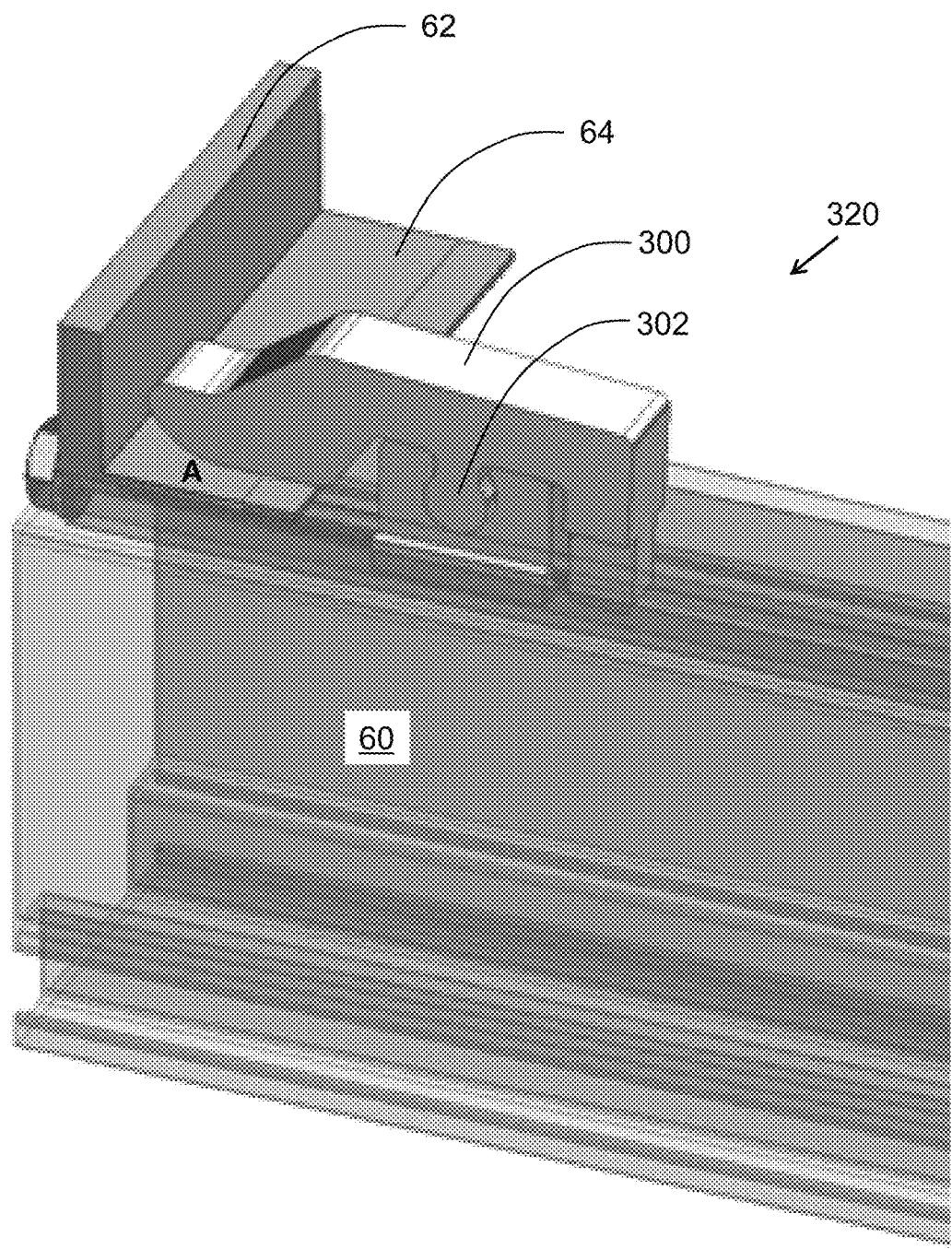
FIG. 60 shows a shaded perspective view of another example of a universal end clamp, according to the present invention.

FIG. 60 shows a shaded perspective view of another example of a universal end clamp assembly 320, according to the present invention. The description is the same as for FIG. 58.

Figure 61:
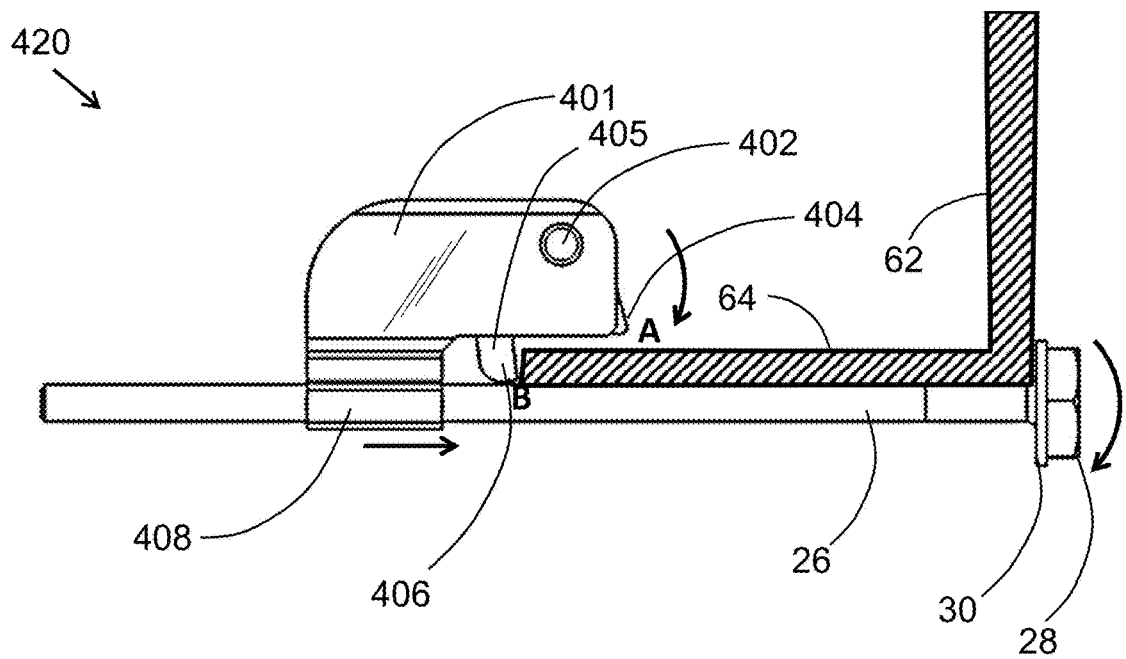
FIG. 61 shows a side elevation view of another example of a universal end clamp, according to the present invention.

FIG. 61 shows a side elevation view of another example of a universal end clamp assembly 420, according to the present invention. Clamp 420 comprises: an overhanging drive block 401; a contact point "A" located at the front end of clamp body 400 (FIG. 62); a cam body 405 connected to transverse pivot pin 402 located in block 401 with a lower cam tab/arm 404 and an upper cam arm (engagement bump) 406; a T-slide 408 connected to drive block 401, with a longitudinal threaded-hole in the bottom portion of T-slide 408; a threaded bolt 26 disposed through the threaded hole in T-slide 408; and a bolt head 28 with the washer 30. Cam body 405 is pivotally linked to pivot pin 402; and rotation of bolt 26 causes T-slide 408 to be drawn forward toward bolt head 28, which causes lower cam arm/tab 406 to contact at point "B" and push against lower flange 64 of module 62, which, in turn, causes clockwise rotation of cam body 405 about pivot pin 402, which, in turn, causes front clamp cam arm with engagement bump 406 to apply a downwards force at contact point "A" on lower flange 64, thereby clamping and locking flange 64 in place against rail 60 (not shown). Drive block 401 is a monolithic structural body (which can be a machined or cast or 3-D direct printed metal part) that can comprise a pair of parallel plates 400 and 400' integrally joined to T-slide 408. No compression spring is needed on bolt 26, but a spring (coil or leaf spring) may be used inside of drive block 400 to urge cam arm 404 upwards, prior to engaging lower cam arm 406 with lower flange 64. Bolt 26 and T-slide 408 are disposed inside of, and slide along, the upper track 68 of rail 60. Alternatively, (not illustrated) overhanging drive block 401 may comprise a single middle plate 400 disposed in-between a pair of cam bodies 405, 405' that are disposed on either side of middle plate 400. The pair of cam bodies 405, 405' operate together in tandem (i.e., in parallel).

Figure 62:
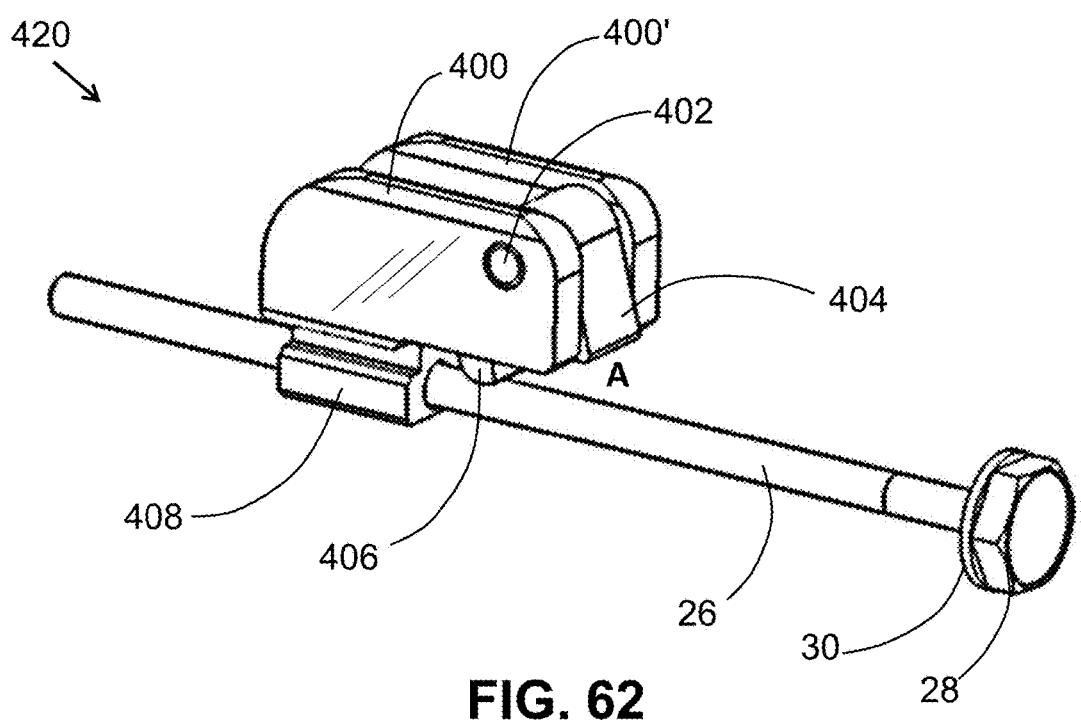
FIG. 62 shows a perspective view of another example of a universal end clamp, according to the present invention.

FIG. 62 shows a perspective view of another example of a universal end clamp 420, according to the present invention. The description is the same as for FIG. 61.

Figure 63:
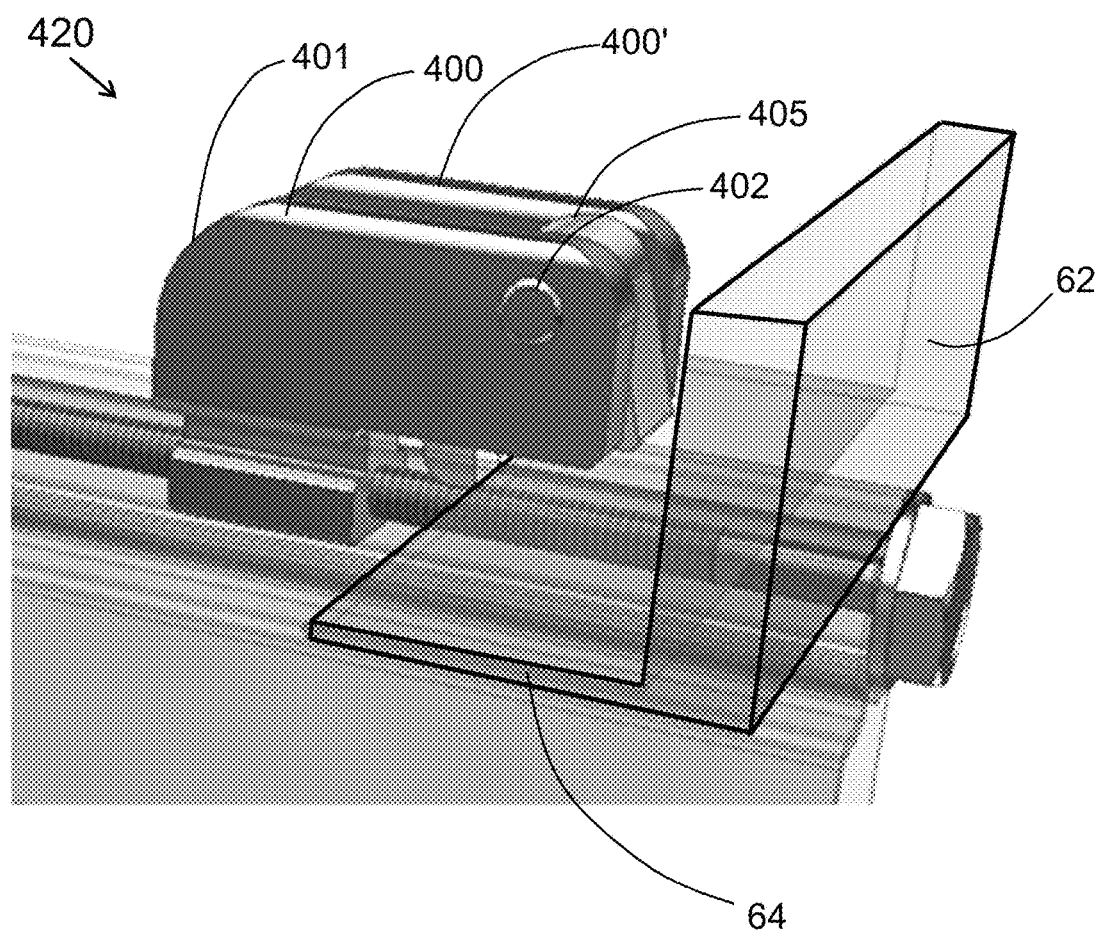
FIG. 63 shows a shaded perspective view of another example of a universal end clamp, according to the present invention.

FIG. 63 shows a perspective view of another example of a universal end clamp 420, according to the present invention. The description is the same as for FIG. 61.

Figure 64:
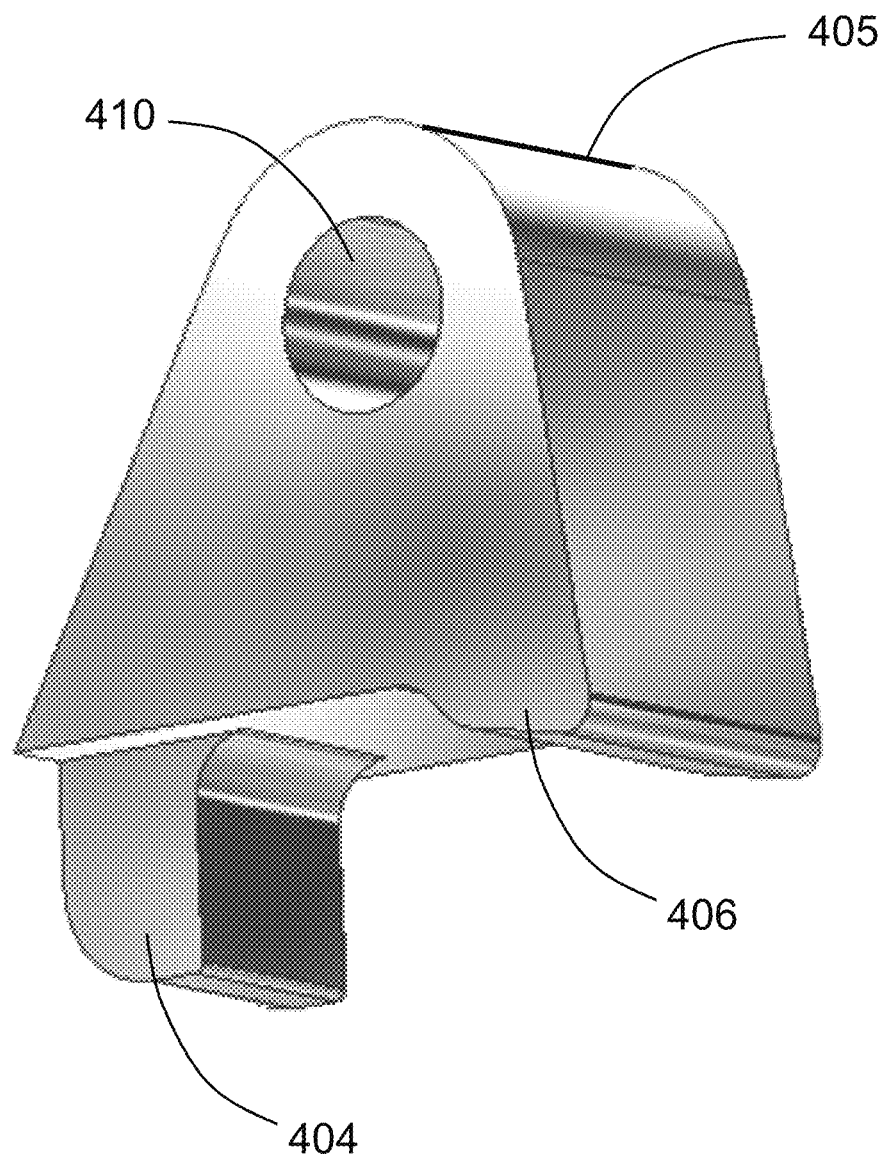
FIG. 64 shows a perspective view of another example of a cam, according to the present invention.

FIG. 64 shows a perspective view of another example of a cam 405, according to the present invention. Cam 405 comprises an engagement bump 406 a drive tab 404, and a transverse through hole 410.

FIG. 65 shows a side elevation view of another example of a cam 405, according to the present invention. The description is the same as for FIG. 64.

FIG. 66 shows a front elevation view of another example of a cam 405, according to the present invention. The description is the same as for FIG. 64.

FIG. 67 shows a bottom plan view of another example of a cam 405, according to the present invention. The description is the same as for FIG. 64.

Figure 68:
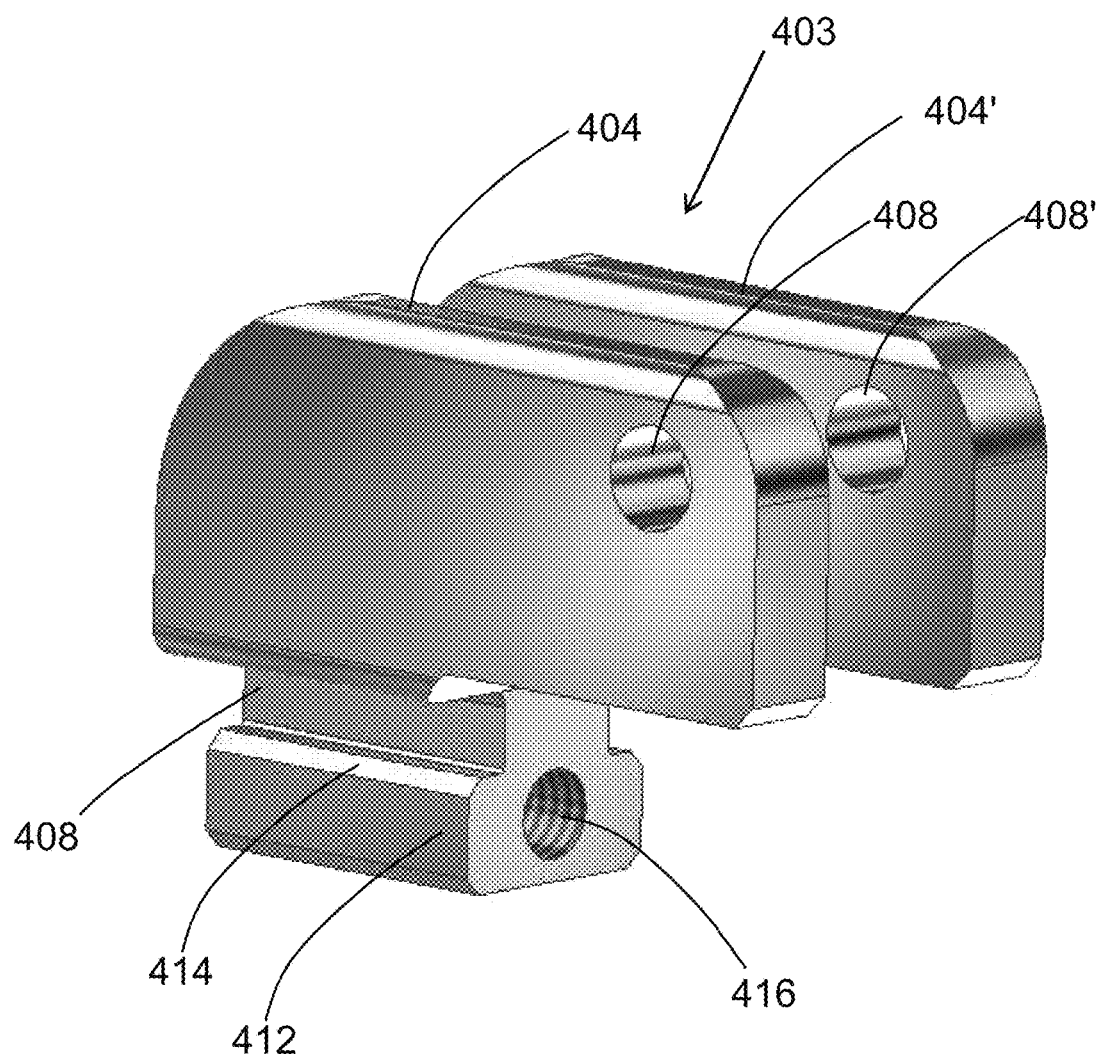
FIG. 68 shows a perspective view of another example of a clamp body, according to the present invention.
Figure 72:
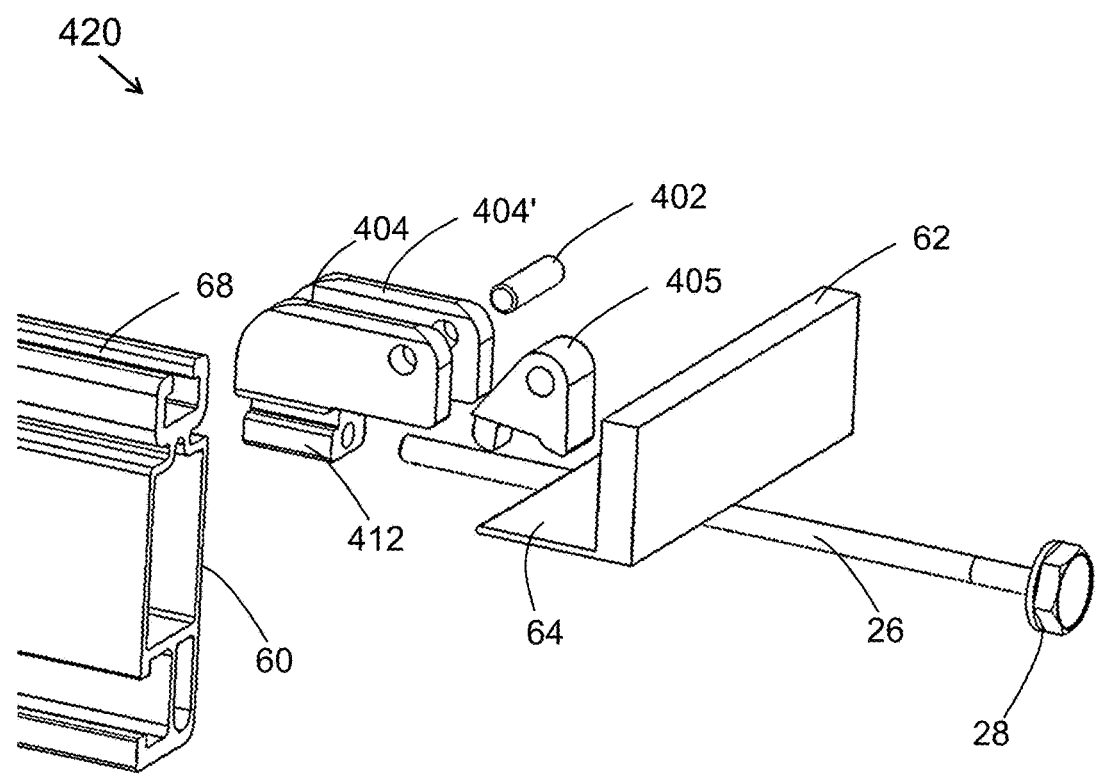
FIG. 72 shows an exploded perspective view of another example of a universal end clamp, according to the present invention.

FIG. 68 shows a perspective view of another example of a clamp body 403, according to the present invention. Clamp body 403 is a monolithic body comprising a front plate 404 and an identical rear plate 404', each with through holes 408 and 408', respectively, which hold pivot hinge pin 402 (FIG. 72). Clamp body 403 further comprises a middle stem 408 and a T-slide bottom portion 412 that comprises a pair of shoulders 414 and a longitudinal threaded hole 416.

Figure 69:
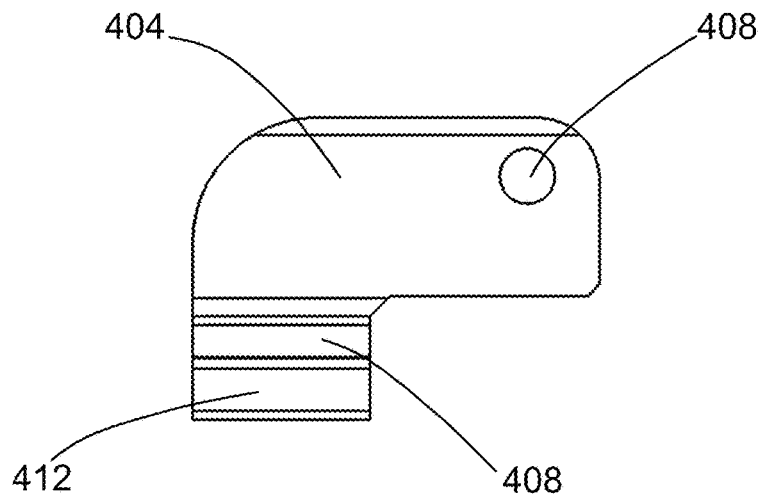
FIG. 69 shows a side elevation view of another example of a cam, according to the present invention.

FIG. 69 shows a side elevation view of another example of a cam 405, according to the present invention. The description is the same as for FIG. 68.

Figures 70, 71:
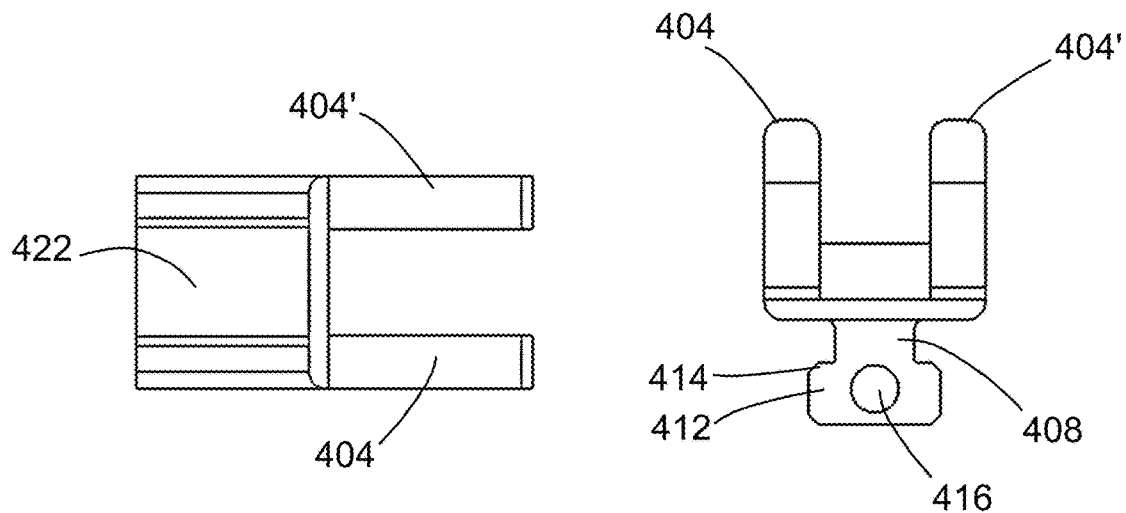
FIG. 70 shows a top plan view of another example of a cam, according to the present invention.
FIG. 71 shows a front elevation view of another example of a cam, according to the present invention.

FIG. 70 shows a top plan view of another example of a cam 405, according to the present invention. The description is the same as for FIG. 68.

FIG. 71 shows a front elevation view of another example of a cam 405, according to the present invention. The description is the same as for FIG. 68.

FIG. 72 shows an exploded perspective view of another example of a universal end clamp 420, according to the present invention. Note: bolt 26 and T-slide 412 are disposed inside the track 68 of rail 60. Other elements indicated in FIG. 72 have been described previously.

Figure 73:
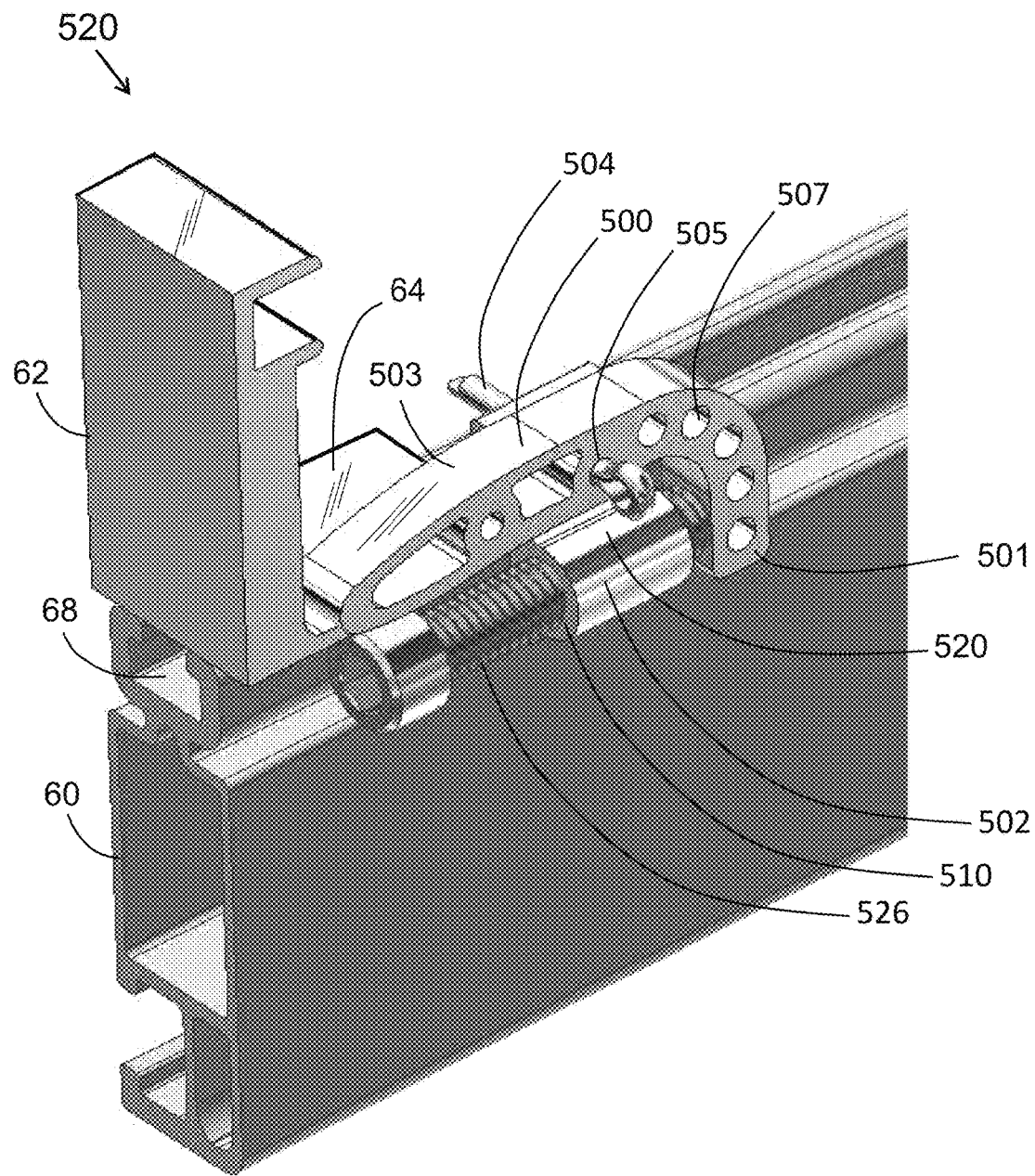
FIG. 73 shows a shaded perspective view of another example of a universal end clamp, according to the present invention.

FIG. 73 shows a perspective view of another example of a universal end clamp 520, according to the present invention. End clamp 520 comprises: a clamp 500 pivotally joined to offset drive bracket 520 via Cotter pin 504 that is received by through hole 505. A threaded hole 510 is disposed in lower portion 502 of bracket 520, which receives threaded bolt 526. Note: bolt 526 is not located inside of track 68 of rail 60, it is located offset from, and to the side of, track 68. Clamp 500 is a monolithic, "J"-shaped body comprising a clamp arm 503 and a lower end 501, a pair of through holes 505, 505' for receiving a Cotter pin 504, and a plurality of weight-reducing holes 507. When bolt 526 is rotated, the distal end of bolt 526 contacts lower vertical portion 501 of clamp body 500 at point "C", and the distance between the lower end 501 of clamp body 500 and the drive bracket 520 increases, which causes clamp 500 to rotate/pivot about the Cotter pin 505. This rotation causes clamp arm 503 to clamp down on lower ledge 64 of module frame 62 at contact point "A". Note: any method can be used to achieve a pivot point in place of a Cotter pin 505, e.g., a pressed pin/dowel.

Figure 74A:
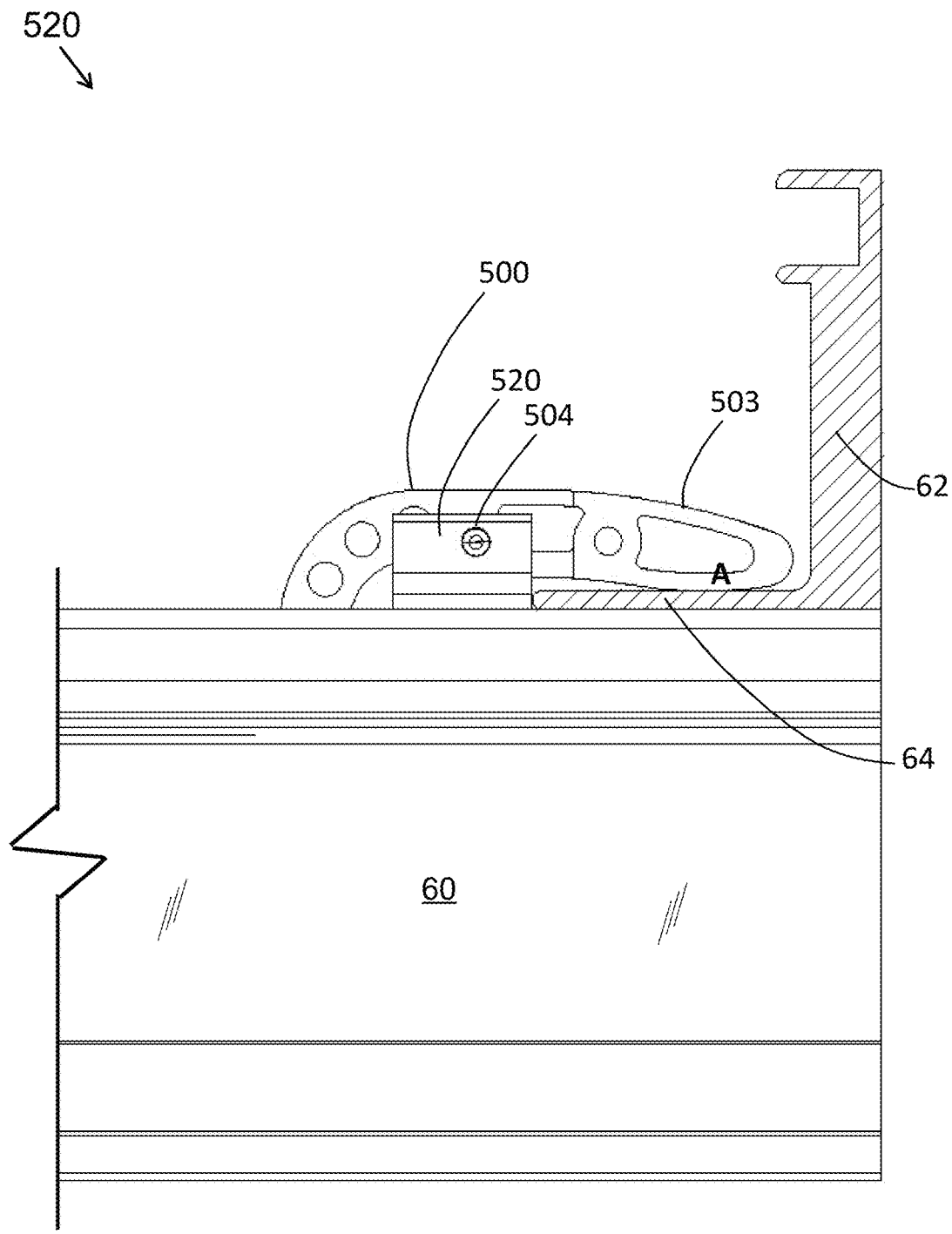
FIG. 74A shows a side elevation view of another example of a universal end clamp, according to the present invention.

FIG. 74A shows a side elevation view of another example of a universal end clamp 520, according to the present invention. The description is the same as FIG. 73.

Figure 74B:
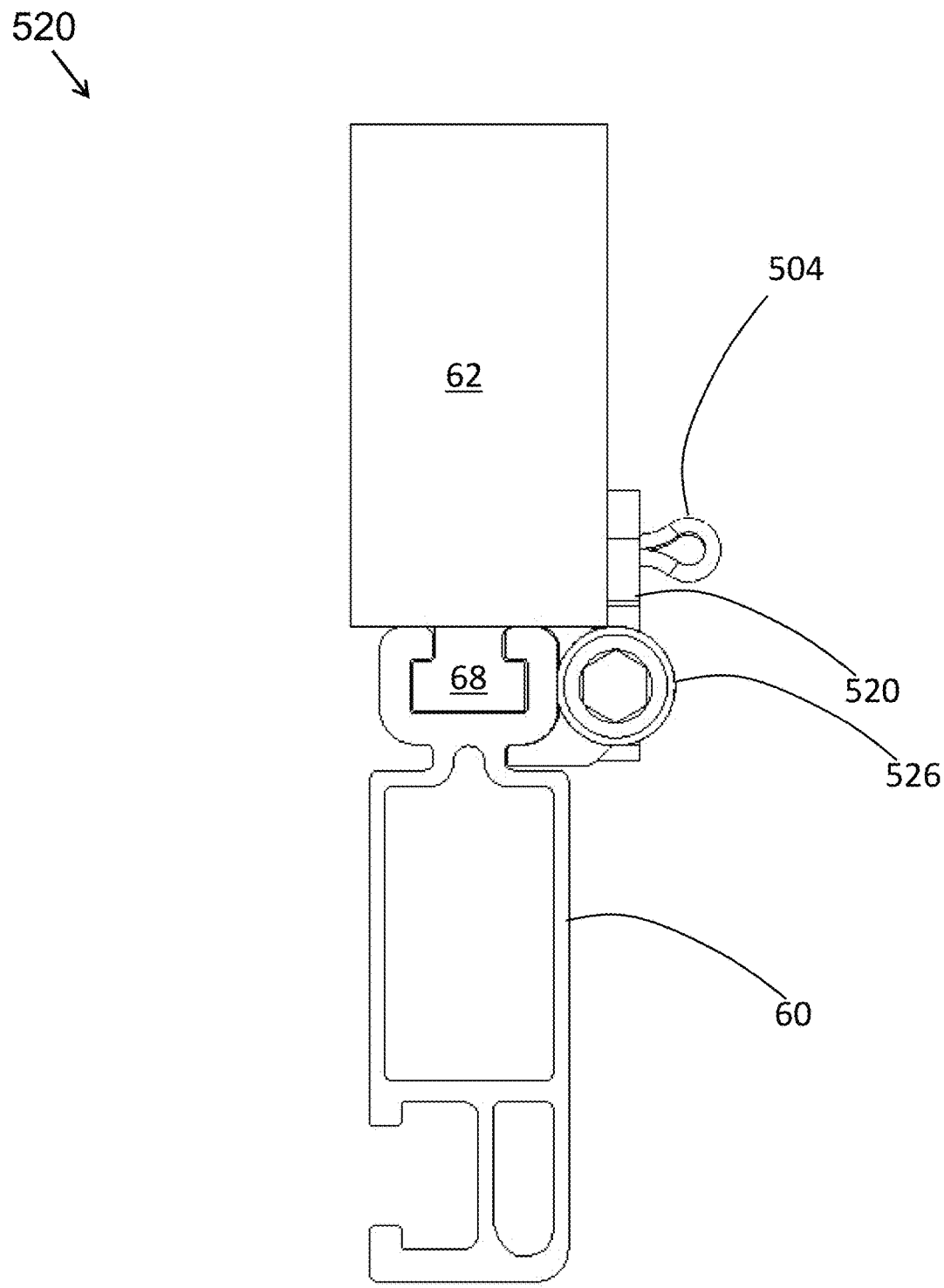
FIG. 74B shows a front elevation view of another example of a universal end clamp, according to the present invention.

FIG. 74B shows a front elevation view of another example of a universal end clamp 520, according to the present invention. The description is the same as FIG. 73.

Figure 74C:
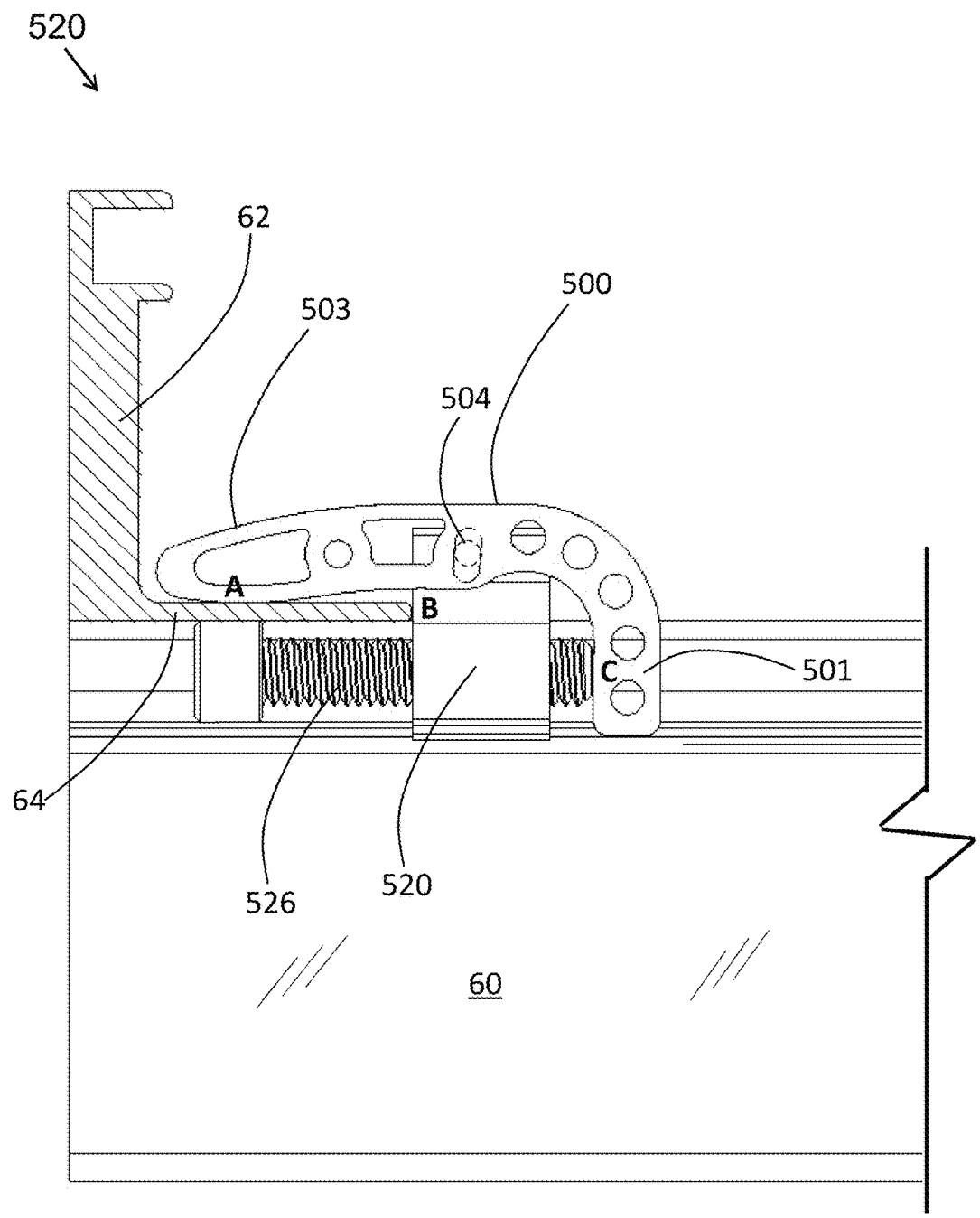
FIG. 74C shows a side elevation view of another example of a universal end clamp, according to the present invention.

FIG. 74C shows a side elevation view of another example of a universal end clamp 520, according to the present invention. The description is the same as FIG. 73.

Figure 75:
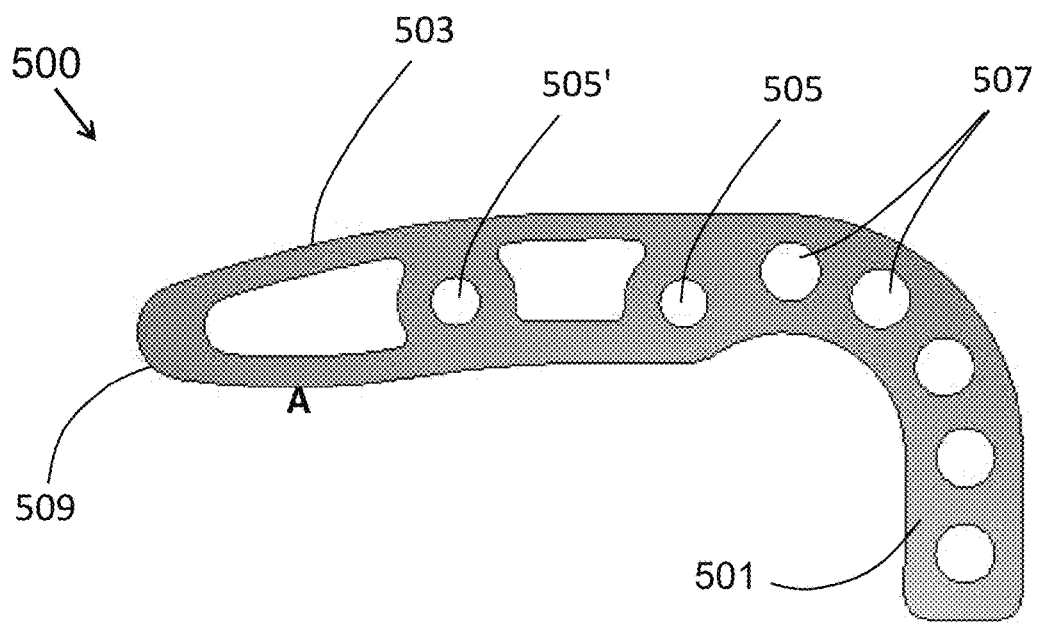
FIG. 75 shows a side elevation view of another example of a clamp, according to the present invention.

FIG. 75 shows a side elevation view of another example of a clamp 500, according to the present invention. Clamp 500 is a monolithic, "J"-shaped body comprising a clamp arm 503 and a lower end 501, a pair of through holes 505, 505' for receiving a Cotter pin 504, and a plurality of weight-reducing holes 507, 507', etc. Note that Cotter pin 504 can be positioned in either of the two holes 505 or 505', depending on whether or not the lower module flange 64 is wide or shallow, respectively. The Cotter pin 504 can be positioned such that different clamp locations and varying clamp pressures can be achieved. Note that front end 509 is curved in a shape that accepts variable contact locations of module flange return leg 64.

Figure 76:
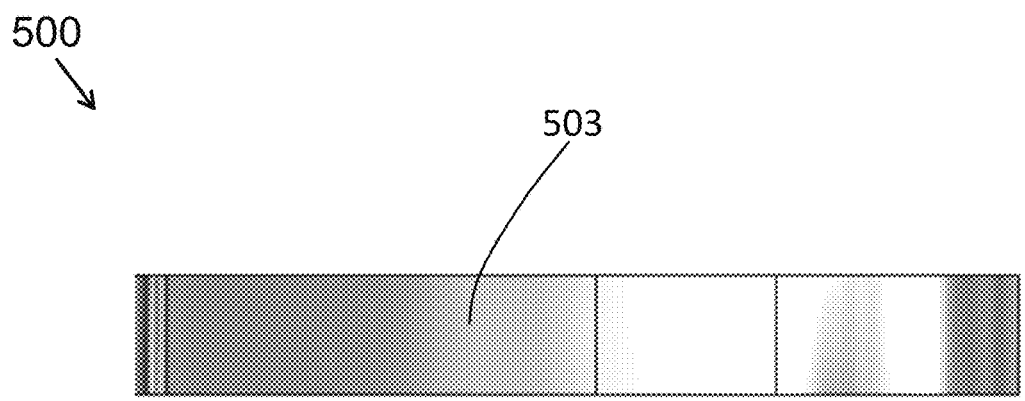
FIG. 76 shows a top plan view of another example of a clamp, according to the present invention.

FIG. 76 shows a top plan view of another example of a clamp 500, according to the present invention. Clamp arm 503 is also indicated.

Figure 77:
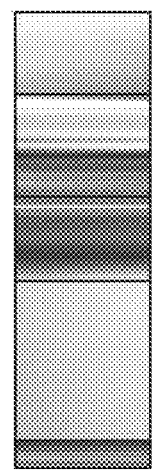
FIG. 77 shows a front elevation view of another example of a clamp, according to the present invention.

FIG. 77 shows a front elevation view of another example of a clamp 500, according to the present invention.

Figure 78:
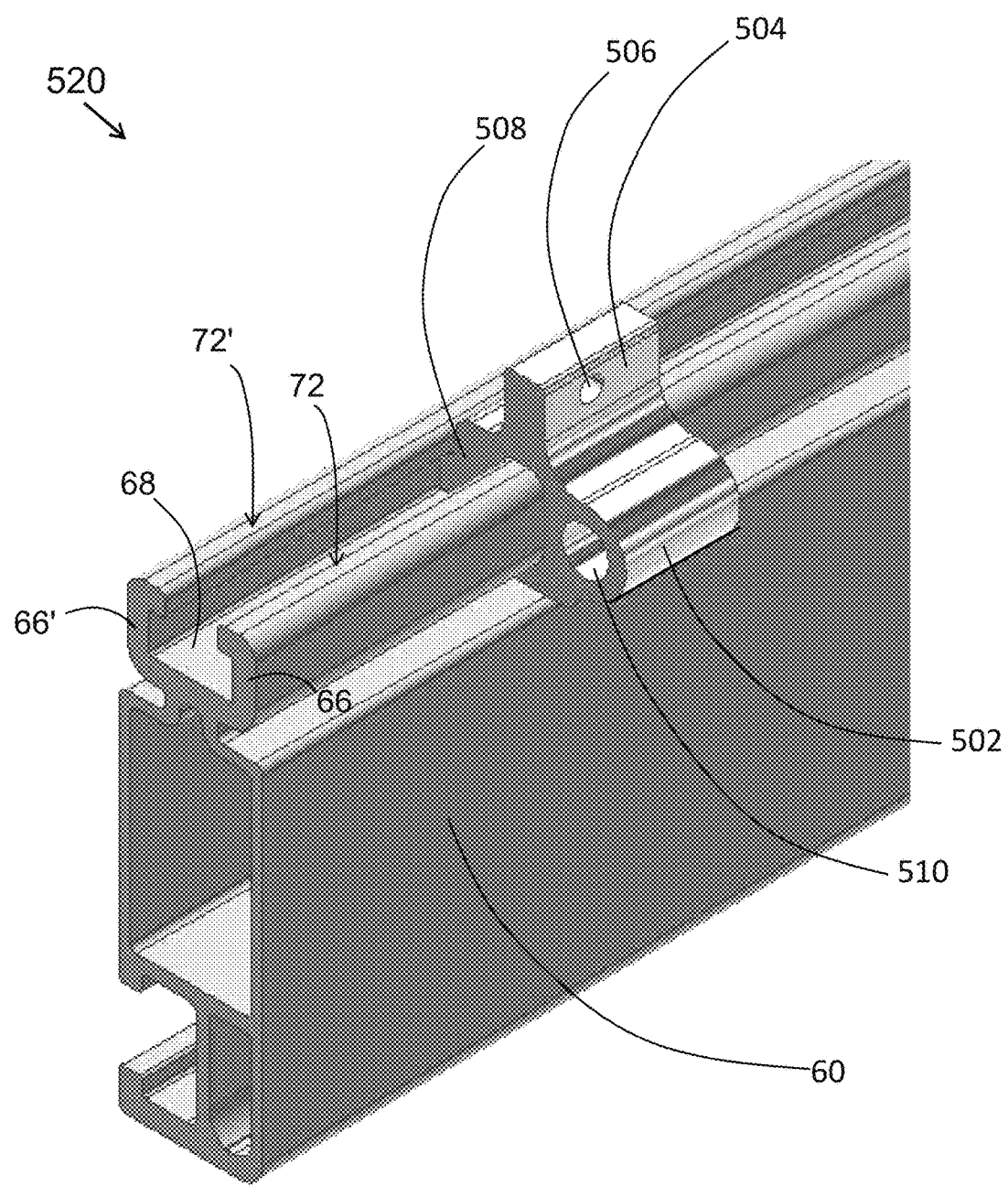
FIG. 78 shows a shaded perspective view of another example of an offset drive bracket, according to the present invention.

FIG. 78 shows a shaded perspective view of another example of an offset drive bracket 520, according to the present invention. Offset drive bracket 520 clips onto sidewall 66 of track 68 of rail 60, and slides along the length of track 68. Offset drive bracket 520 is a monolithic extruded shape (which can be manufactured by extrusion, machining, or 3-D additive printing), comprising: an upper portion 504, a lower portion 502 with a threaded longitudinal hole 510, a longitudinal T-slide 508 with a pair of chamfered shoulders 524, 524', and a transverse through-hole 506 for receiving a Cotter pin 505. Note: drive bracket 520 can be made right-handed or left-handed, with no change in function. Other elements shown in FIG. 78 are as described previously.

Figure 79:
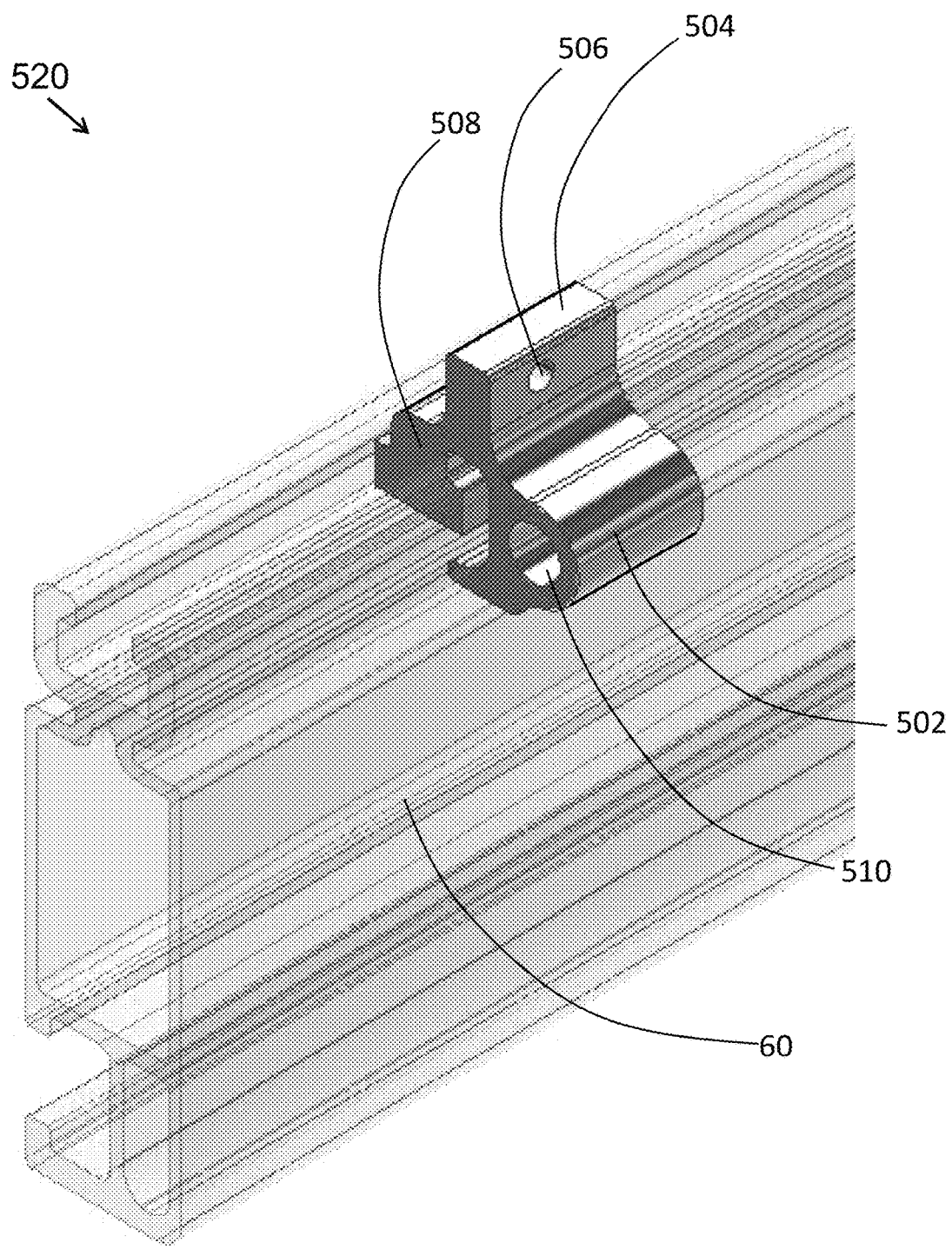
FIG. 79 shows a shaded perspective view of another example of an offset drive bracket, according to the present invention.

FIG. 79 shows a shaded perspective view of another example of an offset drive bracket 520, according to the present invention. The description is the same as FIG. 78.

Figure 80:
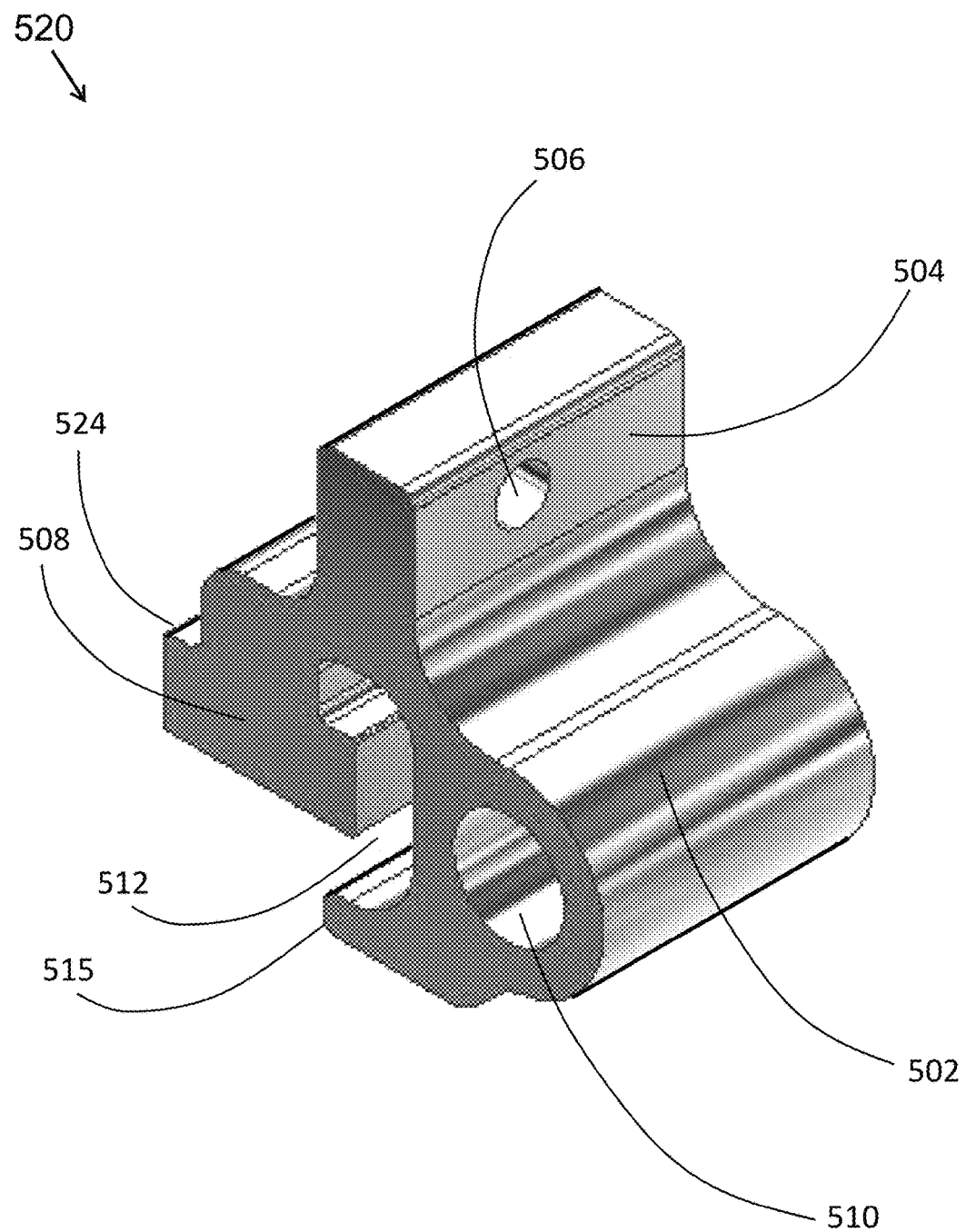
FIG. 80 shows a shaded perspective view of another example of an offset drive bracket, according to the present invention.

FIG. 80 shows a shaded perspective view of another example of an offset drive bracket 520, according to the present invention. The description is the same as FIG. 78.

Figure 81:
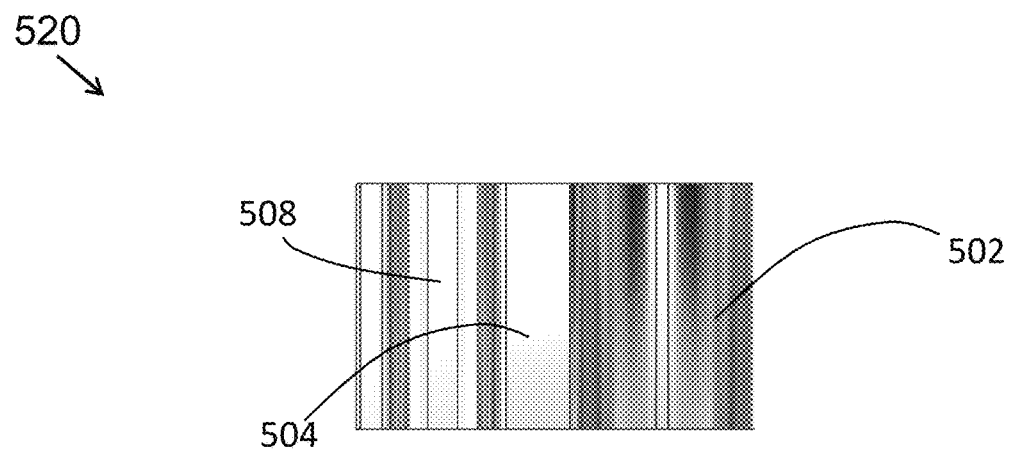
FIG. 81 shows a shaded top plan view of another example of an offset drive bracket, according to the present invention.

FIG. 81 shows a shaded top plan view of another example of an offset drive bracket 520, according to the present invention. The description is the same as FIG. 78.

Figure 82:
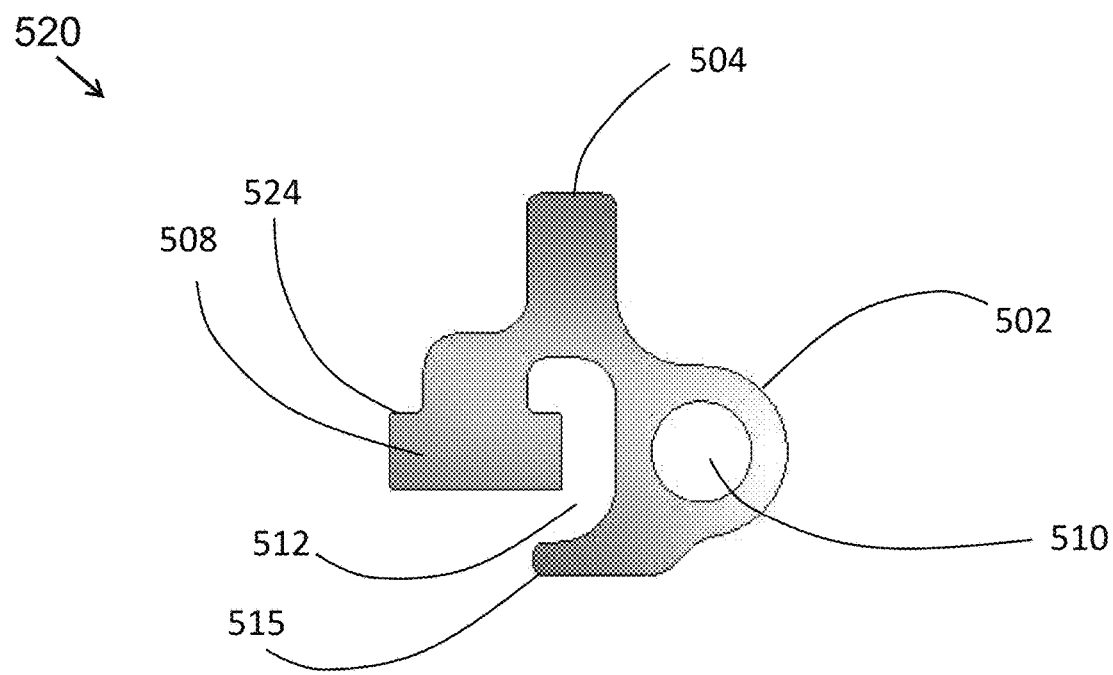
FIG. 82 shows a shaded front elevation view of another example of an offset drive bracket, according to the present invention.

FIG. 82 shows a shaded front elevation view of another example of an offset drive bracket 520, according to the present invention. The description is the same as FIG. 78. Channel 512 receives the top channel sidewall 66 that forms the upper track 68 of rail 60. Drive bracket 520 has a tab/finger feature 515 located below the receiving threaded longitudinal hole 510 that performs two functions: (a) this feature 515 keeps the drive bracket 520 aligned longitudinally when installed in track 68 of rail 60; the clearance necessary for the T-feature of track 68 in rail 60 allows the drive bracket to slightly rotate when actuated by the bolt 26 (which is undesirable); and (b) when the T-feature of track 68 achieves clamp force pre-load, this same feature 515 provides additional strength and support.

Figure 83:
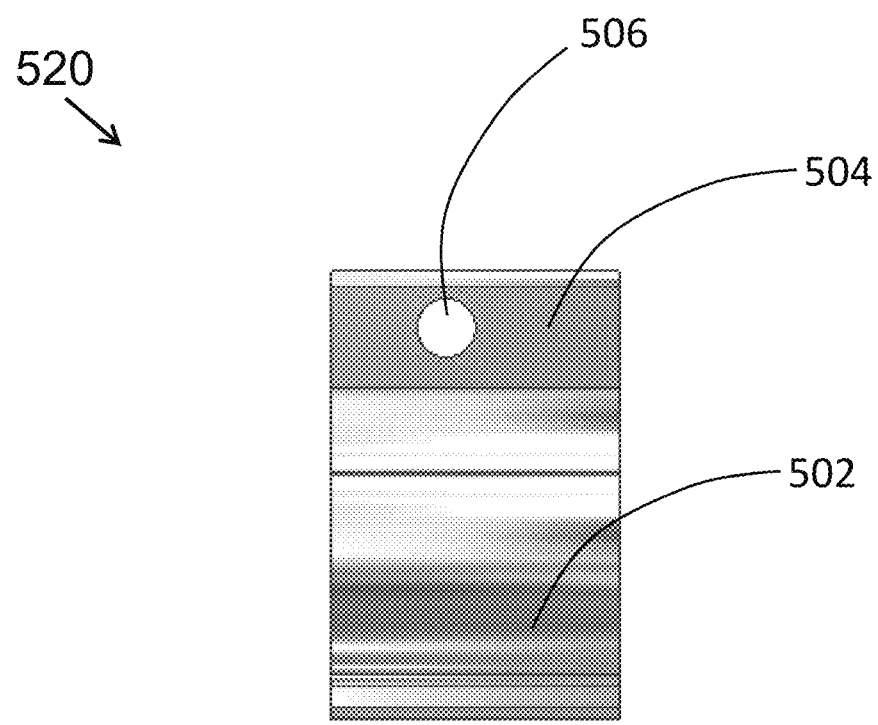
FIG. 83 shows a shaded side elevation view of another example of an offset drive bracket, according to the present invention.

FIG. 83 shows a shaded side elevation view of another example of an offset drive bracket 520, according to the present invention. The description is the same as FIG. 78.

A variety of methods can be used to clamp a lower flange of a solar panel module frame to a rail. In a first example, the steps can comprise:
    providing a clamp body; and
    applying a torque to the body and generating a compressive clamping force between the body and a lower flange of a solar panel module frame; whereby the lower flange of the module frame is clamped to the rail.

The step of applying a torque to the clamp body can comprise:
    (a) providing a pivot point for the clamp body to pivot about; and
    (b) rotating a bolt, thereby
    (c) moving one or more components within the assembly; thereby
    (d) generating offset forces on the body, thereby rotating the clamp body about the pivot point; thereby
    (e) applying compressive forces to the lower flange when the clamp body contacts the lower flange; thereby
    (f) clamping the module frame to the rail.

The components of the assembly that can move can comprise, among other things: the bolt, front and/or rear T-slides, drive blocks, cams, coil springs, leaf springs, and offset drive brackets.

The method described above can further comprise the steps of:
    (1) inserting (by sliding) the universal end clamp assembly shown in FIGS. 4-39 into an upper track of a rail;
    (2) positioning a solar panel module frame on the rail, with a distal edge of the frame aligned flush with an end of the rail (as constrained by a flat washer on a head of the threaded bolt);
    (3) rotating the bolt, and pulling the front and rear T-slides towards a head of the bolt until a front T-slide contacts a distal edge of the lower flange; then
    (4) continuing rotating the bolt, thereby decreasing a distance between the front and rear T-slides, (5) decreasing the distance causing the rear drive pin to push upwards and sideways on the inclined slot (while sliding inside the slot);

(6) thereby causing the clamp body to rotate about the front pivot pin;

(7) contacting a front edge of the clamp body with the lower flange of the module frame; and (8) continuing rotation of the bolt until a sufficient amount of downward clamping force is applied by the clamp body to the lower flange, thereby clamping the module frame against the rail.

In general, the contact point "A" can comprise a point loading, a line loading, or a surface loading, depending on the shape of the clamping plate (e.g., 90° corner, curved surface) and angle and length of contact. Also, in general, the clamp assemblies 10, 98, 120, 220, 320, 420, and 520 can be mounted in the lower track 70 of rail 60, to provide other clamping capabilities of other components, as needed. Also, the clamp assemblies 10, 98, 120, 220, 320, 420, and 520 can be used to join a smaller section of rail together (limited by the length of the bolt).

The foregoing disclosure has been set forth merely to illustrate the invention and is not intended to be limiting. Since modifications of the disclosed embodiments incorporating the spirit and scope of the invention may occur to persons skilled in the art, the invention should be construed to include everything within the scope of the appended claims and equivalents thereof.

What is claimed is:

1. A universal end clamp assembly for clamping a solar panel to a rail, the universal end clamp assembly comprising:
    a clamp body;
    a front T-slide with a longitudinal through-hole disposed through a lower portion of the front T-slide, and a first transverse through-hole disposed through an upper portion of the front T-slide;
    a rear T-slide with a longitudinal threaded-hole disposed through a lower portion of the rear T-slide, and a second transverse through-hole disposed through an upper portion of the rear T-slide; and
    a threaded bolt passing through the longitudinal through-hole of the front T-slide and threaded into the longitudinal threaded-hole of the rear T-slide,
    wherein the threaded bolt is oriented substantially parallel to a longitudinal axis of the rail for applying a torque to the clamp body for generating a compressive clamping force between the clamp body and a lower flange of a solar panel module frame, whereby the lower flange of the solar panel module frame is clamped to the rail.

2. The universal end clamp assembly of claim 1, wherein the clamp body comprises:
    a clamp plate with a through-hole at a pivot point near a front end of the clamp body; and
    an inclined slot disposed near a rear end of the clamp body; and
    wherein the universal end clamp assembly further comprises:
    a front pivot pin pivotally connecting the front T-slide to the through-hole at the pivot point; and
    a rear drive pin pivotally and slidably connecting the rear T-slide to the inclined slot.

3. The universal end clamp assembly of claim 2, wherein applying torque to the bolt causes the rear T-slide to move towards the front T-slide, which causes the rear drive pin to apply a force to the inclined slot of the clamp body, which in turn forces the clamp body to rotate about the front pivot pin, which causes a clamping force to be applied to the lower flange of the solar panel module frame, thereby clamping the solar panel module frame against the rail.

4. The universal end clamp assembly of claim 2, wherein the clamp plate is a first clamp plate, the through-hole is a first through-hole, the pivot point is a first pivot point, and the inclined slot is a first inclined slot,
    wherein the the clamp body further comprises:
    a second clamp plate with a second through-hole at a second pivot point near a front end of the clamp body; and
    a second inclined slot disposed near a rear end of the clamp body,
    wherein the first clamp plate and the second clamp plate are integrally joined at respective front ends thereof.

5. The universal end clamp assembly of claim 4, further comprising a structural web section disposed across the first clamp plate and the second clamp plate, in a middle of each of first clamp plate and the second clamp plate.

6. The universal end clamp assembly of claim 4, wherein the front T-slide and the rear T-slide each have an upper portion that is disposed in-between each of first clamp plate and the second clamp plate.

7. The universal end clamp assembly of claim 2, wherein the inclined slot is tilted at an angle ranging from 20° to 45° from a horizontal plane.

8. The universal end clamp assembly of claim 1, wherein the lower portion of the front T-slide comprises a first pair of chamfered shoulders that define a "T"-shaped cross-section; and
    the lower portion of the rear T-slide comprises a second pair of chamfered shoulders that define a "T"-shaped cross-section.

9. The universal end clamp assembly of claim 1, further comprising a coil spring disposed on the threaded bolt and located in-between the front T-slide and the rear T-slide.

10. The universal end clamp assembly of claim 1, wherein the rail includes an upper track; and
    wherein the threaded bolt, the front T-slide, and the rear T-slide are disposed inside of, and slide along, the upper track of the rail.

11. The universal end clamp assembly of claim 1, wherein the front T-slide butts up against a distal edge of the lower flange of the solar panel module frame when the lower flange is mounted on the rail.

12. The universal end clamp assembly of claim 1, wherein the clamp body comprises a middle clamping plate; and
    wherein each of the front T-slide and the rear T-slide comprises a pair of parallel plates disposed on either side of the middle clamping plate.

* * * * *